United States Patent [19]
Onufryk

[11] Patent Number: 5,969,790
[45] Date of Patent: Oct. 19, 1999

[54] MULTI PRISM IMAGE ENHANCING LENS SYSTEM AND METHOD OF MAKING SAME

[76] Inventor: Michael Onufryk, 9 Wickford Way, Fairport, N.Y. 14450

[21] Appl. No.: 08/771,435

[22] Filed: Dec. 20, 1996

[51] Int. Cl.[6] .............................. G02C 7/02; G02C 7/04; G02C 7/14; G02B 27/10

[52] U.S. Cl. ..................... 351/175; 351/160 R; 351/161; 359/625

[58] Field of Search ................................ 351/175, 160 R, 351/160 H, 161, 162, 170; 359/709, 708, 625, 626, 628

[56] References Cited

U.S. PATENT DOCUMENTS 4,881,804  11/1989  Cohen ...................................... 351/161

*Primary Examiner*—Scott J. Sugarman
*Attorney, Agent, or Firm*—Cumpston & Shaw

[57] ABSTRACT

A prismatic lens (10) having a plurality of integral prisms (60), wherein the prisms (60) surround a central non prism area (90) in an apex portion (68) in-base (62) out orientation. Each prism (60) is adjacent or contacting two other prisms (60) to encompass the non prism area (90). The present invention may include a conical, spherical or aspheric lens member (30). Further, the plurality of prisms (60) may be disposed on an object side (12) or an image side (14) of the lens (10), so that a corrective prescription curvature may be formed on the lens member (30) on either the object (12) or image (14) side of the lens (10).

21 Claims, 68 Drawing Sheets

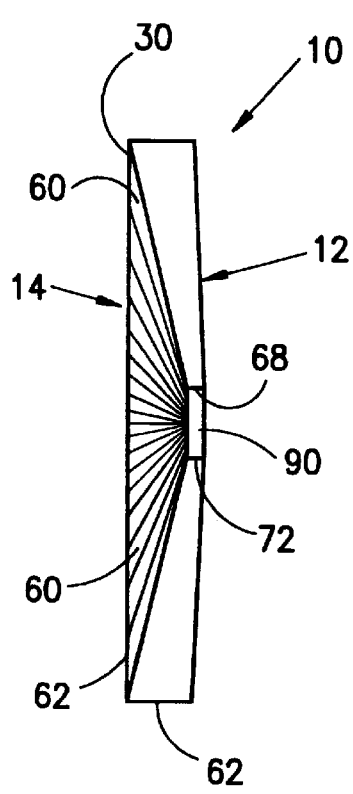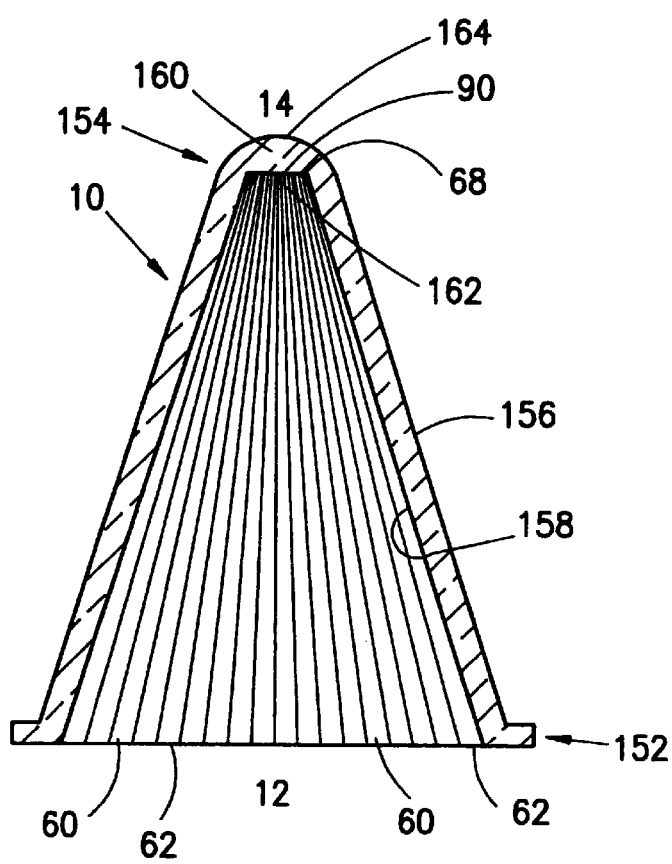
FIG. 1                    FIG. 2

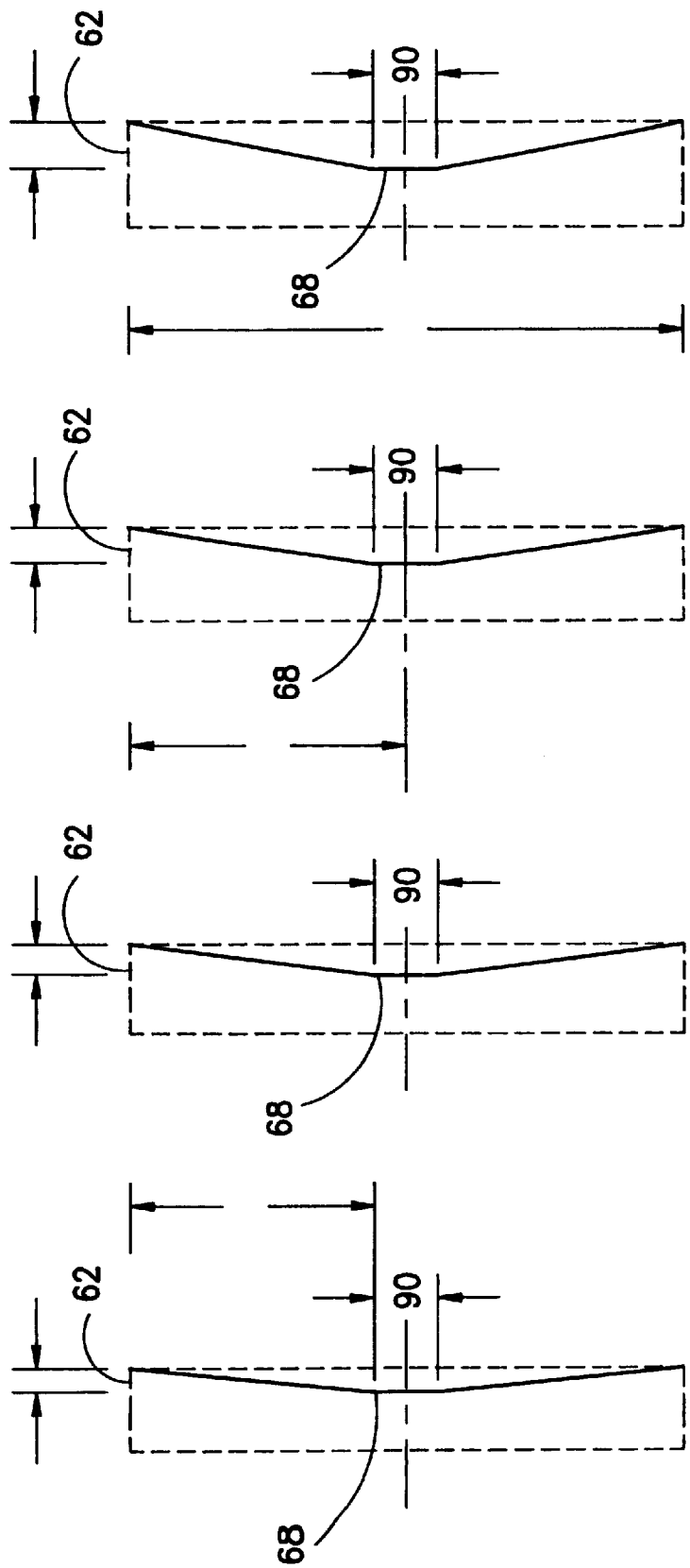

FOOTPRINT OF BEAM ON WEDGED SURFACE; RELAXED EYE, −1.75D CORRECTIVE LENS, 10MM CENTER APERTURE.
$\gamma = \text{TAN}^{-1}(1.005/9.68)$
$\gamma = 5.93°$
ANGULAR FOOTPRINT OF BEAM IN X DIRECTION $= 2\gamma = 11.86°$ Relaxed standard eye Relaxed eye & −1.75 D lens Accommodated standard eye Accommodated eye & +1.75 D lens Relaxed eye & −1.75 D lens
RAY ABERRATIONS (MILLIMETERS) ——————— 587.6 NM

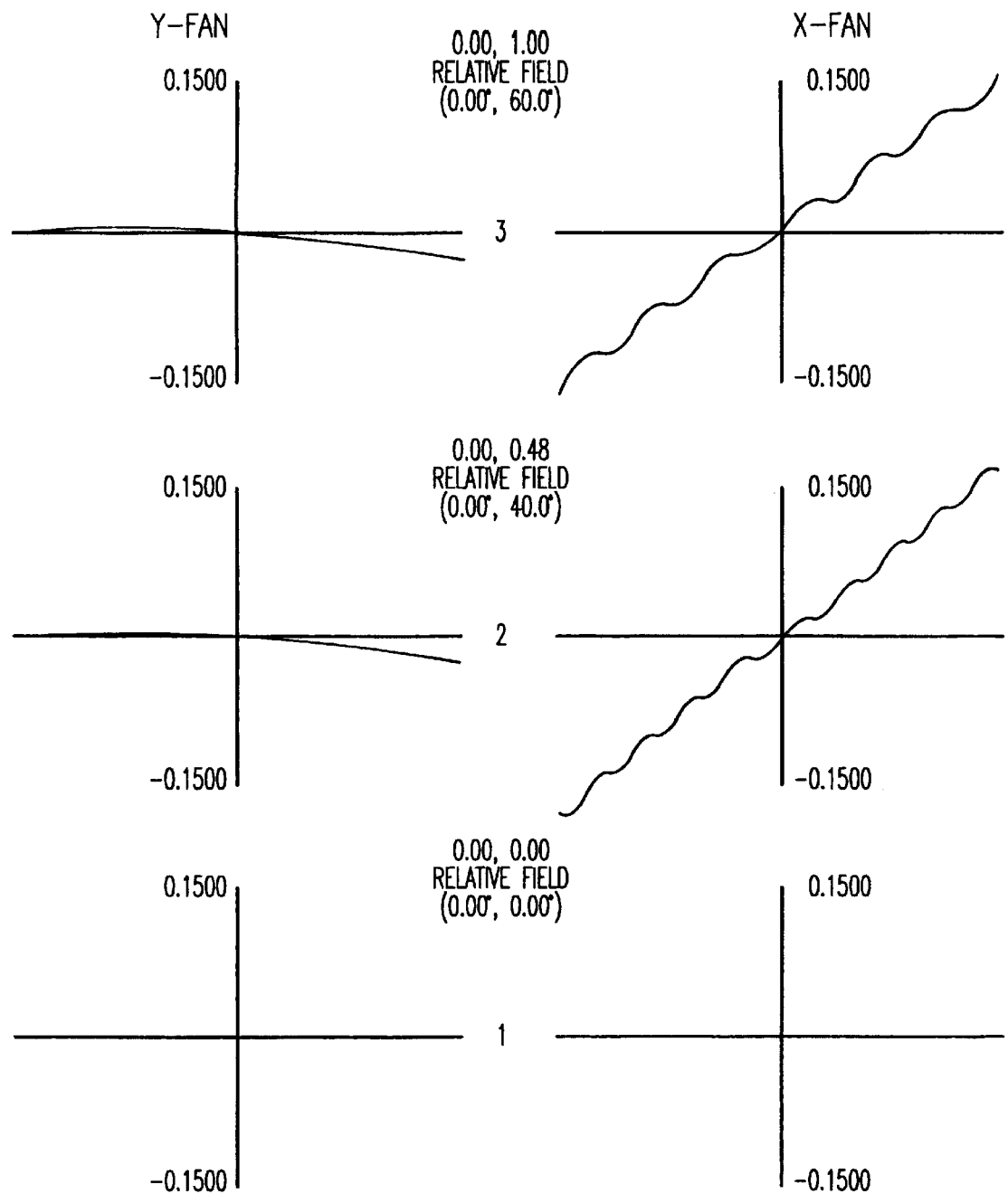
Relaxed 360,10mm CA
RAY ABERRATIONS (MILLIMETERS) ——————— 587.6 NM
FIG. 54

Change in image location for 360 lens on −1.75D corrective lens, relaxed eye, vertical object Change in image location for 360 lens on −1.75D corrective lens, relaxed eye, 45° object Change in image location for 360 lens on +1.75D corrective lens, accommodated eye, vertical object Change in image location for 360 lens on +1.75D corrective lens, accommodated eye, 45° object Change in image location for 360 lens on −6 D corrective lens, relaxed eye, vertical object Change in image location for 360 lens on −6 D corrective lens, relaxed eye, 45° object Change in image location for 360 lens on +6 D corrective lens, accommodated eye, vertical object Change in image location for 360 lens on +6 D corrective lens, accommodated eye, 45° object Relaxed eye & −6 D lens Relaxed eye & −6 D lens Relaxed 360, −6 D lens 12.00 MM Accommodated eye & +6 D lens Accommodated 360, +6 D lens, 10 mm CA 12.00 MM Accommodated 360 & thin +6 D lens

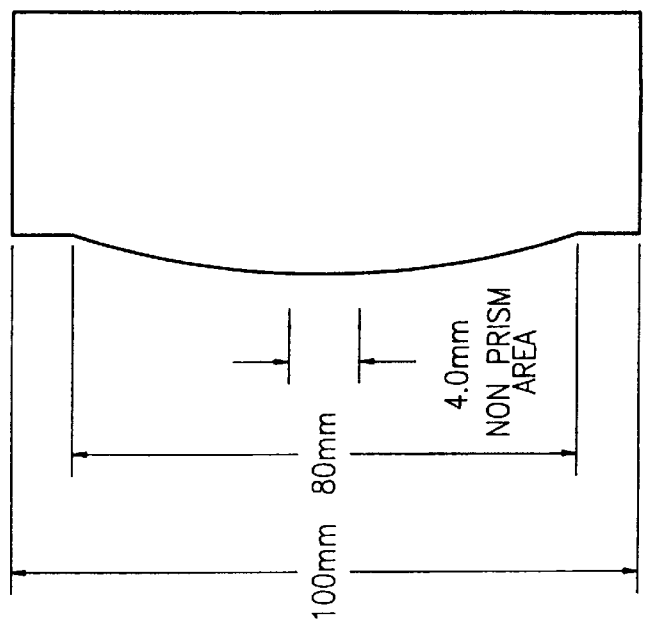
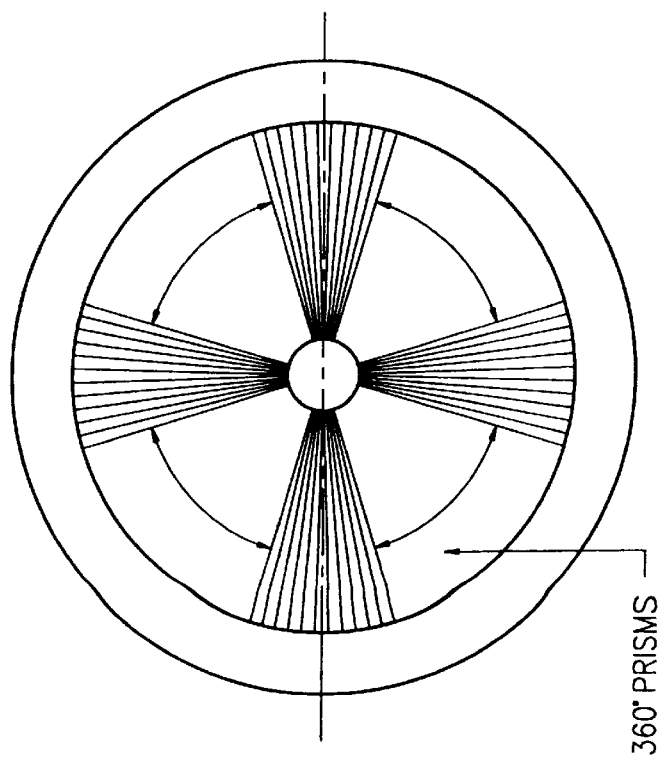
FIG. 82

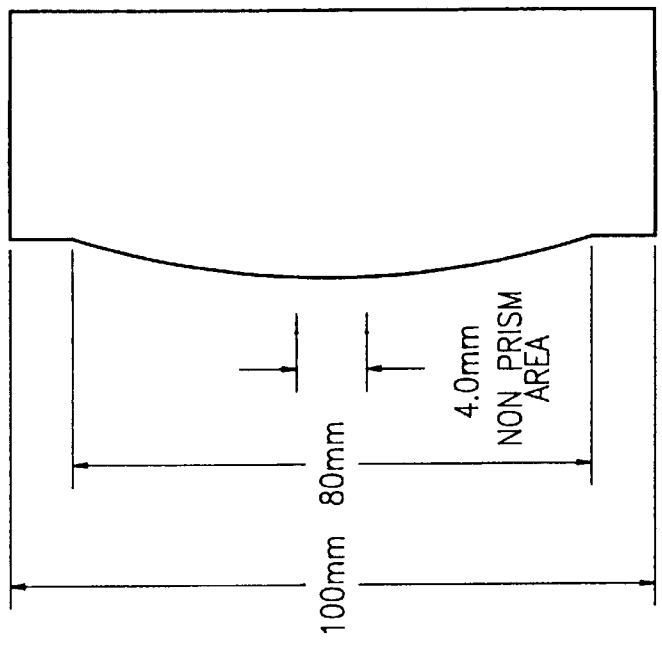
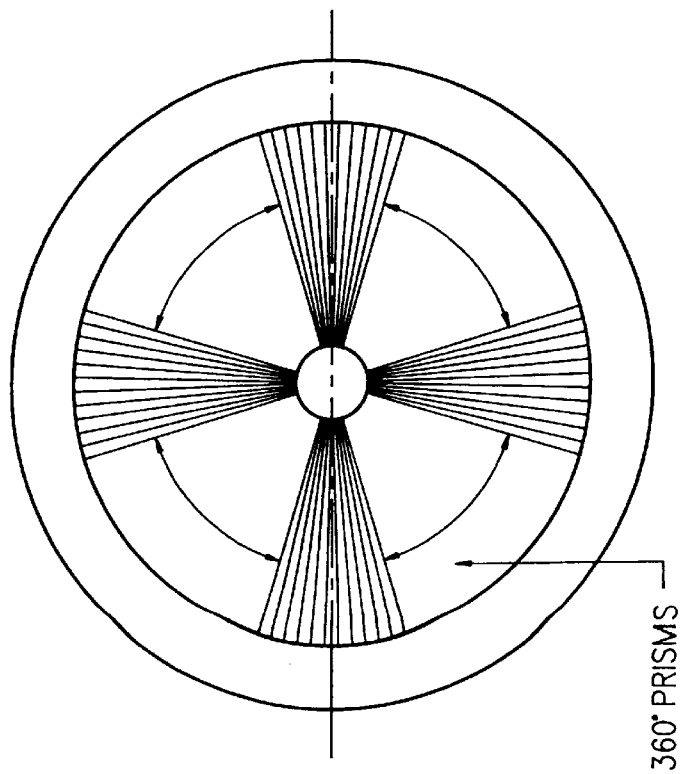
TYPICAL OPIR 360 MOLD FOR LOW VISION GLASSES
STAGE 2
100mm
80mm
4.0mm NON PRISM AREA
360° PRISMS
FIG. 89 ered by the prisms of the present invention.

MULTI PRISM IMAGE ENHANCING LENS SYSTEM AND METHOD OF MAKING SAME

TECHNICAL FIELD

The present invention generally relates to an image enhancing system employing a plurality of integral prismatic elements disposed on a lens member, and more particularly, to a prismatic lens having a plurality of integral prisms circumscribing a central non prism area, the prisms disposed in an apex in, base out orientation about the non prism area.

BACKGROUND ART

U.S. Pat. No. Re: 28,921 discloses an automatic visual sensitivity and blind spot measuring apparatus for projecting a spot at different locations on a screen to be viewed by the person being tested along with means for the person to indicate perception of the spot for subsequent evaluation.

U.S. Pat. No. 1,990,107 relates to a reflectoscope used in the examination of an eye. The reflectoscope includes mirrors for reflecting an image so that the eye can be observed in the correct orientation to prescribe lenses for correcting refractive dysfunctions.

U.S. Pat. No. 4,264,152 relates to an apparatus for moving an image of a target in certain preselected ways to stimulate predetermined types of eye movements.

U.S. Pat. No. 4,298,253 relates to an apparatus for presenting test images to a viewer at different distances without modifying the visual angle or acuity of the images.

U.S. Pat. No. 3,423,151 relates to auxiliary prismatic lenses mountable on an eye glass frame for use by persons having cataracts. The lenses extend the field of view of the person beyond that provided by ordinary lenses by focusing images beyond the range of the normal lenses onto the pupil of the eye.

U.S. Pat. No. 2,442,849 relates to a method for producing a pair of lenses for providing balanced binocular vision.

U.S. Pat. No. 4,772,113 relates to eyeglasses for improving the vision of people with macular degeneration, optic nerve damage or similar low vision problems, in which their central vision has deteriorated. The eye glasses include two lens assemblies, each having a magnifying lens with two convex surfaces and a reducing lens with two concave surfaces. The reducing lens incorporates a prism ring which shifts and focuses a highly intensified light image onto an undamaged peripheral portion of the retina. A disadvantage of these eye glasses is that the highly magnified and intensified light image would be focused on the bad or damaged peripheral portion of the retina. Another disadvantage of these glasses is that the lens do not have a central clear or non prism area for accommodating the person's good central vision. Also, in those instances where the highly magnified and intensified light image would strike the central functional area of the retina damage and/or overlapping would occur, resulting in a blind area or diplopia (double vision).

U.S. Pat. No. 4,673,263 relates to eyeglasses for enhancing the vision of people with macular degeneration, optic nerve damage, or similar low vision problems in which their central vision has deteriorated. The eyeglasses comprise of a single element prismatic lens with bifocal which unlike U.S. Pat. No. 4,772,113 which projects a strong magnified beam of light to the macula.

U.S. Pat. No. 5,155,508 relates to eyeglasses for enhancing the vision of people that have retinitis pigmentosa or glaucoma with constricted fields. The eyeglasses include three functional prisms and a non prism area spaced about a central portion. Two of the three prisms are oriented base out on the horizontal axis, the third prism is located on the lower vertical axis, base out, the non prism area is opposed to the third prism across the central portion.

U.S. Pat. No. 3,628,854 relates to a fresnel prism for special applications, such as diagnostic testing. The fresnel prisms are mounted to normal prescription corrected glasses by capillary action The capillary mounting is subject to air bubbling during temperature and humidity changes. The fresnel prisms have relatively poor light transmission and the multiple images transmitted or projected to the eye are blurred due to the many concentric prismlets that are pressed into the soft plastic. The fresnel prisms have a number of other disadvantages such as: projection of people in crowds when people move in all directions, this causes diplopia especially when the right eye looks to the right and the left eye is looking through the nasal edge of the left spectacle lens, this is also true when the eyes are looking to the left.

These multiple prismlets reduce light transmission, which reduces vision and causes night blindness and mobility problems. The multiple concentric prismlets cause many reflections of the same object, especially light bulbs, and hence, "one thousand points of light", which causes chromatic dispersion. Due to the number of multiple concentric prismlets, contrast is greatly reduced and patients are constantly looking through a fine grid. With fresnel prisms the patient must rotate their eye to look into the prism to see the expanded field.

U.S. Pat. Nos. 4,779,977 and 4,288,149 and *The Optician*, Volume 163, No. 4237, page 18, dated 1972 all relate to the concept of mounting or cementing small prismatic buttons or prisms to a patient's normal prescription corrected glasses. An exemplary reference of such small prisms are disclosed by Dr. Norman Weiss in the referenced *The Optician*. The primary disadvantages or difficulties associated with the use of such buttons and/or prisms is prism blur which is difficult to tolerate, creating confusion between frontal and peripheral images particularly in crowds where people are moving in all directions causing diplopia for the wearer.

An eye disease known as neovascular senile macular degeneration (N.S.M.D.) in which the central vision, (macula) is greatly impaired, often results in blindness by virtue of blood vessels growing and bursting in the macula of the eye.

A known eye glass modification intended to expand the central field of view for people having retinitis pigmentosa, glaucoma, hemianopia involves the amorphic telescope lens system, in which one or more telescopes are mounted on each eye glass. These telescopes minify the images so that more information can be seen at one time in the same field. Disadvantages of this form of field expansion is that multiple images are seen by each eye with the images approximately half size so that detail is lost. Also, the telescope(s) extend outwardly a significant distance from the eye glasses and are cosmetically very unappealing. These eye glasses with telescopes mounted are several times heavier than normal glasses making them uncomfortable to wear and constantly slipping from the wearer's ears and nose due to the generated torque.

Another known vision expanding lens in the prior art, involves the use of a see-through reflector or mirror, functioning as a beam splinter, mounted on the eye glass frame extending from the nose at a predetermined angle. The disadvantages of this type of vision expanding lens are that the eye glass wearer sees two separate images, front and rear which can be quite confusing. The mounting of the reflector or mirror to the eye glass frame is complicated, and results in the reflector or mirror mounted in an exposed position where it can be readily damaged and/or disoriented from the predetermined position.

Still another attempt to expand the field of persons with poor vision involves special high-powered magnifying glasses capable of magnifying an object up to six times, while allowing vision from the peripheral area to enter the eye. Disadvantages of this approach are that these glasses resemble goggles and protrude nearly three inches from the eye and nose. They must be worn with soft contact lenses, they are heavy and cumbersome, and cosmetically unappealing.

Therefore, a need exists for an image enhancing lens having a greater transmission of available light by reducing at least one of reflection, refraction and absorption of light by the lens. The need also exists for lenses for eyeglasses to enhance the field of view of persons suffering from retinitis pigmentosa, glaucoma with constricted fields, hemianopia, macular degeneration, myopia, nystagmus without the person suffering the problems and disadvantages of the prior known efforts to expand a person's field of view. A further need exists for inexpensive, light weight, single element prescription corrected eyeglasses with bifocal(s) that are cosmetically appealing. The need also exists for an image enhancing lens that can be readily employed in a variety of optical systems, wherein the energy transmission through the lens is enhanced without introducing significant aberrations.

DISCLOSURE OF THE INVENTION

The present invention includes a prismatic lens having a plurality of integral prisms on a lens member, wherein the prisms surround a non prism area in an apex in, base out orientation. Each prism is adjacent or contacting two other prisms to encompass the non prism area. The present invention may incorporate a number of alternative design parameters including formation on a conical, spherical or aspheric lens member. Further, the plurality of prisms may be disposed on an object side or an image side of the lens. The images thus passing through the lens are one to one, without minification, magnification or relocation. The prisms are understood to be prismatic elements functioning as a prism, though an integral portion of the lens.

In one embodiment, the prismatic lens member is employed in an ophthalmic prismatic corrected, image enhancing, vision enhancing lens, an ophthalmic lens, and includes 360 prisms with all apexes terminating toward the central non prism area of the lens. In the first embodiment, one of the object side and image side of the lens member is substantially defined by a generally spherical base curve.

The ophthalmic lens is a single element lightweight prismatic image enhancing lens, wherein the interface between adjacent prisms is substantially invisible to the naked eye. The lens may include a prescription curvature and bifocals as required to provide lenses for persons having at least one eye having a central visually sensitive functional area of the retina for receiving the normal central visual field of view and having at least a partial insensitive peripheral area of the retina.

Further, it is contemplated the ophthalmic lens may facilitate either a single vision prescription corrected lens or a bifocal vision prescription corrected lens or a non-prescription filtered enhancing eye wear to minimize ultra-violet rays. All refracted images through the lenses are real, normal full size without compression or minification. With the ophthalmic lens system having a prescription corrected prismatic lens there is no eye rotation or scanning to locate the expanded field, therefore there is no diplopia. That is, a unified field of the image is disposed along the optical axis and/or the optical axis of the eye of the patient to minimize diplopia. Except for bifocal or non-prism window lines there is substantially no prism lines visible on the lenses. The corrective prescription curvature may be formed on the lens member on either the object or image side of the lens. A mold and method for manufacturing such lenses is also disclosed. It is believed the problem of central vision impairment and blindness due to N.S.M.D. and other problems such as retinitis pigmentosa (tunnel vision), glaucoma with constricted fields, hemianopia are substantially overcome by the prescription corrected prismatic eye glasses of this embodiment.

Eye wear incorporating the present lenses are unlike any of the various Galalean, Ocutech telescopes, amorphic lenses, Fresnel prisms, small prisms, mirrors, buttons that are attached to a patient's normal prescription glasses. The fields provided by these optical aids are mon-ocular or have fields that are minified and require a patient to rotate their eye or scan their eye to look into a the small prism, button or mirror to view the enhanced field. While scanning or rotating their eye to look into the field enhancing prism their other eye follows, thereby loosing sight of any fringe objects and creating a diplopia condition.

In contrast, with the present lenses there is no eye rotation or scanning required and there is no diplopia. The lenses are refracted as single element lenses using standard trial frames or equivalent with standard trial test spheres to determine the best Rx value for each patient. For the present lenses all refracted images are real, normal and full size. There is no compression or minification of images.

In another embodiment, the image enhancing lens employs a lens member having a substantially conical base curvature. That is, the lens member may be configured in a substantially conical or frustum configuration, wherein an apex or upper plane defines the central non prism area and the plurality of prisms are located on one of an inside or outside surface of the lens member. That is, in this embodiment, rather than disposing the plurality of prisms on a spherical base curve, a substantially conical or frustum lens member is formed, wherein the apex of the lens member includes the clear aperture and the prism bases are spaced from the central aperture.

In yet another embodiment, the image or object side of the lens member include an aspheric curvature. Again, the integral prisms are disposed in an apex in, base out orientation to circumscribe the central non prism area. The prisms may be located on either the object or the image side of the lens member.

BRIEF DESCRIPTION OF THE DRAWINGS

FIG. 1 is a cross sectional view of a first embodiment of the prismatic lens.

FIG. 2 is a cross sectional view of a second embodiment of the prismatic lens.

FIG. 23 is a side elevation schematic of a six diopter lens.

FIG. 24 is a side elevation schematic of an eight diopter lens.

FIG. 25 is a side elevation schematic of a ten diopter lens.

FIG. 26 is a side elevation schematic of a twelve diopter lens.

FIG. 54 shows ray aberrations in the relaxed 360, 10 mm CA.

FIG. 82 illustrates a typical OPIR 360 mold for low vision glasses, Stage 2.

FIG. 89 illustrates typical OPIR 360 mold for low vision glasses, Stage 2.

BEST MODE FOR CARRYING OUT THE INVENTION

Figure 5:
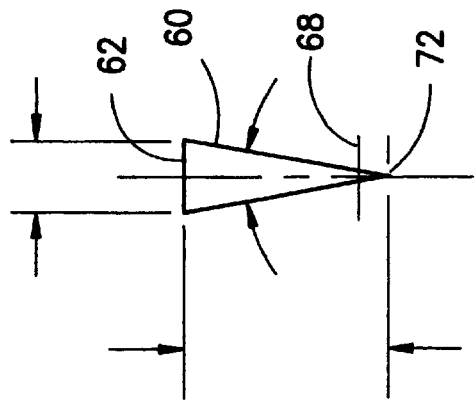
FIG. 5 is an enlarged top plan view of a single prism of the lens of FIG. 3.

Referring to FIGS. 1 and 2, an image enhancing lens 10 of the present invention is shown. The image enhancing lens 10 has an object side 12 and an image side 14, the light passing from the object side to the image side in normal operation of the lens. The lens 10 includes a lens member 30 having a multitude of integral and contiguous prisms 60 circumscribing a non prismatic area 90. The non prism area 90 is concentric with, or encompasses an optical center line of the lens member 30. Although the non prism area 90 is shown as a portion of the lens 10, it is understood the non prism area 90 may be formed as an aperture in the lens member 30. The non prism area 90 may be formed as a clear non prismatic aperture without corrective or image modifying characteristics. Each prism 60 has a base 62 and an apex 72, wherein an apex portion of each prism is defined by a truncation 68 of the prism proximal to the apex 72, thereby separating the apex 72 from the remaining portion of the prism 60. The truncation 68 is at an interface with the non prism area 90. Preferably, the prisms 60 are integrally formed with the lens member 30 to surround or circumscribe the central non prism area 90. Afthough some of the present embodiments are described in terms of 360 integral and contiguous prisms 60, it is understood the number of prisms may range from 3 to over 360, such as 720, 1080 or more. In each embodiment, the prisms 60 are contiguous as they circumscribe the non prism area 90.

Each prism 60 is adjacent, contiguous with or contacting two other prisms to encompass the non prism area 90. The lens 10 may incorporate a number of alternative design parameters including formation of the prismatic elements on the lens member 30 having a conical, spherical or aspheric base curvature. That is, the image enhancing lens 10 may be employed in a lens member 30, wherein at least one of the object and image sides 12,14 of the lens member is defined by a generally spherical base curvature, a generally conical base curvature, or an aspherical curvature. Further, the plurality of prisms 60 may be disposed on the object side 12 or the image side 14 of the lens 10. Within each construction, the number of prisms 60 as well as the diopter of each prism may be varied depending upon design and application considerations.

Spherical Embodiment

In the spherical lens member embodiment, the image enhancing lens 10 includes a lens member 30 having a front or object side 12 and a rear, image side 14. One of the object and image sides 12,14 includes a spherical base curvature and the remaining one of the object and image surfaces includes a plurality of integral, contiguous prisms 60 circumscribing the non prism area 90. The configurations are shown wherein the non prism area 90 encompasses the optical axis of the lens 10 and has a circular periphery. Therefore, the size of the non prism area 90 may be described in terms of an area diameter.

As shown in FIGS. 3–26, the prisms 60 are designed to have a base 62 and an apex 72. The prism 60 is initially designed to extend from the base 62 at the periphery of the lens member 30 to the apex 72 terminating at the optical axis of the lens member. In construction, the central area 90 is non prismatic and the prisms 60 are truncated at 68 at the periphery of the central area. That is, rather than terminating at an apex 72 at the optical center line of the lens member 30, the apex of the prism 60 is truncated so that the prism does not extend into the central area 90, and instead terminates at truncation line 68.

In a particular ophthalmic application of the lens 10, the contiguous prisms 60 circumscribing the central area 90 are employed prescription corrected prismatic glasses for the visually impaired and are true image enhancing lenses for low vision visually impaired patient. These glasses may be formed with or without bi focals.

In this configuration, the lens member 30 has a spherical base curvature and is formed with 360 integral contiguous prisms 60 disposed about the central area 90. Depending upon the construction of the prisms 60, the lens 10 may be used for those who are visually impaired, or those having normal full sight merely requiring normal prescriptive correction.

For those lens to assist the visually impaired the prism diopters are between approximately 6 and 16, with a preferred range of between approximately six and fourteen diopters. The non prism central area 90 has a diameter between approximately 4 mm and 14 mm. It is contemplated these lenses 10 may assist those suffering from age related macular degeneration, retinitis pigmentosa, glaucoma with open or constricted fields, macular degeneration, stargart's syndrome with macular degeneration, ushers syndrome with macular degeneration, hallgren's syndrome with macular degeneration, myopia, nystagmus, strabmus, albinism, and pre operative cataract problems.

A distinct diopter of the contiguous prisms 60 allows the lenses 10 to be employed in prescription corrected prismatic vision enhancing glasses for the normally full sighted patient are true vision enhancing glasses, again with or without bifocals, and provide approximately 25 per cent light transmission which brightens the images refracted onto the functional retina.

In a specific embodiment for the corrective lens for those of normal full sight, the lens 10 is a single element with a spherical base curvature, the prismatic lens again having 360, one degree prisms 60 in an apex 72 in, base out 62 orientation circumscribing the central area 90. While the lens blank has a spherical curvature, the lens member 30 may be edged to accommodate off the shelf ophthalmic lens holding frames. The diopters of the prisms 60 is between approximately two and four. The central non prism area 90 has a diameter between approximately twelve to sixteen millimeters, wherein preferred values are at approximately twelve, fourteen and sixteen millimeters. This configuration may also be formed to include bi focals. The prismatic lenses 10 enhance the normal corrected vision by providing twenty five percent more transmissible light to the functional retina than conventional ophthalmic lenses. The increased light transmission provides a brighter and sharper image to the functional retina and reduces or eliminates astigmatism.

These lens 10 may have application in medical diagnostic equippent, refractometers, phoropters, opthalmoscopes and associated ocular lenses, goldman perimeters, fundus cameras, trial test lenses, sporting telescopes and binoculars, optical manufacturing alignment equipment, optical lens bench testing equipment, microscopes, surveyors measuring scopes, camera lenses and axicon alignment equipment.

That is, in the spherical configuration, it is contemplated the multitude of prisms 60, and specifically, 360 prisms are ground and polished on the optical base curve side of a mold 120, and then the lens blank is molded with all apexes 72 terminating towards the optical center line of the lens member 30. As stated, the prism 60 diopter range is 2, 4, 6, 8, 10, 12 and 14 to compensate for testing and wearing the glasses for the various eye problems and normally full sighted patients as specified in the body of this patent.

The present glasses provide a unified refractive field and minimizes diplopia during there use by concentrating the unified field or images on the optical axis of the lens 10 as well as the optical center of the patient's eye or optical center of their functional retina.

During the refraction, the functional retina is placed precisely in the non prism section of the lens 10. This precise alignment provides a full binocular vision with bifocals if required. The present glasses are refracted and vision corrected for each patient. There is no patient training required to accommodate wearing the present prescription corrected prismatic glasses. To the wearer, the lenses 10 feel and wear as any normal prescription glasses. Except for the bifocals, there are no noticeable lines to be observed, cosmetically they look like normal every day prescription corrected eyeglasses.

The prisms 60 may be disposed on the image side 14 of the lens 10. Preferably, each of the prisms 60 has an equal size and exhibits an equal diopter. However, it is understood as discussed in the manufacture of the lenses 10, the diopter of the prisms 60 may be varied. The object side 12 of the lens 10 may be ground or formed to provide a prescriptive correction.

Figure 4:
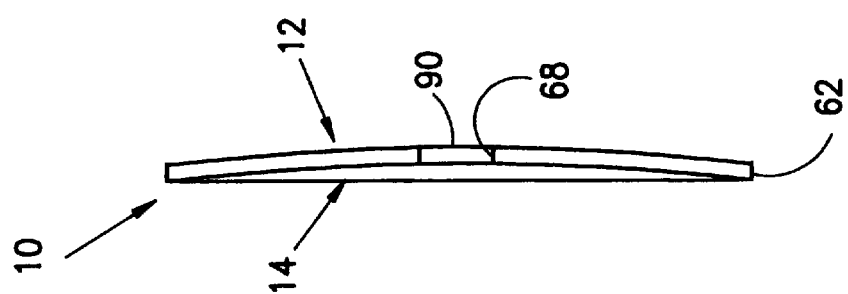
FIG. 4 is a cross sectional view taken along lines 4—4 of FIG. 3.
Figure 3:
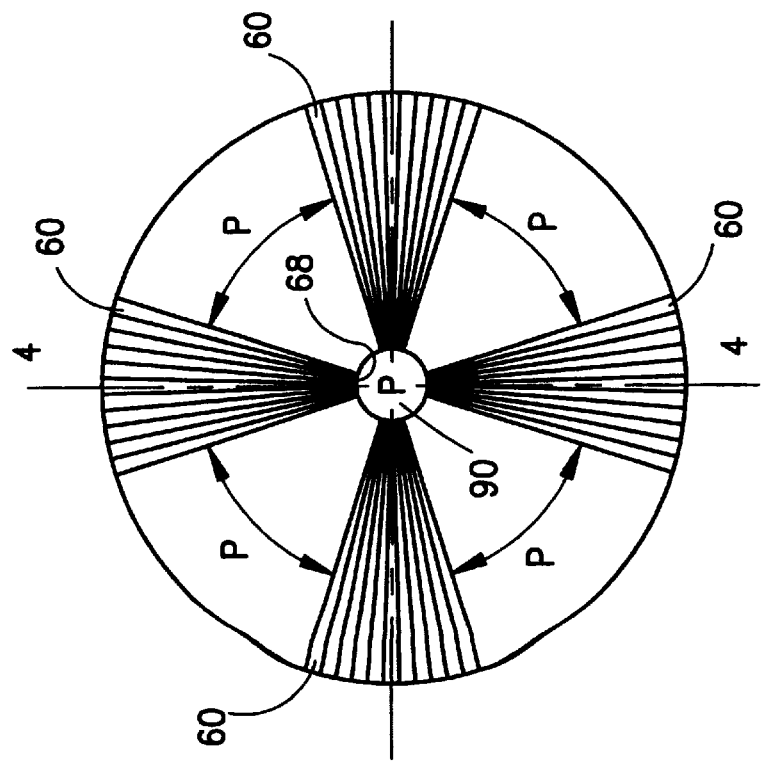
FIG. 3 is a is a top plan view of a lens having a plurality of integral six diopter prisms.

As shown in FIGS. 3–5, the prisms 60 may be formed with 6 diopters. The prisms 60 have a length of 37.5 mm from the apex 72 to the base 62, and sides of the prism contacting the adjacent prisms sweep an arc of 1 degree. The base 62 has a length of 0.655 mm. An optical center line of the prism 60 bisects the length of the base and the angle formed by the converging sides. As formed with the lens member 30, the prisms 60 are truncated proximal to the apex 72 at truncation line 68.

Figure 7:
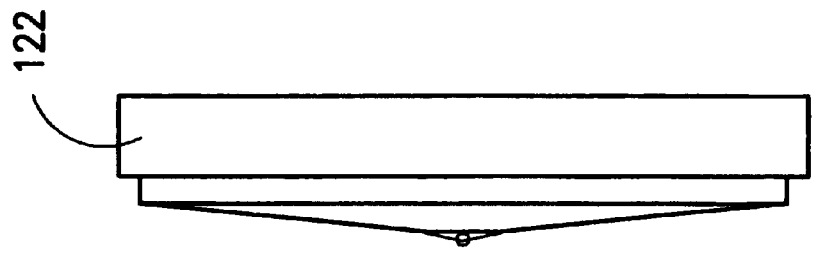
FIG. 7 is a cross sectional view taken along lines 7—7 of FIG. 6.
Figure 6:
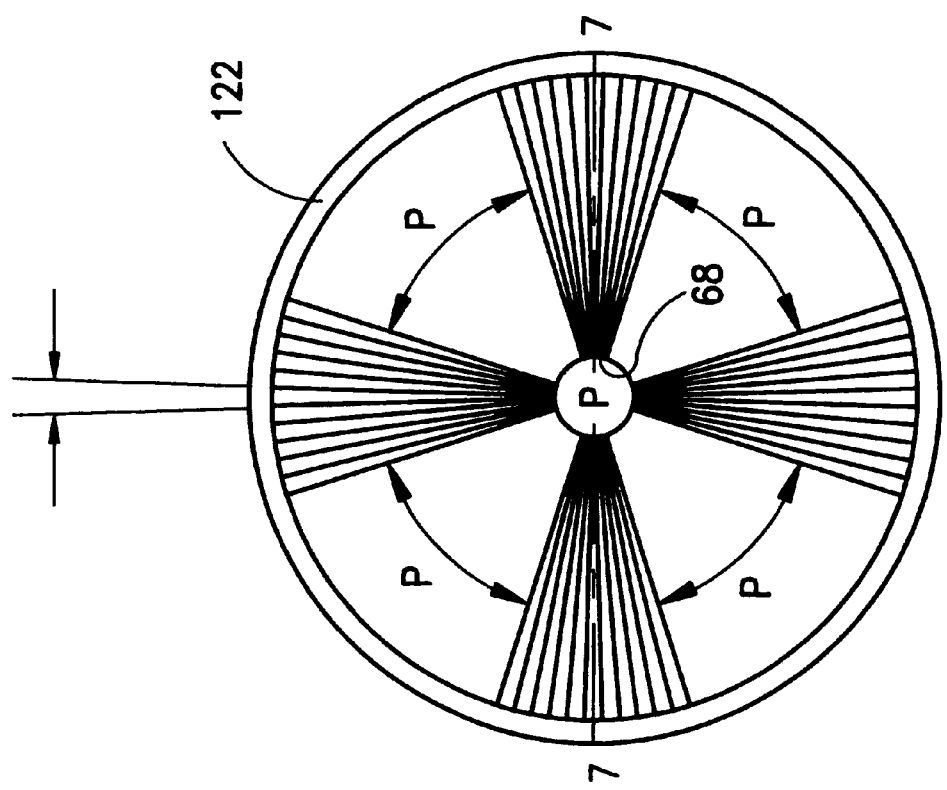
FIG. 6 is a top plan view of mold for forming a six diopter lens.

Referring to FIGS. 6–7, a mold 122 for the six diopter lens is constructed so that the apex 72 of each prism terminates toward the optical axis of the lens member 30. Further, the apex portion 72 of the prism 60 is truncated at 68 at the periphery of the central area 90. The mold 122 may be formed so that the non prism area 90 has a diameter of 3, 4, 5, 6, 8, 10, 12, 14 or 16 mm. The central area 90 is centered about the optical axis of the mold 122. The surfaces of the mold 122 forming the prisms are optically polished to 5 rings or better. The mold 122 has a diameter of 76 mm between bases of opposing prisms. The mold 122 has a height of 3.5 mm for the height of a prism base, with an overall diameter of 80 mm. The mold 122 may be formed of metal or glass, wherein upon use of glass molds the preferred material is shott glass BK-7 or equivalent with a tolerance of +/−0.10 mm.

Figure 10:
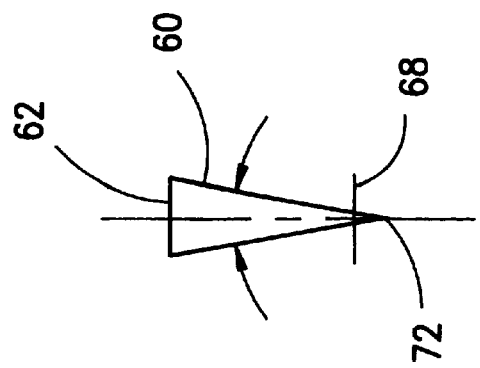
FIG. 10 is an enlarged top plan view of a single prism of the lens of FIG. 8.
Figure 9:
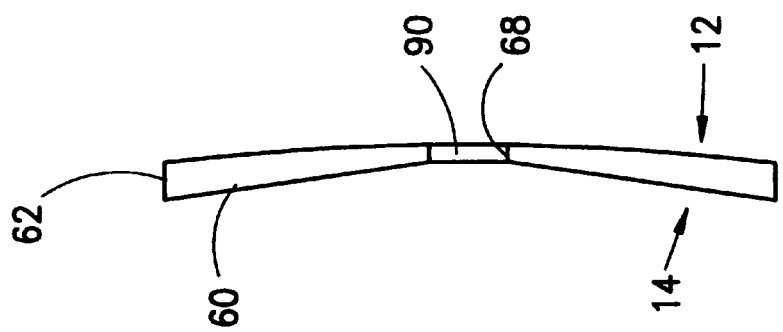
FIG. 9 is a cross sectional view taken along lines 9—9 of FIG. 8.
Figure 8:
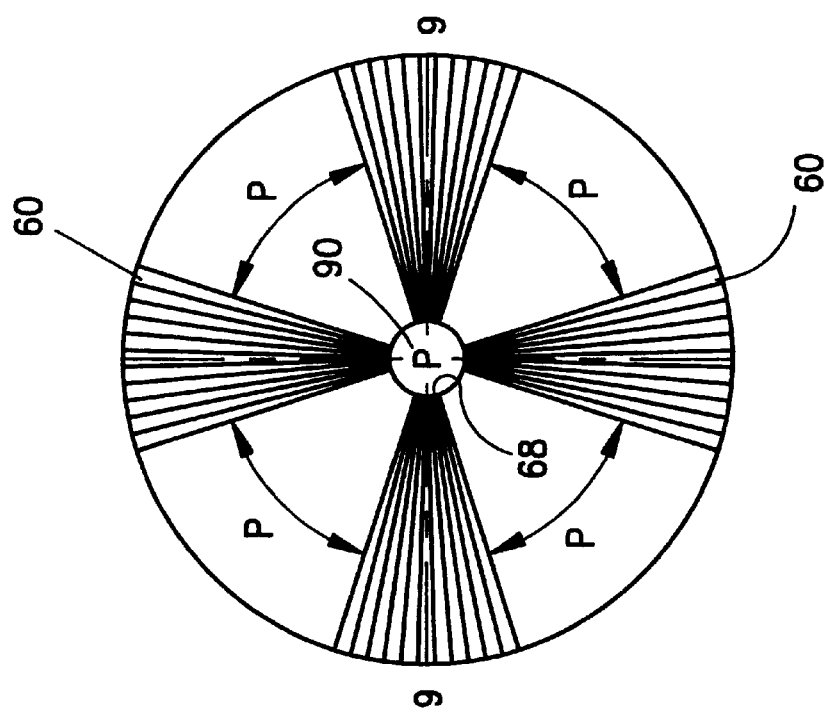
FIG. 8 is a is a top plan view of a lens having a plurality of integral eight diopter prisms.

As shown in FIGS. 8–10, the prisms 60 may be formed with 8 diopters. The prisms 60 have a length of 37.5 mm from the apex 72 to the base 62, and sides of the prism contacting the adjacent prisms sweep an arc of 1 degree. The base 62 has a length of 0.655 mm. An optical center line of the prism 60 bisects the length of the base 62 and the angle formed by the converging sides.

Figure 12:
FIG. 12 is a cross sectional view taken along lines 12—12 of FIG. 11.
Figure 11:
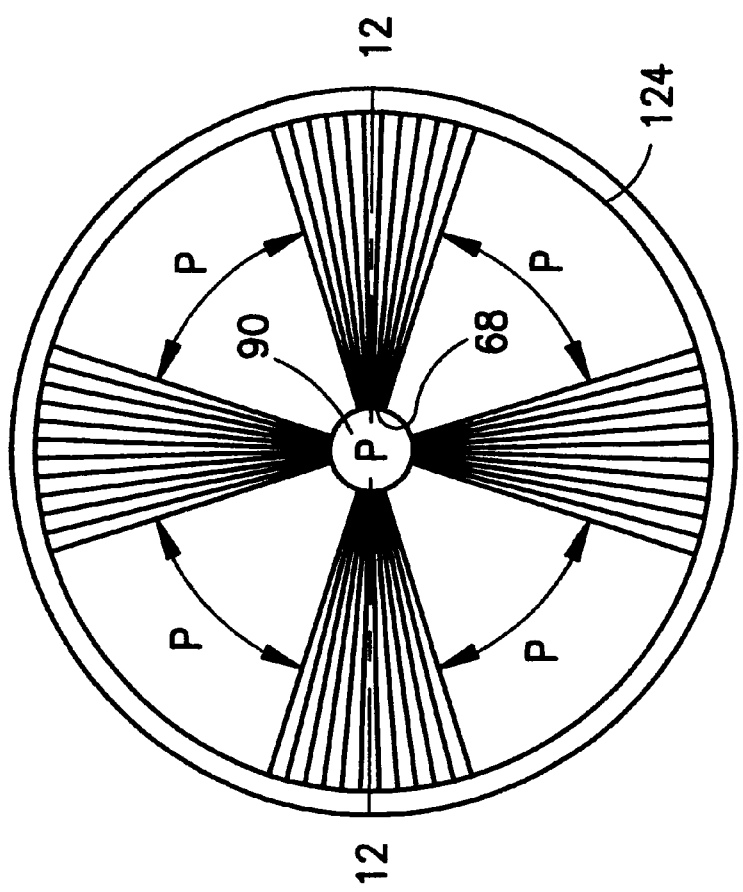
FIG. 11 is a top plan view of mold for forming an eight diopter lens.

Referring to FIGS. 11–12, a mold 124 for the eight diopter lens 10 is constructed so that the apex 72 of each prism 60 terminates toward the optical axis of the lens member 30. Further, the apex portion of the prism 60 is truncated at a knife edge 68 at the periphery of the central area 90. The mold 124 may be formed so that the central area 90 has a diameter of 3, 4, 5, 6, 8, 10, 12, 14 or 16 mm. The central area 90 is centered about the optical axis of the mold 124. The surfaces of the mold 124 forming the prisms are optically polished to 5 rings or better. The mold 124 has a diameter of 76 mm between bases 62 of opposing prisms 60. The mold 124 has an overall diameter of 80 mm.

Figure 15:
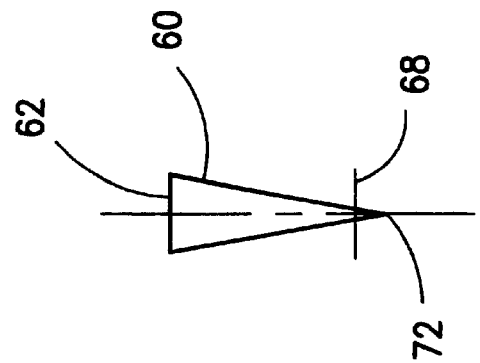
FIG. 15 is an enlarged top plan view of a single prism of the lens of FIG. 13.
Figure 14:
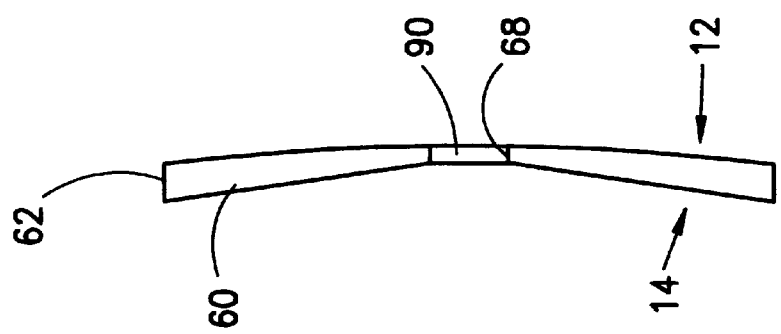
FIG. 14 is a cross sectional view taken along lines 14—14 of FIG. 13.
Figure 13:
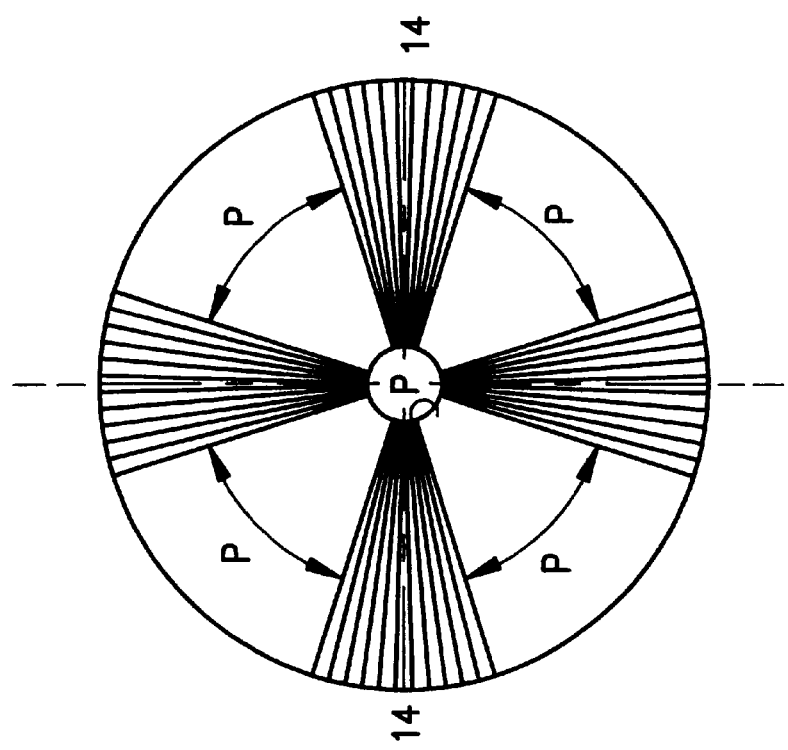
FIG. 13 is a is a top plan view of a lens having a plurality of integral ten diopter prisms.

As shown in FIGS. 13–15, the prisms 60 may be formed with 10 diopters. The prisms 60 have a length of 37.5 mm from the apex 72 to the base 62, and sides of the prism contacting the adjacent prisms sweep an arc of 1 degree. The base 62 has a length of 0.655 mm. An optical center line of the prism 60 bisects the length of the base 62 and the angle formed by the converging sides.

Figure 17:
FIG. 17 is a cross sectional view taken along lines 17—17 of FIG. 16.
Figure 16:
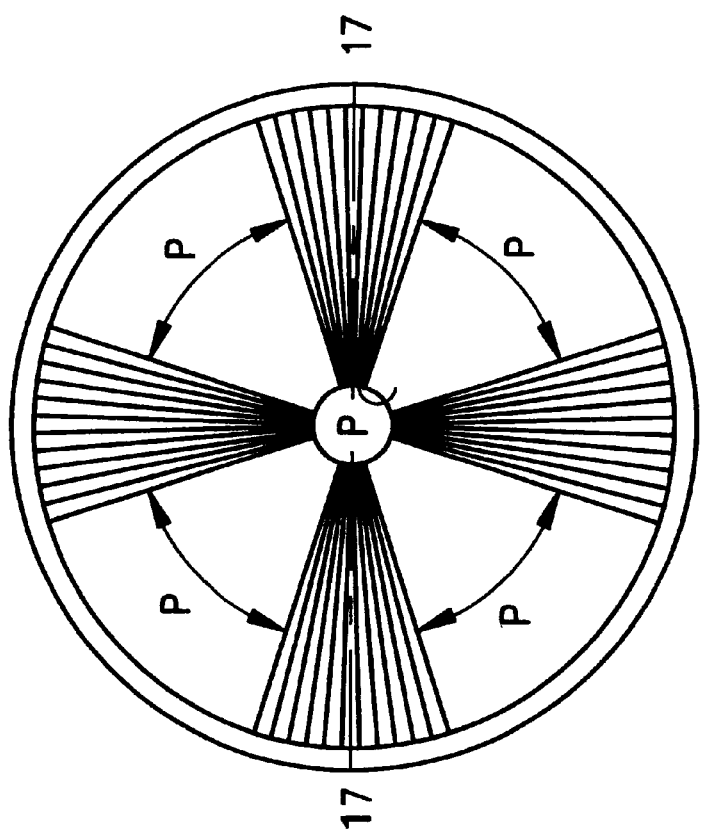
FIG. 16 is a top plan view of mold for forming a ten diopter lens.

Referring to FIGS. 16–17, the mold 126 for the ten diopter lens 10 is constructed so that the apex 72 of each prism 60 terminates toward the optical axis of the lens member 30. Further, the apex portion of the prism 60 is truncated at a knife edge 68 at the periphery of the central area 90. The mold 126 may be formed so that the central area 90 has a diameter of 3, 4, 5, 6, 8, 10, 12, 14 or 16 mm. The central area 90 is centered about the optical axis of the mold 126. The surfaces of the mold 126 forming the prisms 60 are optically polished to 5 rings or better. The mold 126 has a diameter of 76 mm between bases 62 of opposing prisms 60. The mold 126 has an overall diameter of 80 mm.

Figure 20:
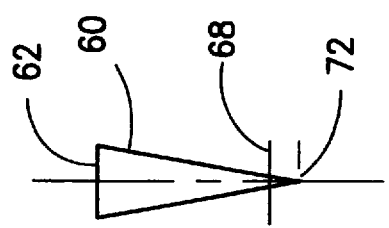
FIG. 20 is an enlarged top plan view of a single prism of the lens of FIG. 18.
Figure 19:
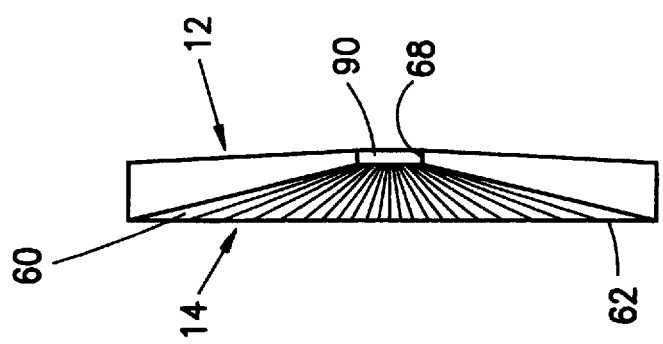
FIG. 19 is a cross sectional view taken along lines 19—19 of FIG. 18.
Figure 18:
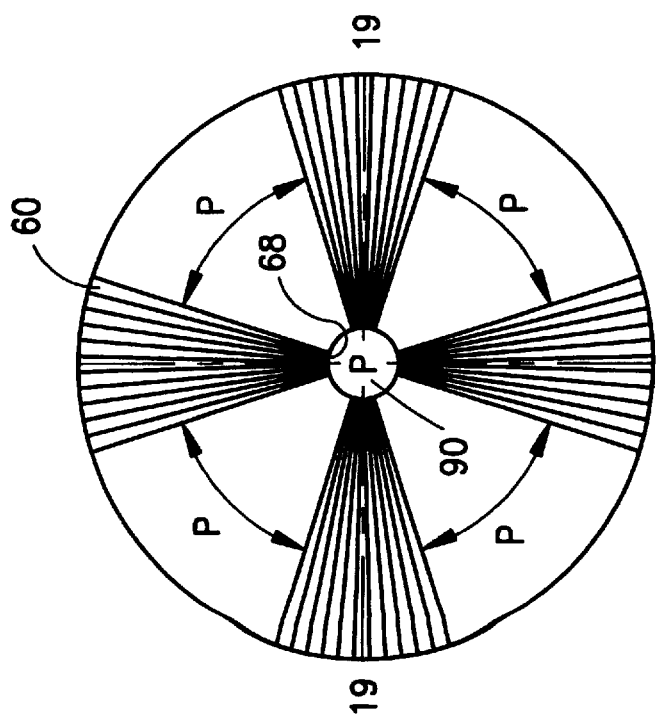
FIG. 18 is a is a top plan view of a lens having a plurality of integral twelve diopter prisms.

As shown in FIGS. 18–20, the prisms 60 may be formed with 12 diopters. The prisms 60 have a length of 37.5 mm from the apex 72 to the base 62, and sides of the prism contacting the adjacent prisms sweep an arc of 1 degree. The base 62 has a length of 0.655 mm. An optical center line of the prism 60 bisects the length of the base 62 and the angle formed by the converging sides.

Figure 22:
FIG. 22 is a cross sectional view taken along lines 22—22 of FIG. 21.
Figure 21:
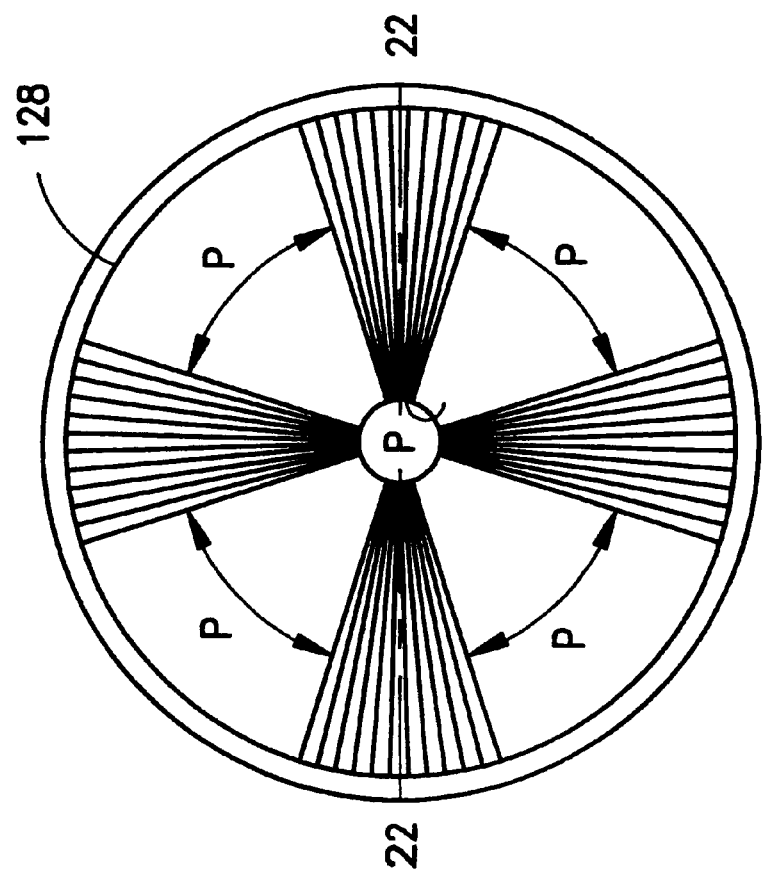
FIG. 21 is a top plan view of mold for forming a twelve diopter lens.

Referring to FIGS. 21–22, the mold 128 for the twelve diopter lens is constructed so that the apex 72 of each prism 60 terminates toward the optical axis of the lens member 30. Further, the apex portion of the prism 60 is truncated at a knife edge 68 at the periphery of the non prism area 90. The mold 128 may be formed so that the central area 90 has a diameter of 3, 4, 5, 6, 8, 10, 12, 14 or 16 mm. The central area 90 is centered about the optical axis of the mold 128. The surfaces of the mold 128 forming the prisms 60 are optically polished to 5 rings or better. The mold 128 has a diameter of 76 mm between bases 62 of opposing prisms 60. The mold 128 has an overall diameter of 80 mm.

Preferably, the lenses 10 are formed of an ophthalmic plastic, such as a CR-39 or equivalent, having an N value of 1.498 or better.

FIGS. 23–26 show the profile of lens blanks for lens member 30 and heights of prisms 60 for the six, eight, ten and twelve diopter configurations. The central area 90 is shown as 10 mm, however, it is understood the diameter of the central area may be any of the previously recited dimensions. The diameter of the lens member 30 is shown as 60 to 80 mm, with a nominal radius from the edge of the central area 90 to the periphery of the lens member of 30.00 mm.

Specifically, as shown in FIG. 23, in the six diopter embodiment the base 62 of a prism 60 in the six diopter prism has a height, (length along the optical axis of the lens member 30), of 3.42 mm, an angle between the object side of the prism and the image side of the prism of 6 degrees, and a designed length of 32.5 mm from the apex 72 to the base.

Referring to FIG. 24, in the eight diopter embodiment, the base 62 of a prism 60 in the eight diopter prism has a height, (length along the optical axis of the lens member 30), of 4.56 mm, an angle between the object side of the prism and the image side of the prism of 8 degrees, and a designed length of 32.5 mm from the apex to the base.

As shown in FIG. 25, in the ten diopter embodiment, the base 62 of a prism 60 in the ten diopter prism has a height, (length along the optical axis of the lens member 30), of 5.73 mm, an angle between the object side of the prism and the image side of the prism of 10 degrees, and a designed length of 32.5 mm from the apex to the base.

Referring to FIG. 26, in the twelve diopter embodiment, the base 62 of a prism 60 in the 12 diopter prism has a height, (length along the optical axis of the lens member 30), of 6.90 mm, an angle between the object side of the prism and the image side of the prism of 12 degrees, and a designed length of 32.5 mm from the apex to the base.

Figure 27:
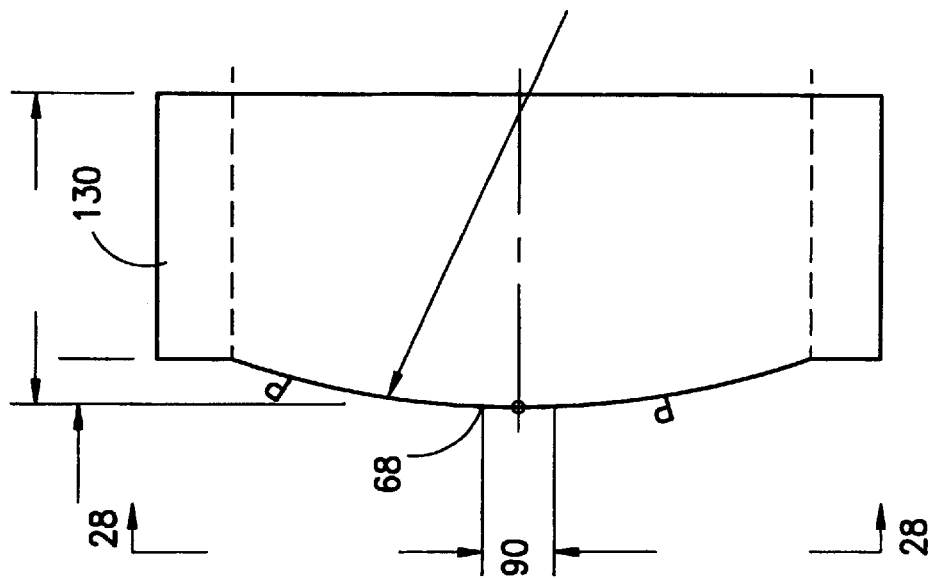
FIG. 27 is a cross sectional view of a lens mold for a six diopter lens.
Figure 28:
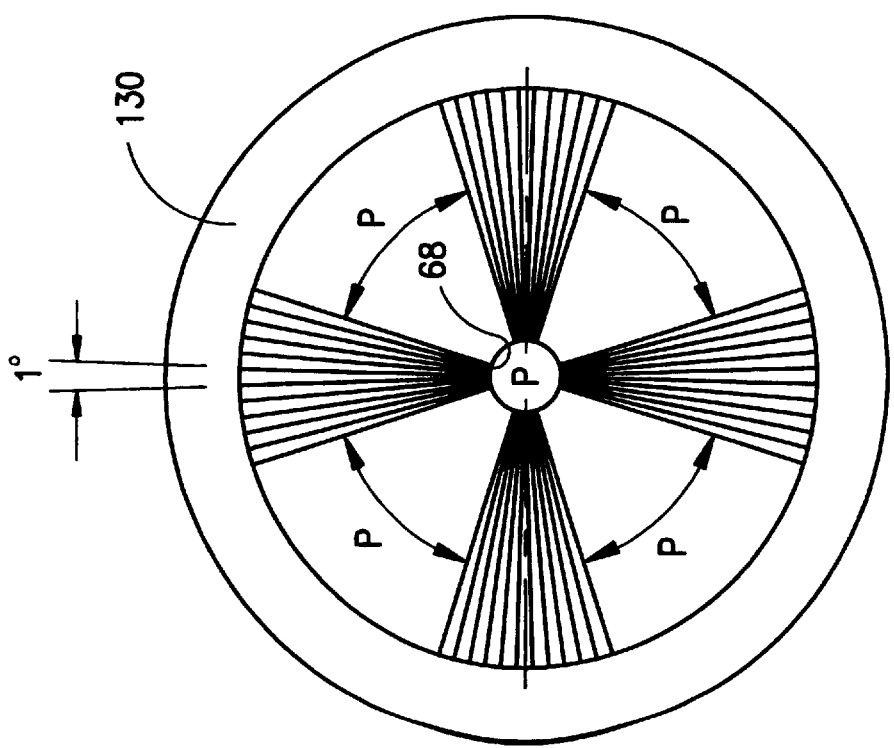
FIG. 28 is a top plan view along line 28—28 of FIG. 27.

FIGS. 27–28 show a mold 130 for forming a prismatic lens 10 in an ophthalmic configuration. Specifically, the base curve of the mold 130 defines a dimension along the optical axis of 5.66 mm, and a 4 mm diameter central non prism area 90. The surfaces forming the prisms are optically polished to 50 nanometers. The mold material may be copper OFHC coated with electroless nickel. Although the prism apexes 72 are designed to terminate at the optical axis of the lens member 30, the prisms 60 are truncated at 68 at the periphery of the central area 90 at a knife edge. That is, the prisms 60 terminate at the periphery of the central area 90, but are designed as though extending to the optical axis of the lens member 30.

Figure 31:
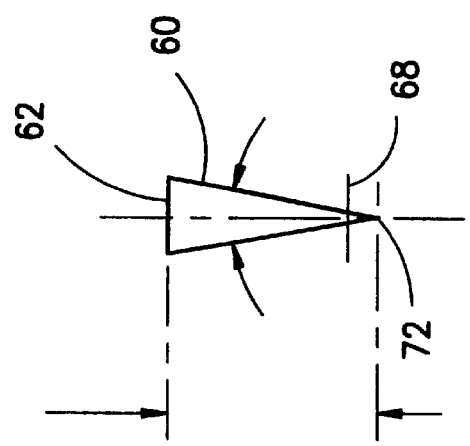
FIG. 31 is an enlarged top plan view of a single prism of the lens of FIG. 29.
Figure 30:
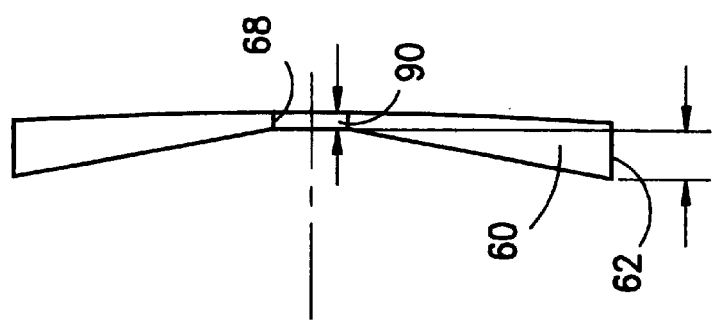
FIG. 30 is a cross sectional view taken along line 30—30 of FIG. 29.
Figure 29:
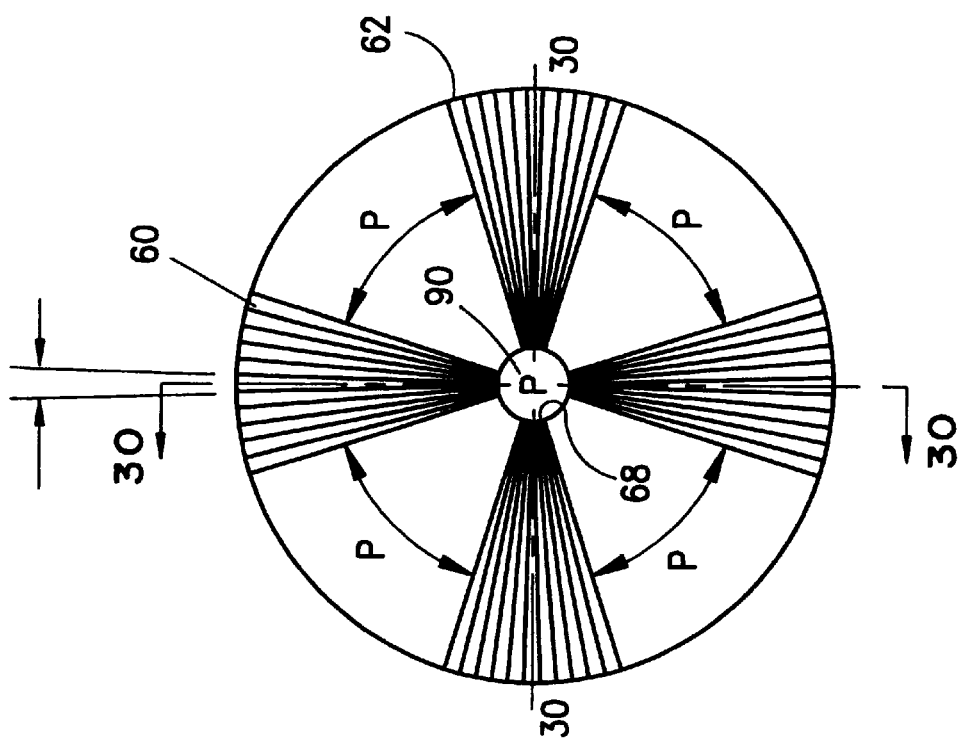
FIG. 29 is a is a top plan view of a lens having a plurality of integral prisms.

As shown in FIGS. 29–31, the lens member 30 has a diameter of 80 mm and includes integral, contiguous 12 diopter prisms 60. Though the prescription curve is shown on the object or front side 12 of the lens 10, it is understood the prescription curve may be formed on the image or rear side 14 of the lens member 30 with the prisms formed on the object or front side. In the shown configuration, the lens member 30 is formed with the base spherical curvature on the image, rear side 14 of the lens 10, with the 360 prisms 60, each prism sweeping on degree, wherein the base of the 12 diopter prism has a dimension of approximately 6.9 mm along the optical axis of the lens member, a clear area 90 having a 4 mm diameter, and a thickness of the clear area of 2.00 mm along the optical axis of the lens. A given prism 60 has a distance from the apex 72 to the base 62 of 40 mm and the converging sides that contact the adjacent prisms sweep an angle of 1 degree. The base 62 thus has dimension of 0.698 mm. The lens 10 is preferably formed of ophthalmic plastic, CR-39 or equivalent having an N value of 1.498 or better. Further, all the surfaces through which an images passes must meet the optical requirement of the American National Standards for ophthalmic plastic.

Figures 32, 33:
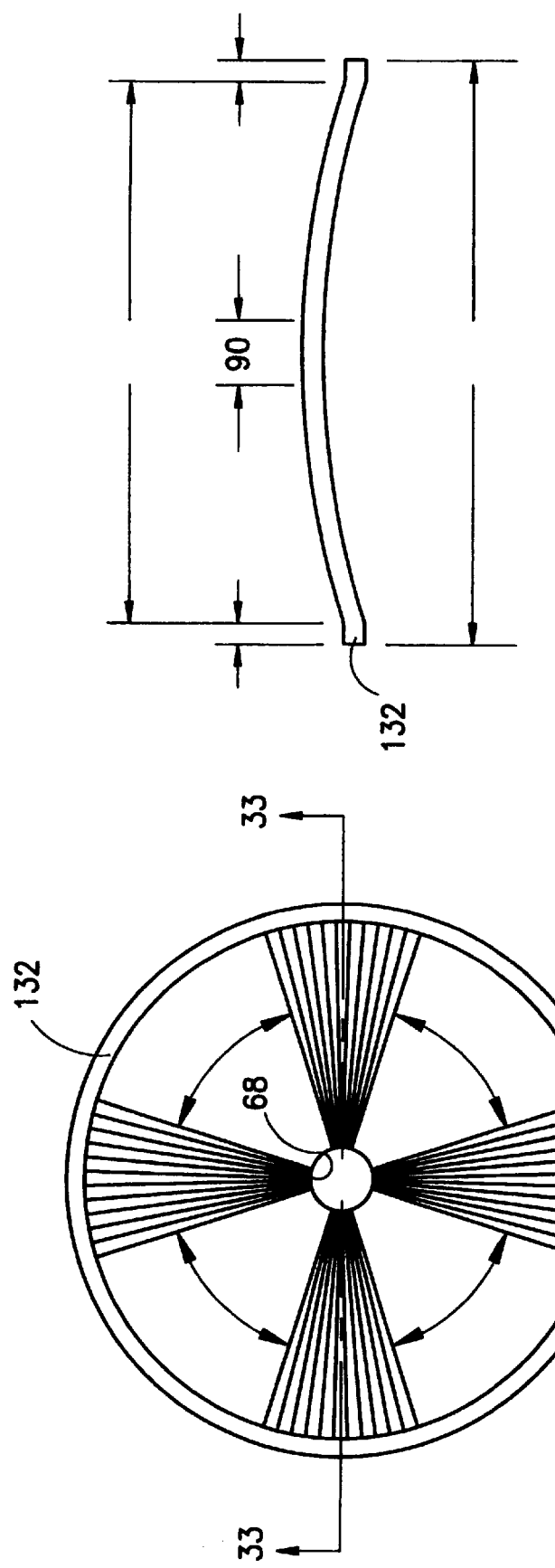
FIG. 32 is a top plan view of a mold for forming a lens having a multitude of integral prisms.
FIG. 33 is a cross sectional view taken along line 33—33 of FIG. 32.

As shown in FIGS. 32–33, a mold 132 for forming the prismatic lens member 30 is disclosed. The mold 132 includes surfaces for forming 360 integral prisms 60, wherein the apexes 72 of the prisms 60 are truncated at 68 to circumscribe the central area 90. The central area 90 has a diameter of 4 mm, the overall diameter is 85 mm, wherein the peripheral flange has a radius of 2.5 mm and the element has a thickness of 1.2 mm.

Figure 35:
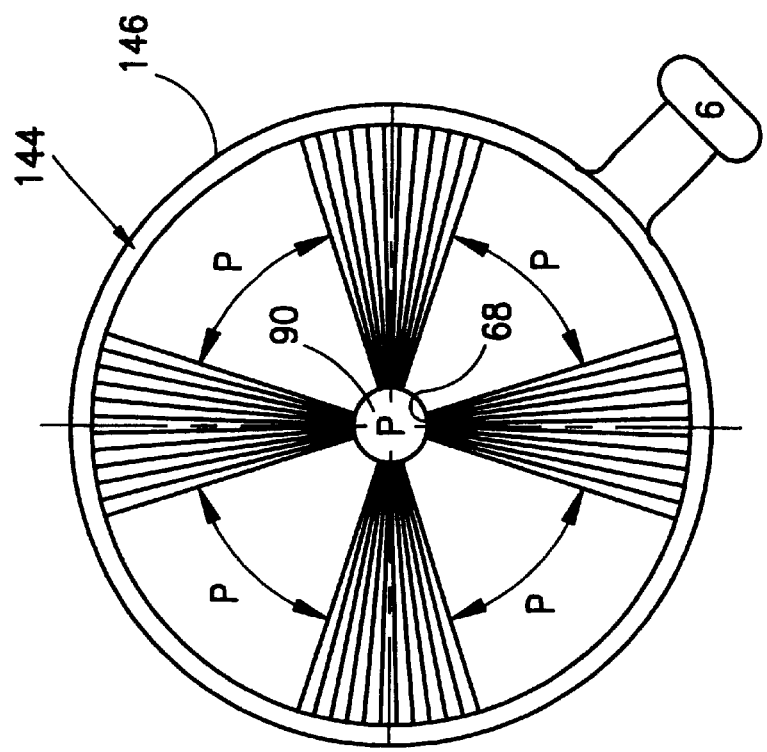
FIG. 35 is a top plan view of a right trial test lens incorporating the image enhancing lens.
Figure 34:
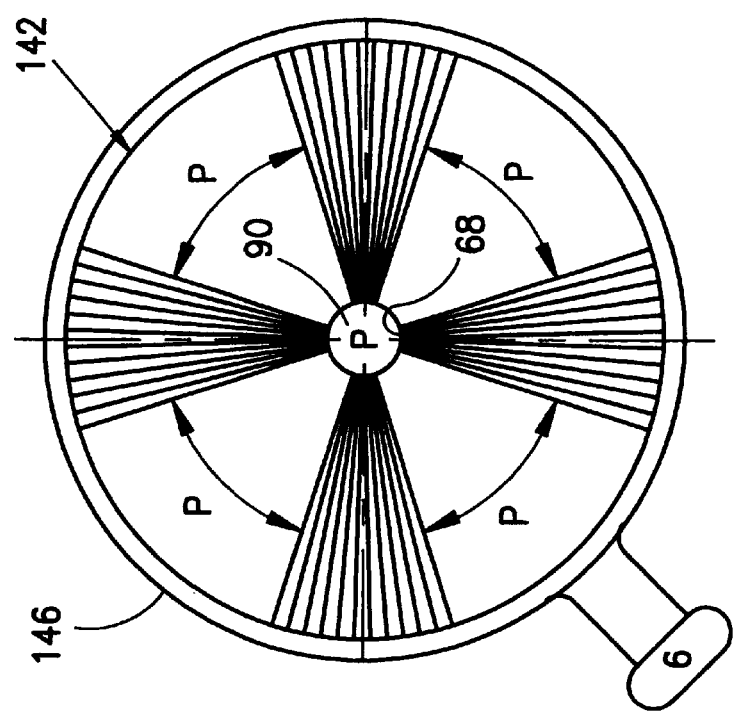
FIG. 34 is a top plan view of a left trial test lens incorporating the image enhancing lens.

Referring to FIGS. 34–35, typical left and right field expanding trial test prisms 142, 144 for low vision refracting is disclosed. The particular diopter of the shown test set is six. However, it is understood the value may be any of those previously discussed. The test lens 142, 144 are sized to be retained within a standard 38 mm sphere retainer ring 146, with the diopter and central aperture diameter stamped or marked on a handle of the set. The optical surfaces are polished.

In addition to the ophthalmic constructions, the prismatic lenses may be constructed without prescriptive correction surface. That is, the increased light transmission by the prismatic lenses enhances the images of commercial imaging systems including telescopes and cameras.

Figure 37:
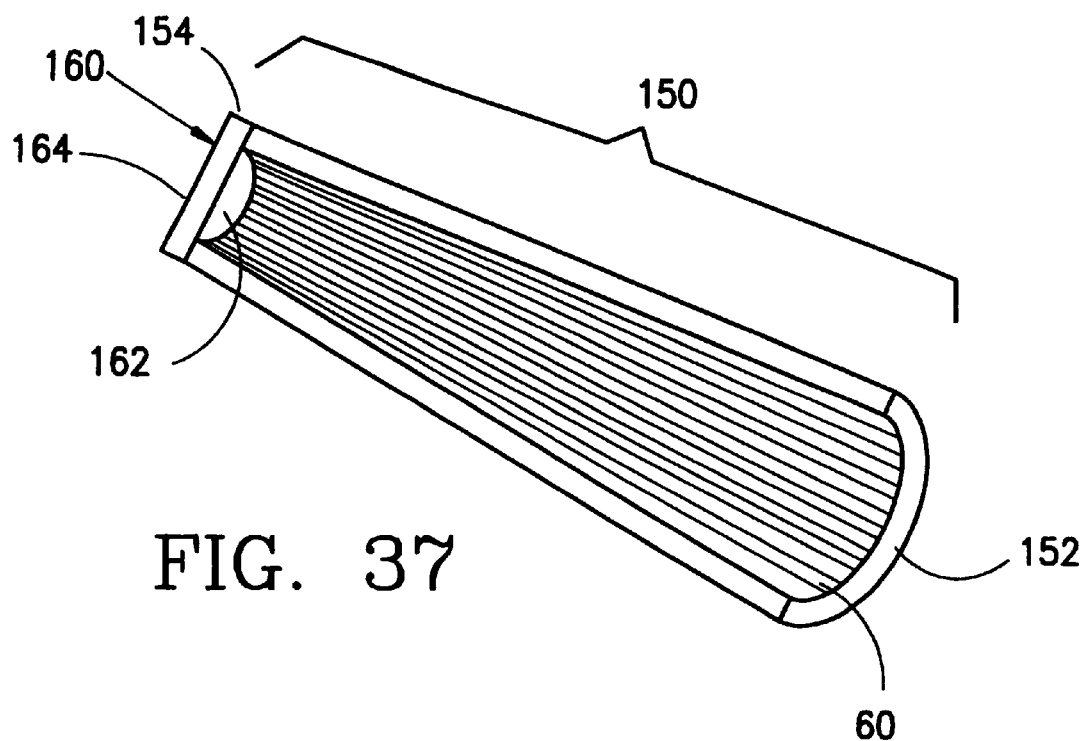
FIG. 37 is a cross sectional view of a conical embodiment of the image enhancing lens.
Figure 38:
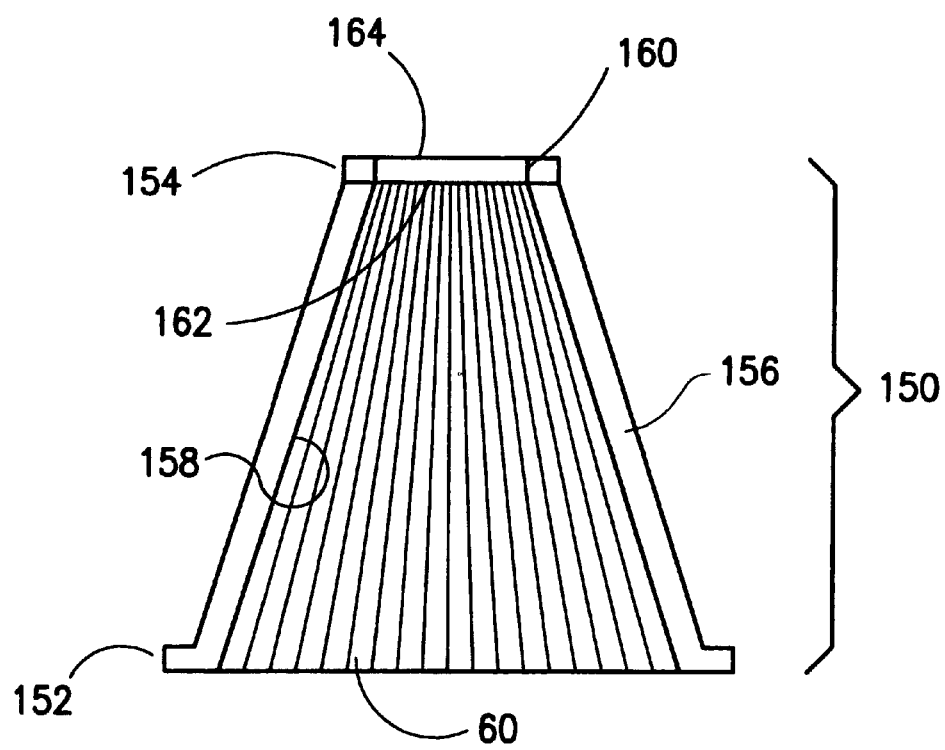
FIG. 38 is a cross sectional view of a conical embodiment of the image enhancing lens.

Conical Embodiment Referring to FIG. 2, the conical embodiment is shown. In the conical embodiment, the lens member 30 defines a frustum 150 having a first end 152 and a second smaller end 154. The frustum 150 has an outer surface 156, an inner surface 158, a cap 160 at a converging end 154 of the frustum. The cap 160 has an inner cap surface 162 and an outer cap surface 164. In the configuration shown, the prisms 60 are formed on the inner surface 158, so that light passes from the open end 152 of the frustum 150 along the converging length of the frustum to exit through the cap 160 in a parallel orientation. The light rays have a first density as they enter the conical lens, then as the light rays are converged and exit the lens through the smaller cap, the energy density is greater. Again, in the design of lens 10, and mold, the virtual location of the prism apex 72 is beyond the cap 160. That is, a conical lens is formed, and a portion of the cone is truncated along a plane parallel to the base of the cone. FIGS. 37 and 38 also illustrate various configurations of the conical lens 10.

In the conical embodiment, the lens 10 is not a light pipe, but an actual optical lens having a controlled focus. The conical lens concentrates the light beam as it passes through the lens, thereby increasing the energy density of the beam. Preferably, the lens is totally internally reflective. A lens aperture in the cap 160 is used to control or regulate the diameter of the exiting beam. The cap 160 may be formed to function as a divergent lens, having a specific radius dictated by the intended operating environment. The specific diopter of the prisms 60 is selected to control the focus and focal length of the exiting beam, as required by ultimate operating environment of the lens.

Figure 36:
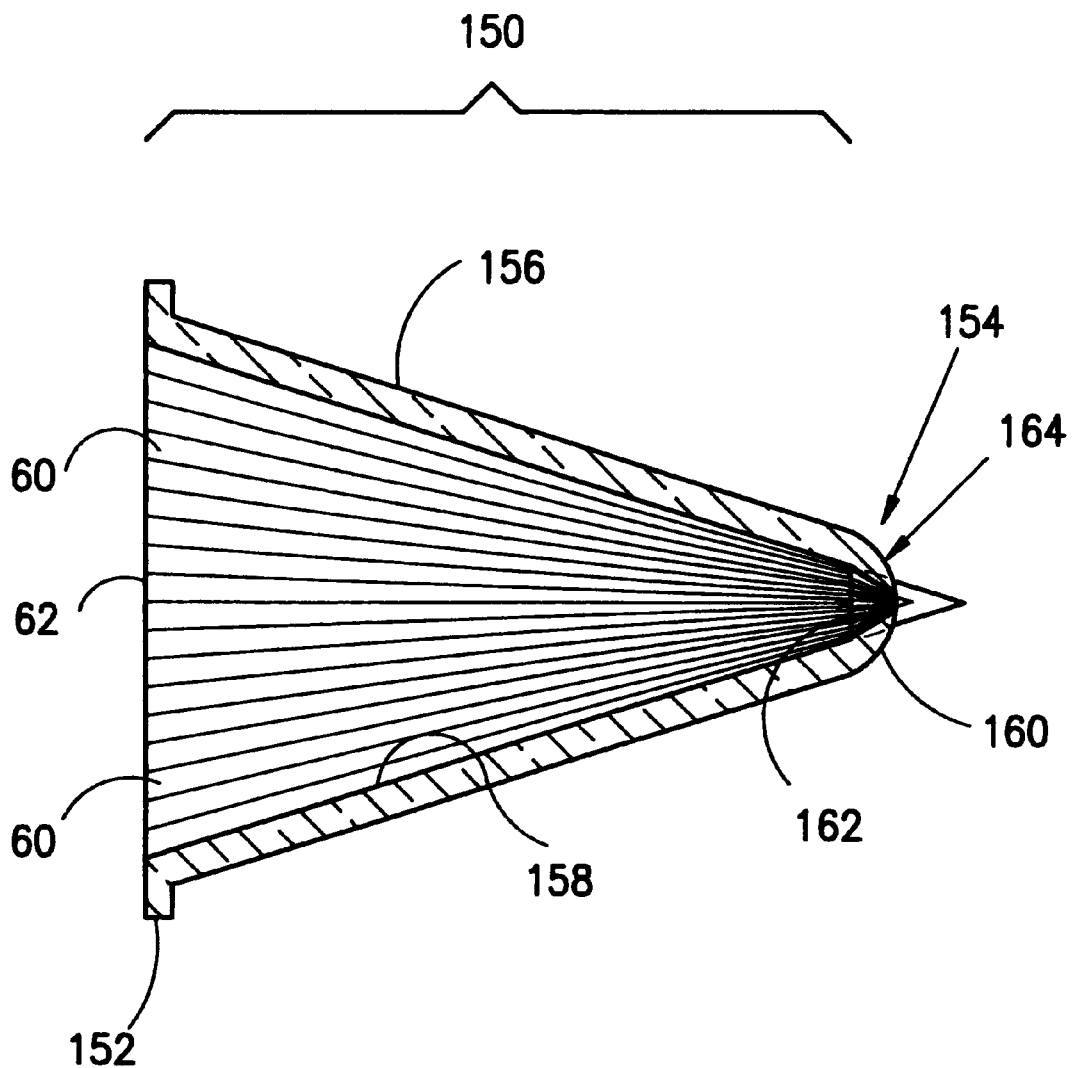
FIG. 36 is a cross sectional view of a conical embodiment of the image enhancing lens.
Figure 39:
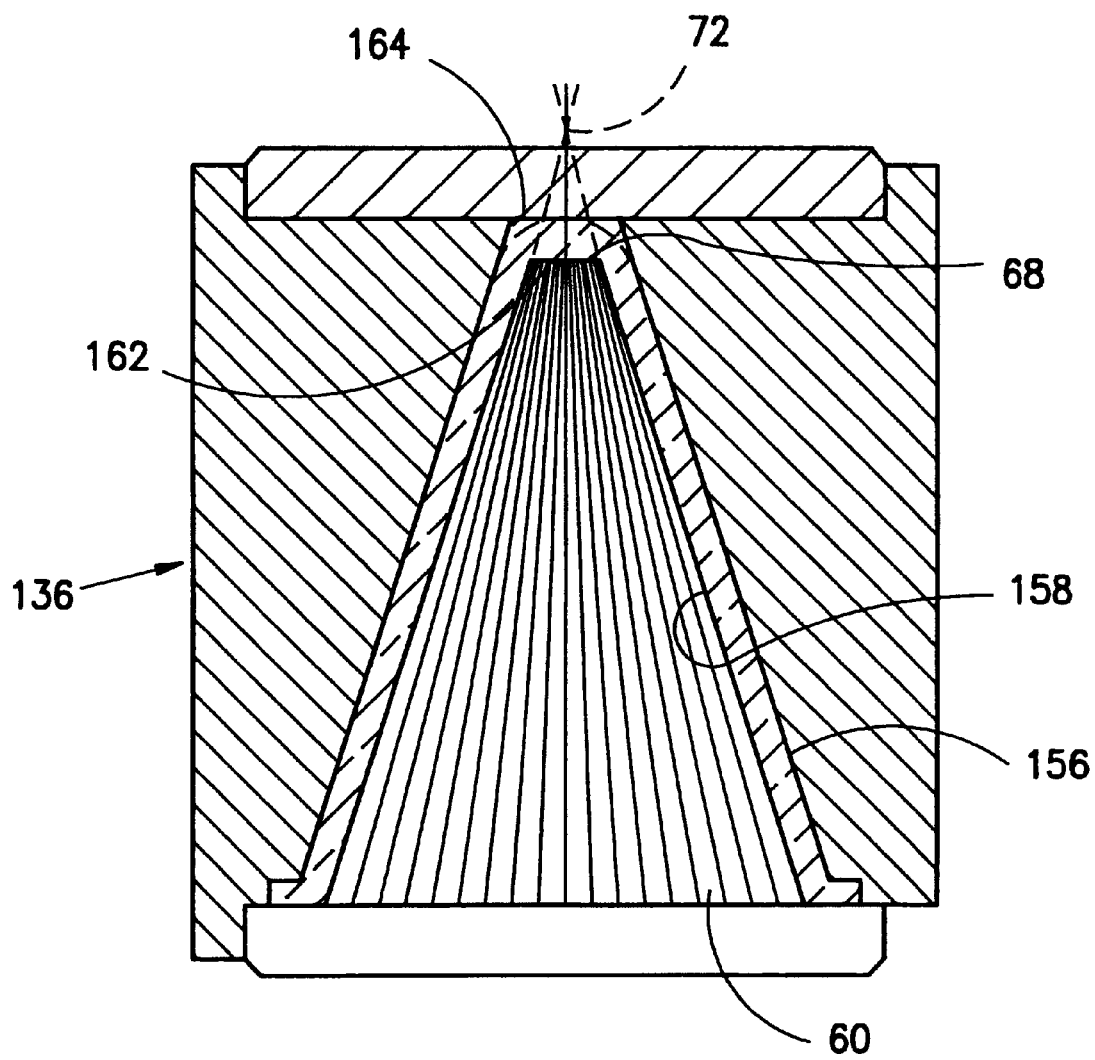
FIG. 39 is a cross sectional view of a conical lens and mold for forming prisms on an inner surface of the conical lens.

In the conical embodiment, the image enhancing lens 10 includes a lens member 30 having a conical base curvature, the plurality of integral prisms 60 on a surface of the lens member 30 and a central non prism area 90. The central area 90 is located at the top of the frustum and includes the optical center of the conical lens member. The central area 90 may have a diameter as small as one thousandth of an inch. It is contemplated the area 90 may have a diameter up to 16 mm. As shown in FIGS. 36 and 39, the virtual prism apexes are designed to terminate at the optical axis of the lens member 30 and beyond the end 154 of the frustum 150 and the cap 160. An angle between the optical axis of the lens member 30 and the outer surface of the cone may range between 5 degrees to 85 degrees.

The prisms 60 may be disposed on the object side or the image side of the lens, as. dictated by operating parameters. Each prism 60 has a base 62 and a virtual apex 72 and a truncated line 68 where the prism terminates at truncation 68 at the periphery of the central area 90. Preferably, each of the prisms 60 has an equal size and exhibits an equal diopter. However, it is understood as discussed in the manufacture of the lenses 10, the diopters may be varied. In a preferred construction, the lens member 30 has 360 prisms 60 disposed about the central non prism area 90, wherein each prism is truncated 68 at or adjacent the central non prism area and the base 62 of each prism is radially spaced from the central area to dispose the truncation 68 intermediate the base and the central area. , A mold 136 for forming a conical lens 10 is shown in FIG. 39. The mold 136 has a multitude of prism forming surfaces that define the inner surface 158 of the finished lens. The mold 136 forms a conical cavity which is filled with the lens material, and the outer surface 164 of the cap may be subsequently radiused as dictated by the intended operating environment. The virtual convergence of the prism apexes 72 is shown by the dotted lines extending above the cap 160. FIG. 36 also shows the virtual convergence of the prism apexes 72, and the truncation 68. In the mold 136 for forming a conical lens 10, the conical mold 136 is formed with 360 prism forming facets to form the inner surface 158 of the lens. The mold 136 may be formed of copper OFHC coated with electroless nickel and optically polished to 50 nanometers. A pouring gasket is disposed about the mold 136 to define the outer surfaces and a lens blank of CR 39 or poly carbonate or glass is disposed in the cavity. Although the present prismatic forming surfaces of the mold are selected to dispose the prisms on the inner surface 158, the mold may be constructed to locate the prisms on the outer surface 156.

Figure 40:
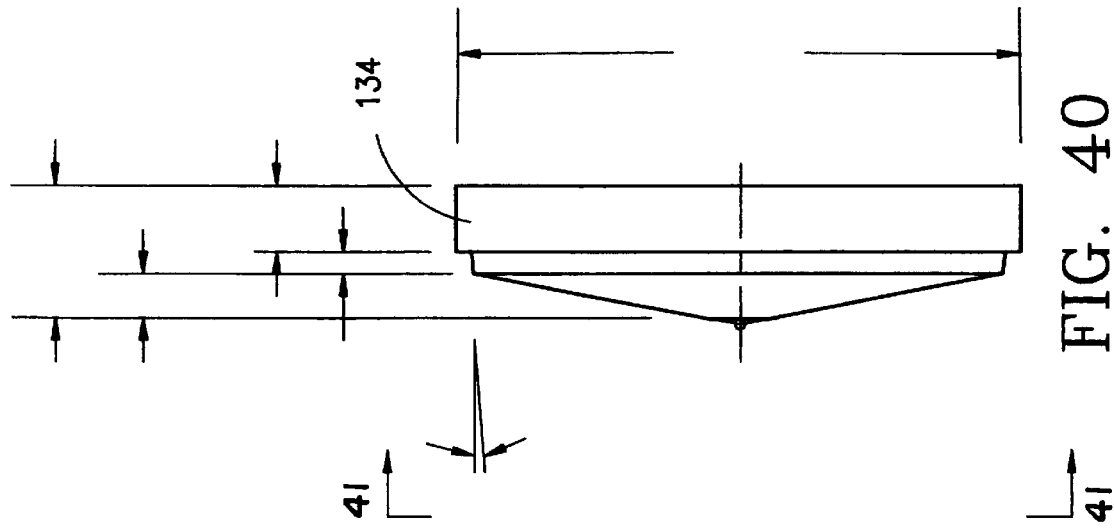
FIG. 40 is a cross sectional view of another mold for forming a conical lens having a plurality of prisms on an inner surface of the lens.
Figure 41:
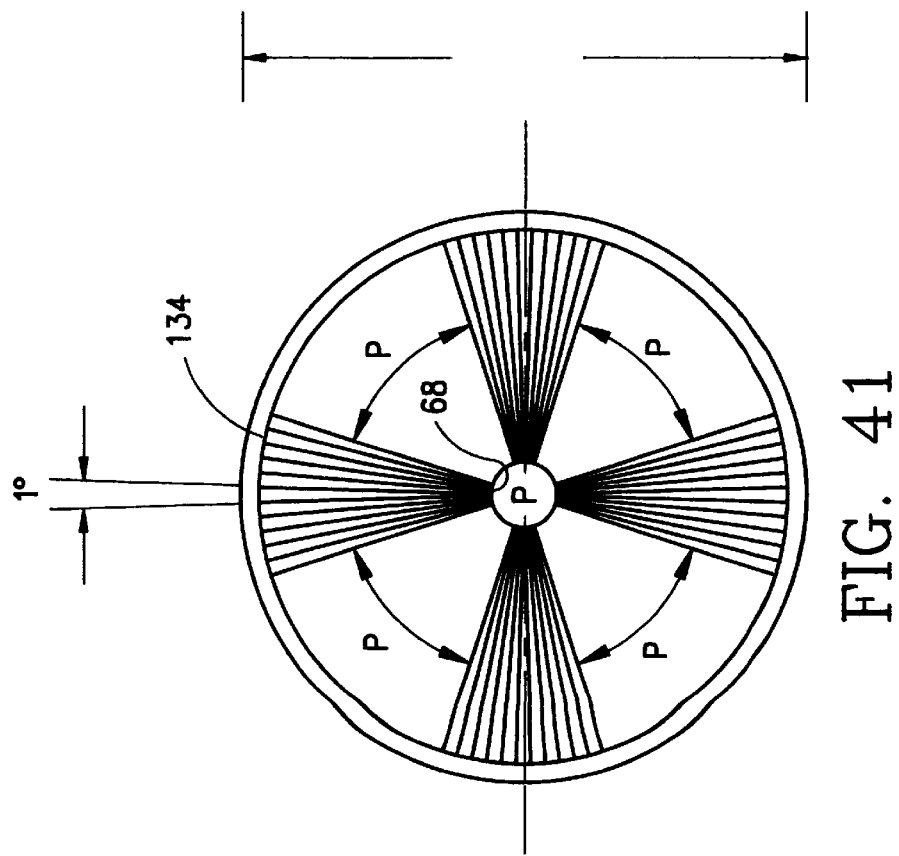
FIG. 41 is a top plan view taken along lines 41—41 of FIG. 40.

As shown in FIGS. 40–41, a mold 134 for the conical lens may be formed to dispose the prisms 60 on the inside surface 158 of a conical lens member 30. The mold 134 includes 360 prism forming surfaces, optically polished to 5 rings or better. The mold 134 defines a dimension along the optical axis between the central area 90 and a base 62 of a prism 60 of 6.9 mm, wherein the lens member 30 has a diameter of 80 mm. The apexes 72 are truncated at a knife edge 68 at the periphery of the central area 90. The mold 134 is formed of copper OFHC coated with electroless nickel. The mold has prism forming surfaces that create a corresponding shape in the resulting lens that functions as a prism. The resulting number of prismatic elements in the lens is thus determined by the In another configuration of the conical embodiment, the lens 10 has a nominal length of 18 mm and the angle between the optical axis of the lens member and the inner surface of the cone is 20 degrees. The prisms 60 are designed for a conical configuration having a height of 25 mm, wherein the final frustum has a height of 18 mm. Therefore, for a one degree prism, the base of the cone has a diameter of 18.19 mm and the base of each prism has a length of 0.4365 mm. Each prism 60 thus extends along the periphery of the cap a distance of 0.122 mm. The cap 160 has a radius of 6 mm and a dimension along the optical axis of the lens of 0.5 mm. The cone angle may be between 10 and 24 degrees, with the particular application employing a 20 degree conical angle. The cap 160 includes a central non prism area 90 having a diameter of 0.001 to 0.15 mm.

In a further configuration of the conical lens, the lens member 30 may have a height of 26 mm, a base diameter of 30 mm, a central area 90 diameter of 0.25 mm and a 30 degree angle between the optical axis and the inner surface 158.

Calculations for the distance between prisms 60 may be carried out for a conical lens having 360 one degree equal lateral prisms base out around the periphery of the lens member 30. The mold diameter is 80 mm with a base curve of 265 mm and a lens blank radius of 40 mm. For a conical prism having a 10 mm diameter central non prism aperture, each prism has a length about the circumference of the lens of 0.6984 mm. At the cap, as the prisms 60 are designed to converge beyond the cap, the prisms will occupy a peripheral distance about the cap. Specifically, for the 10 mm diameter cap, the truncation line 68 of each prism 60 occupies a length of 0.08730 mm. If the central aperture 90 were reduced to 4 mm, then the truncation line 68 for each prism would occupy a length of 0.03492 mm about the periphery of the aperture.

A primary difference between the conical versus the spherical radiused lens is the applicability of the conical lens to telemetry versus the ophthalmic applications for the spherical body. The conical embodiment may be employed in bar code laser scanners, CD ROM readers/writers, computer imaging projection lasers, medical operating laser equipment, set up and alignment of computer and servo driven lathes, mills, optical grinding and polishing equipment, axicon star image alignment equipment, alignment of high production conveyor equipment including news paper conveyors, aerial photography cameras, laser gun sights and celestial navigation equipment.

Preferably, the number of prisms 60, diopter of the prisms, location of the prisms on the object or image side, and the conical angle are selected to pass a collected image from the prisms through the central aperture.

Figure 42:
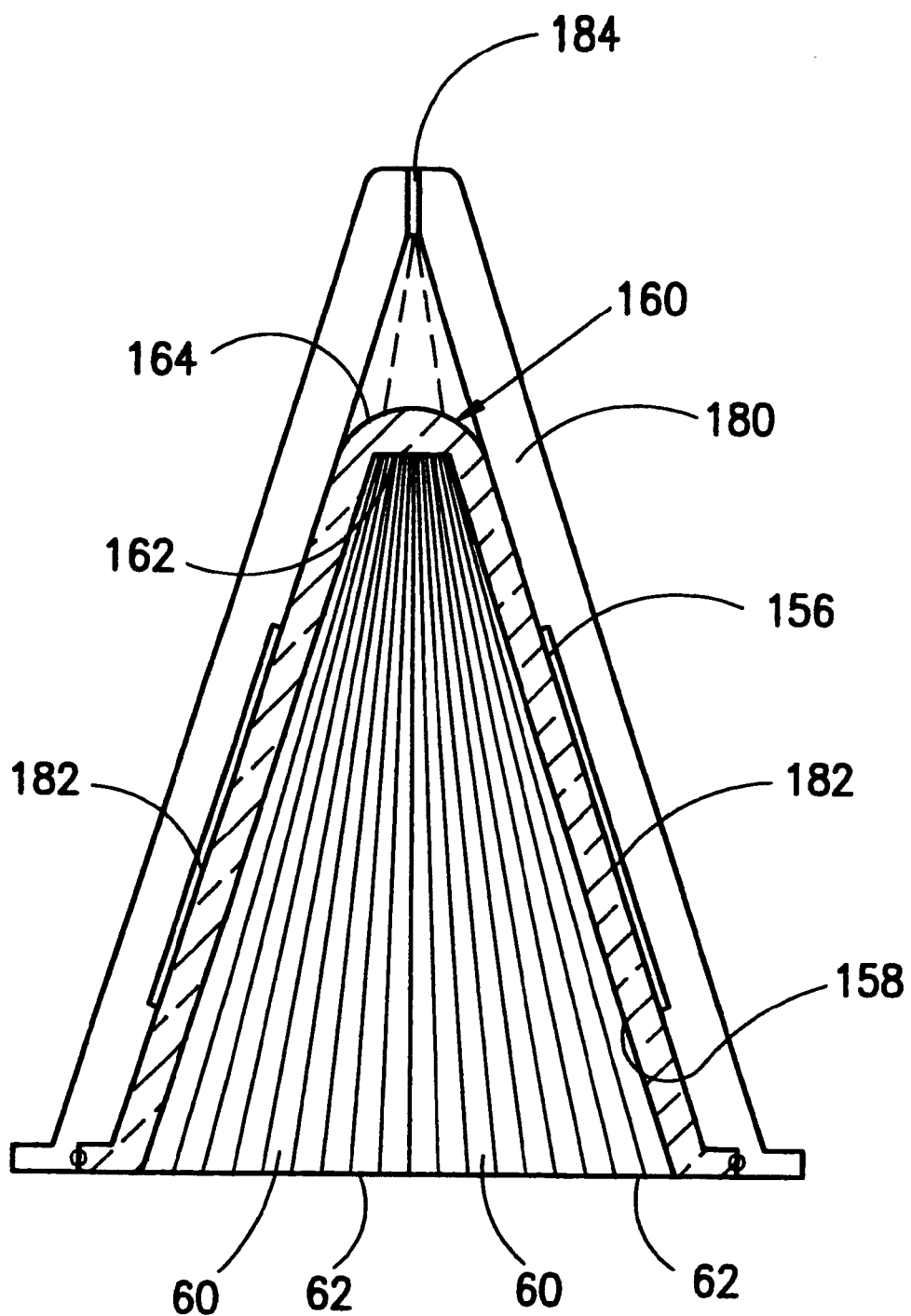
FIG. 42 is a cross sectional view of a conical lens in a lens mount.
Figure 43:
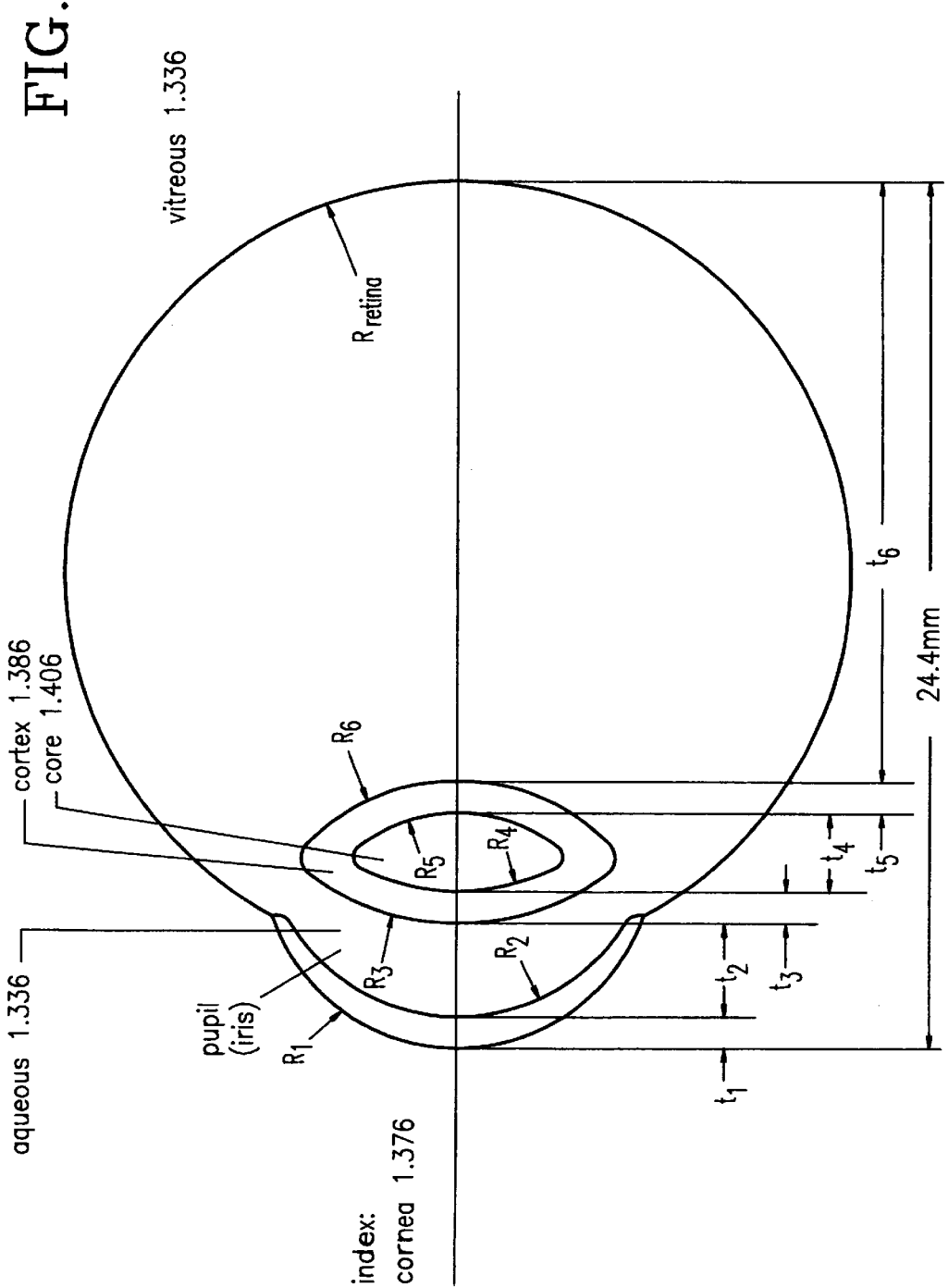
FIG. 43 is a schematic of an eye.
Figure 44:
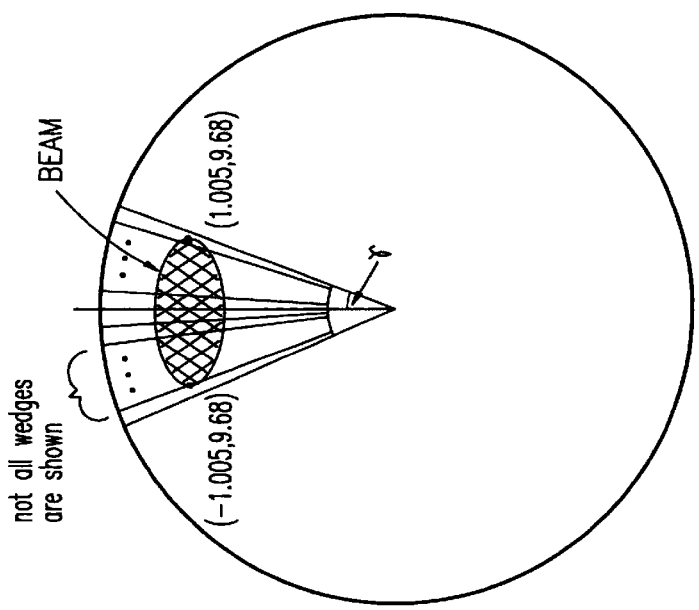
FIG. 44 is a schematic of a footprint of a beam on a wedged surface.

Referring to FIG. 42, a typical conical lens assembly is shown. In the conical lens assembly, the frustum lens member 30 is disposed within a lens mount 180. The lens mount 180 may be a black anodized aluminum body sized to retain the lens 10. Preferably, the lens mount 180 includes a 0.010 mm relief pocket 182 between a portion of the lens and the mount. The mount 180 also includes an exit aperture 184 through which the emerging light rays pass.

Aspheric Embodiment

In the aspheric embodiment, the image enhancing lens includes a lens member having an aspheric optical surface, the plurality of integral prisms 60 on a surface of the lens member 30 and a central non prism area 90. The central aperture includes the optical center of the conical lens member. The central area 90 may have a diameter as small as one thousandth of an inch. It is contemplated the central area 90 may have a diameter up to 16 mm. Again, the prism apexes 72 are designed to terminate at the optical axis of the lens member 30, and the prisms are truncated at 68 to bound the non prism area. The prisms 60 may be disposed upon the object or the image side 12, 14 of the aspheric lens member.

Industrial Applicability

The present lenses, conical, spherical or aspheric embodiments may be employed in either a contact lenses or eye glasses, wherein both the contact lenses and eye glasses employ a graduated or blended transition between adjacent prisms rather than a discontinuity between adjacent prisms. In addition, the interface between the apex portions and the non prism area may be transitioned or blended.

The graduated or blended transition between the prisms defined by a radius of curvature between the adjacent contiguous prisms, or the prism and the adjacent surface of lens member 30. That is, the common edges of adjacent prisms 60 are substantially blended together to become indistinguishable to both the wearer and the one seeing the lenses. Therefore, the lens 10 has a continuous appearance rather than exhibiting distinction facets. The radius defining the surface between adjacent prisms 60 may be between approximately 0.01 mm to 1000 mm. The transition or graduated portion may be formed intermediate adjacent prisms as well as the prisms and the lens member, such as between the central aperture and the apex of a prism.

In a further embodiment, the blended transition is employed in a multiple diopter prismatic lens. Specifically, a prismatic lens includes a prismatic lens having a plurality of contiguous prisms, at least two adjacent prisms having different diopters, and a blended surface transition between the adjacent prisms, the blended surface configured to substantially preclude the introduction of diplopia.

The present lenses may be made in a contact lens configuration. In this configuration, the contact lenses include a single integral lens member having a front surface, a rear surface and a converging non-prism central portion for accommodating the normal central visual field of view, and at least one prism on the rear surface of the lens member, each prism having the apex and an apex portion thereof contiguous with the converging non-prism portion and the base extending radially outwardly. Again, it is understood the prisms 60 may be formed on either the object or the image side of the lens member.

THE COMPUTER CODE V. THREE DIMENSIONAL RAY TRACE

The 360 lens system was computer designed using optical formulas derived from Snell's Law, (n sin i=n prime sin i prime) and from Dr,s Conready's and Kingslake's third order of optics which is incorporated into the EXCEL version 5.0 CODE V optical design program.

The following is a brief guide to the data included for each eye condition. The Code V output consists of lens drawings, lens construction parameters, indices of refraction, first order of lens properties, third order of aberrations using the various eye conditions, optical ray plots using the various eye conditions and spot diagrams.

The following areas of the 360 lens system were designed and/or checked using the CODE V three dimensional ray trace program PHASE 1:
Calculation of Aran Safir's normal eye, used as a baseline for all other calculations PHASE 2:
Calculations of a normal eye with a plus 1.75 diopter prescription correction Calculations of a normal eye with a minus 1.75 diopter prescription correction PHASE 3:
Aberrations and/or distortions calculations of a normal eye, used as a baseline all other aberration and/or distortion calculations Calculations of the above eye conditions with the 360 prismatic correction lens Calculations of powers of eye surfaces for plus or minus 6 diopters of prescription correction Calculations of Chief ray location on retina and spot sizes for the various field of the relaxed and accommodated eye.

Calculations of image location change, if any, when wearing the 360 prismatic prescription corrected lenses, compared to the normal plus or minus prescription lenses for vertical, 45 degree and other positions PHASE 4:
Code V output for relaxed eye with the minus 6 diopter corrective lens Code V output for relaxed eye with the minus 6 diopter, 360 prismatic prescription corrective lens Code V output for accommodated eye with the plus 6 diopter corrective lens Code V output for accommodated eye with the plus 6 diopter, 360 prismatic prescription corrective lens having a 6.4 mm center thickness Code V output for accommodated eye with the plus 6 diopter, 360 prismatic prescription corrective lens having a 2.0 mm center thickness This report analyzes the performance of the 360 design with corrective lenses of ±6 D of power. As in the case of the ±1.75 D corrective lenses, the following procedure was used to generate the lenses:

1. Calculate the radius of curvature on the corrective lens with a plane second surface by: $R[m]=(''CR-39-1)/Power [D]$.

2. Use the separated thin lens equation to calculate necessary power of eye to yield same total power for the eye plus lens combination as that of the standard eye.

3. Enter system into Code V and allow curvature of anterior cornea and aspheric coefficient of anterior lens cortex to vary. Optimize with field angles of 0° and 10° for third order spherical aberration equal to zero, and minimum weighted spot size.

4. Freeze all variables; this is the plain corrective lens. Add user-defined surface to the second surface of the lens for the 360 system.

The output generated is the same as that presented for the lenses with ±1.75 D of corrective power which was given in the Phase II report and Phase III report. Descriptions of the output appear in those reports, as well as the User-Defined Surface subroutine which implements the 360 surface. Output in this report is given for the cases of the eye with the plain ±D corrective lenses, and for the eye with ±6 D corrective lenses incorporating the 360 surface. Data for the standard eye is not repeated here.

When the 360 surface is added to the lens, the thickness of the wedges permits the sag at the edge of the lens to be greater than the center thickness of the 360 concept on a ±6 D lens: with a center thickness of 6.4 mm, the spot size and structure is comparable and does produce a greater deviation of the spot, focusing it closer to the center of the retina.

The 360° project will be analyzed using the model presented in this report. Tables 1 and 2 contain additional data for modeling this system.

The required angle of the optical wedges relates to the angular deviation of a prism and the definition of prism diopter. For a thin wedge of small angle in air, the angular deviation, $\delta$, is given by $\delta=(n-1)\,\alpha$, where $\alpha$ is the apex angle of the wedge and n is the refractive index of the prism material. A prism of 12 diopters displaces the incident light by 12 cm at a distance of 1 m. As a result, the apex angle of a 12 diopter prism is given by:

$\alpha=[\tan^{-1}(0.12)]$

The corrective lens will include a central region of diameter, d, without optical wedges. This diameter will influence the edge thickness of the lens as shown in FIG. 2.

The eye will be modeled using the data in Table 3–1 of Refraction and Clinical Optics by Aran Safir, included here as Table 2. The curvature of the surface, thickness to the next surface, and index of refraction of the medium following the surface are taken from Safir's book and are listed as "standard eye." The power of each surface is computed, then the powers of adjacent surfaces are combined.

The thickness required to combine the lens core and cortex to calculate an equivalent lens power were estimated, then adjusted to agree with Safir's values.

To model the cases where the corrective lenses have ±1.75 diopters of power, the eye must be adjusted. This is done by computing the necessary power of the eye such that the eye-lens combination is corrected to the power of the standard eye. The power of the eye will be altered by changing the curvature on the anterior surface of the cornea.

The iris serves as the aperture stop in this system. It is located at the anterior surface of the lens cortex. A pupil diameter of 5 mm is used for average light levels. The image surface in this system is the retina, which is curved. To approximate the curvature, the eye is considered a sphere. The radius of curvature of the retinal surface is taken as one half the length of the "standard" eyeball.

Phase II Report

The standard model of the eye listed in the Phase I report was stopped down to 2 mm to reduce the effects of aberrations in the eye. To compensate for the spherical aberration of the eye, an aspheric surface was added at the anterior surface of the lens cortex and optimized to yield zero third order spherical aberration at the retina. The curvature of the cornea was allowed to vary to maintain a constant length of the eyeball. These parameters were adjusted in both of the normal eyes and the eyes with corrective lenses. The values obtained for the eyes with the corrective lenses were used for the 360 wedge cases also.

Figure 45:
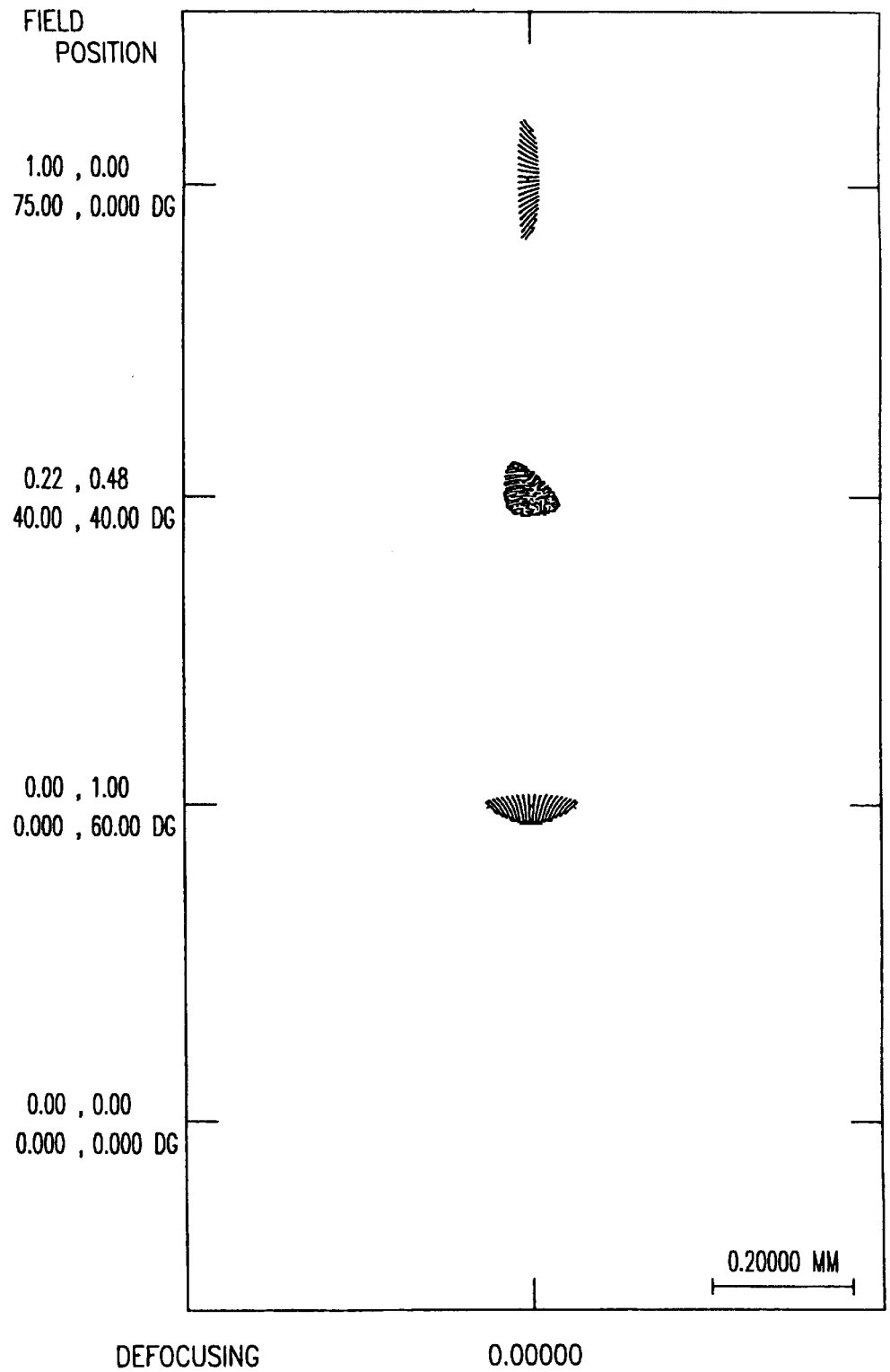
FIG. 45 is a graph comparing field position vs. the relaxed standard eye.
Figure 46:
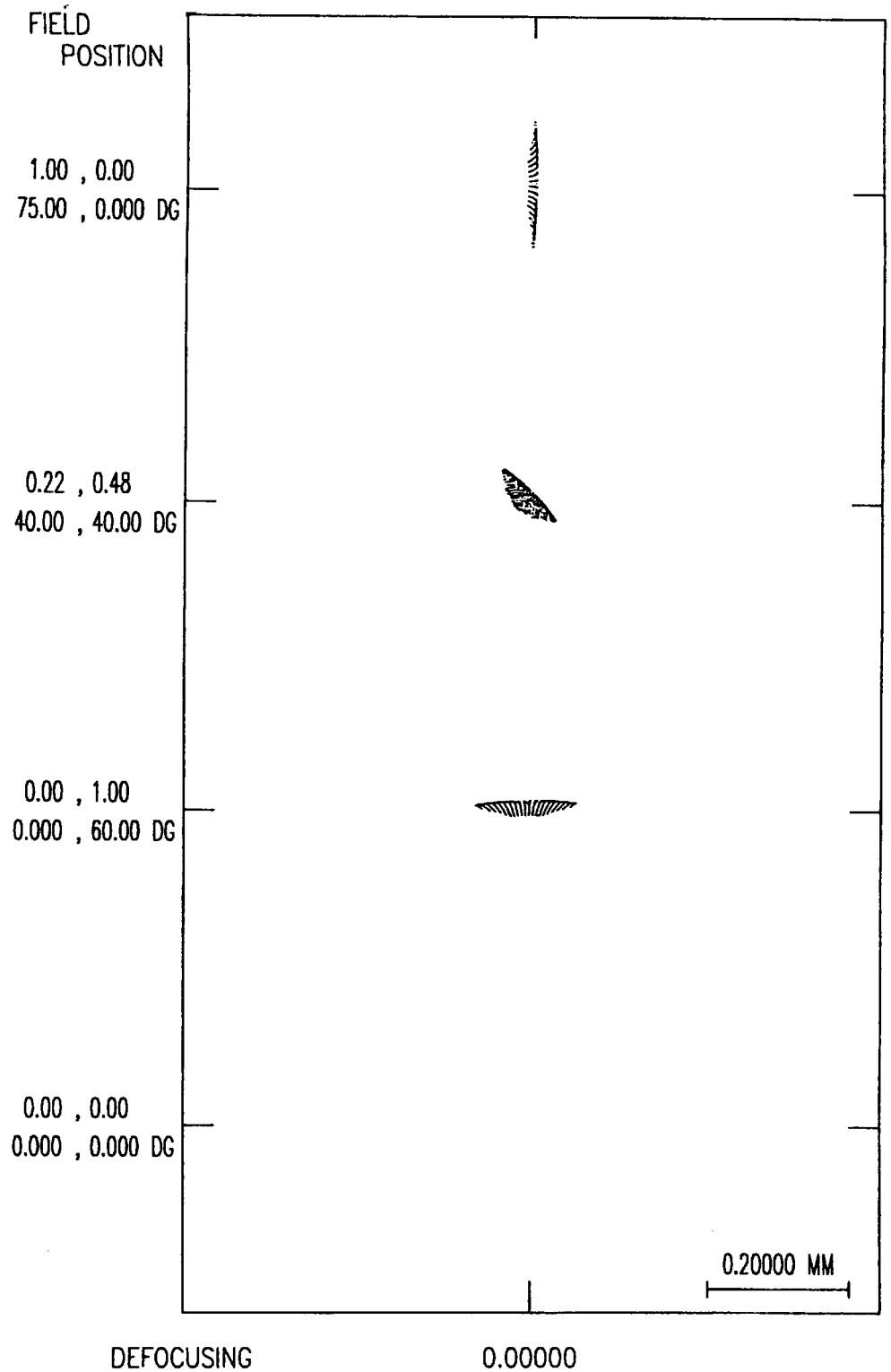
FIG. 46 is a graph comparing field position vs. the relaxed eye & −1.75 D lens.
Figure 47:
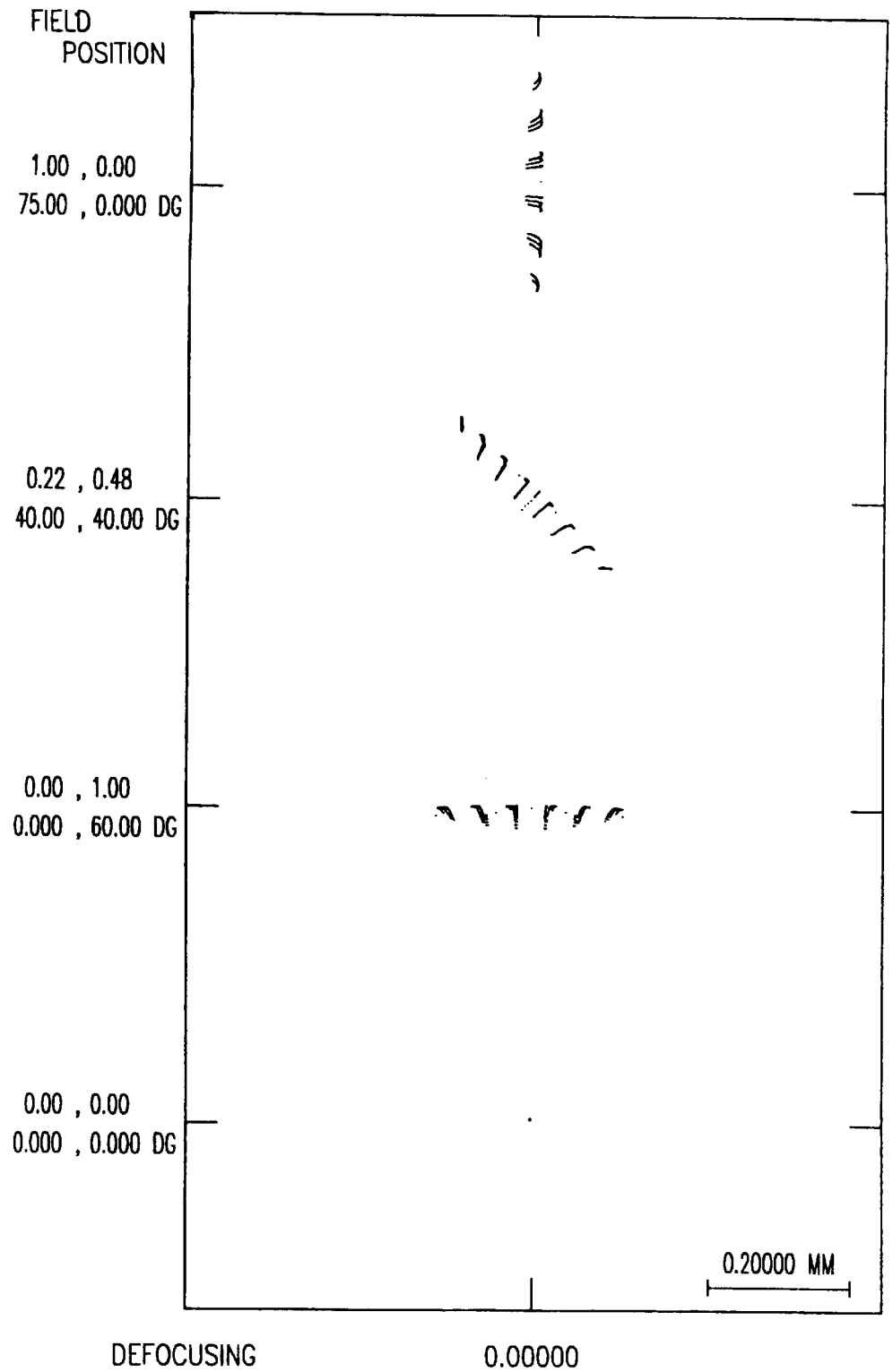
FIG. 47 is a graph comparing field position vs. the relaxed eye 360, 10 mm CA.

Table 2 shows a chief ray (image) locations on the retina for the three scenarios of the relaxed eye: normal (no correction required), with −1.75 D corrective lenses, and with −1.75 D corrective lenses incorporating the 360 concept with 10 mm center aperture. Four object fields are analyzed, and the spot size at each is given. FIGS. 45 through 47 are spot diagrams for these three lenses. Each figure shows the size and shape of the image spot on the retina for the four fields points. The left axis lists the field positions both in fractional fields and in degrees. It does not give any information relating to the relative position of the spots on the retina.

Figure 48:
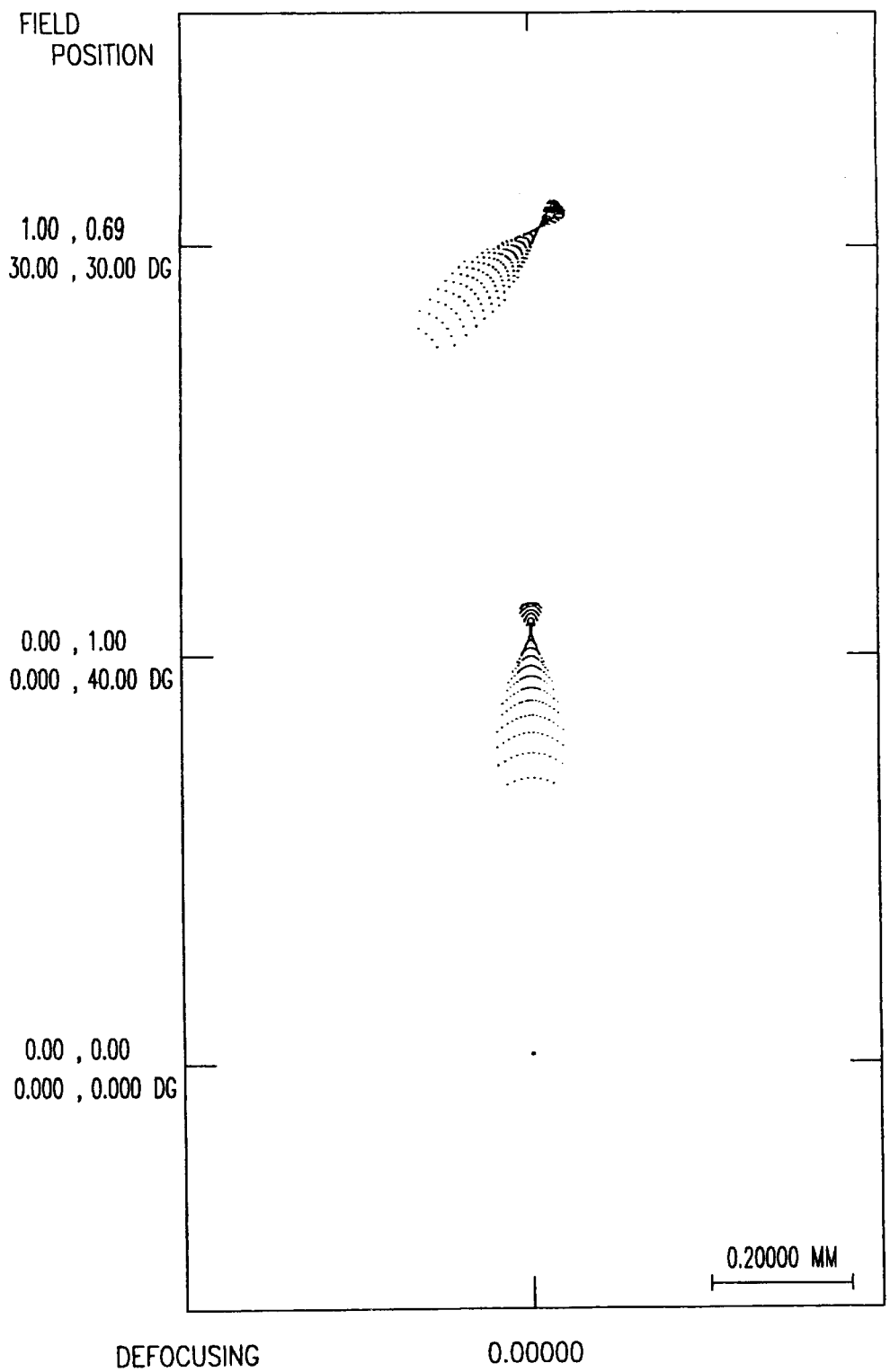
FIG. 48 is a graph comparing field position vs. the accommodated standard eye.
Figure 49:
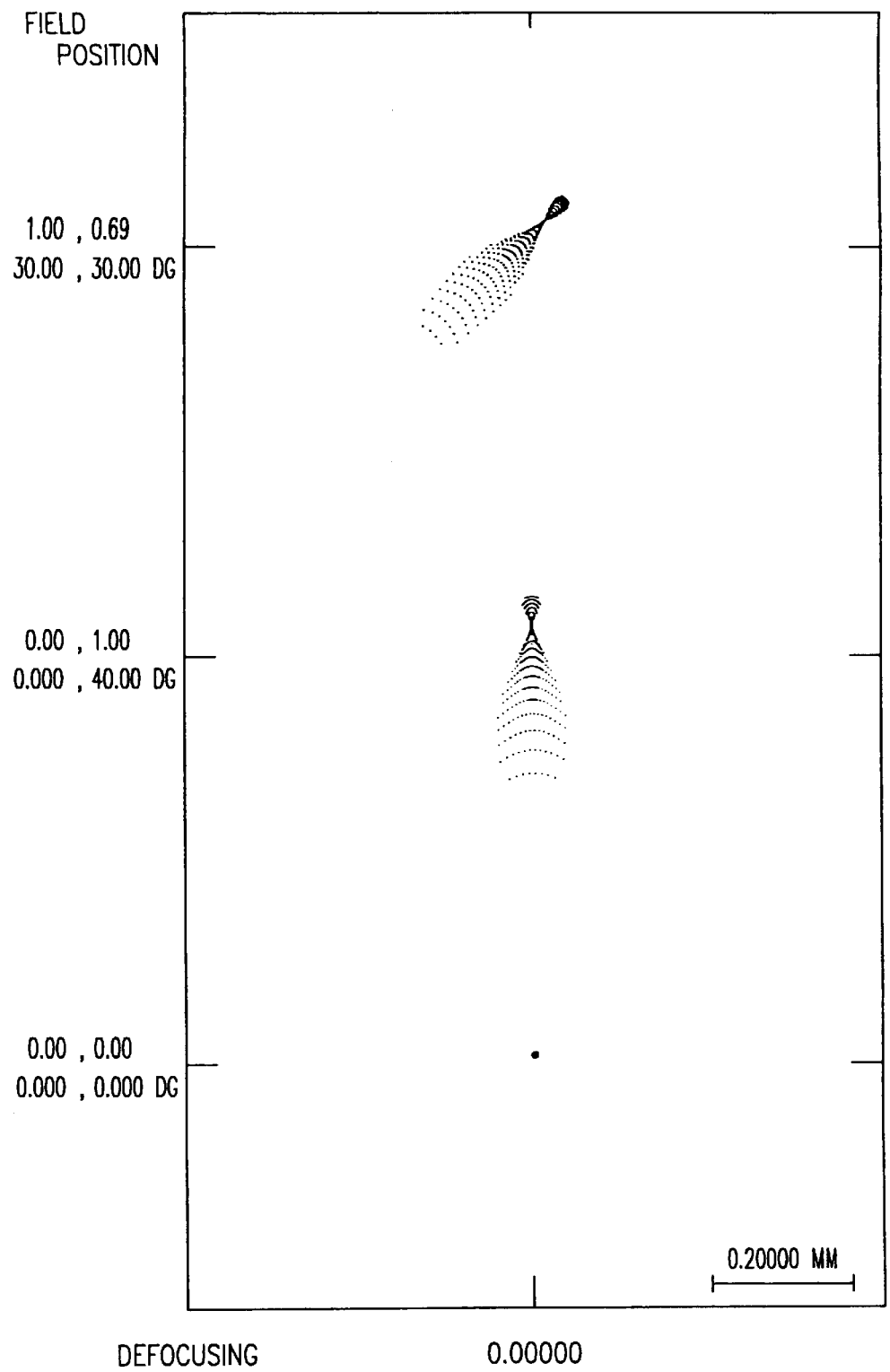
FIG. 49 is a graph comparing field position vs. the accommodated eye & +1.75 D lens.
Figure 50:
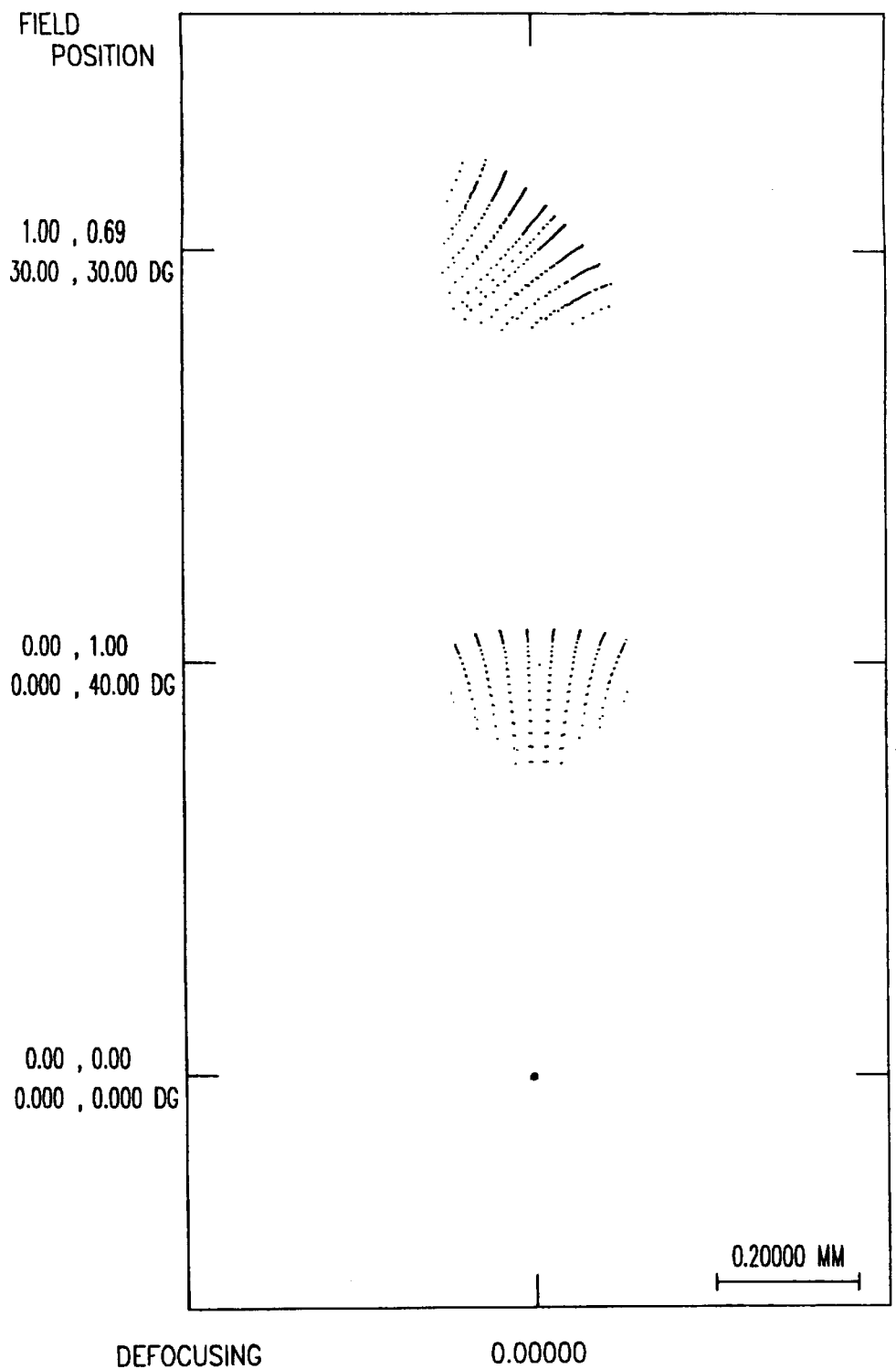
FIG. 50 is a graph comparing field position vs. the accommodated 360, 10 mm CA.
Figure 51:
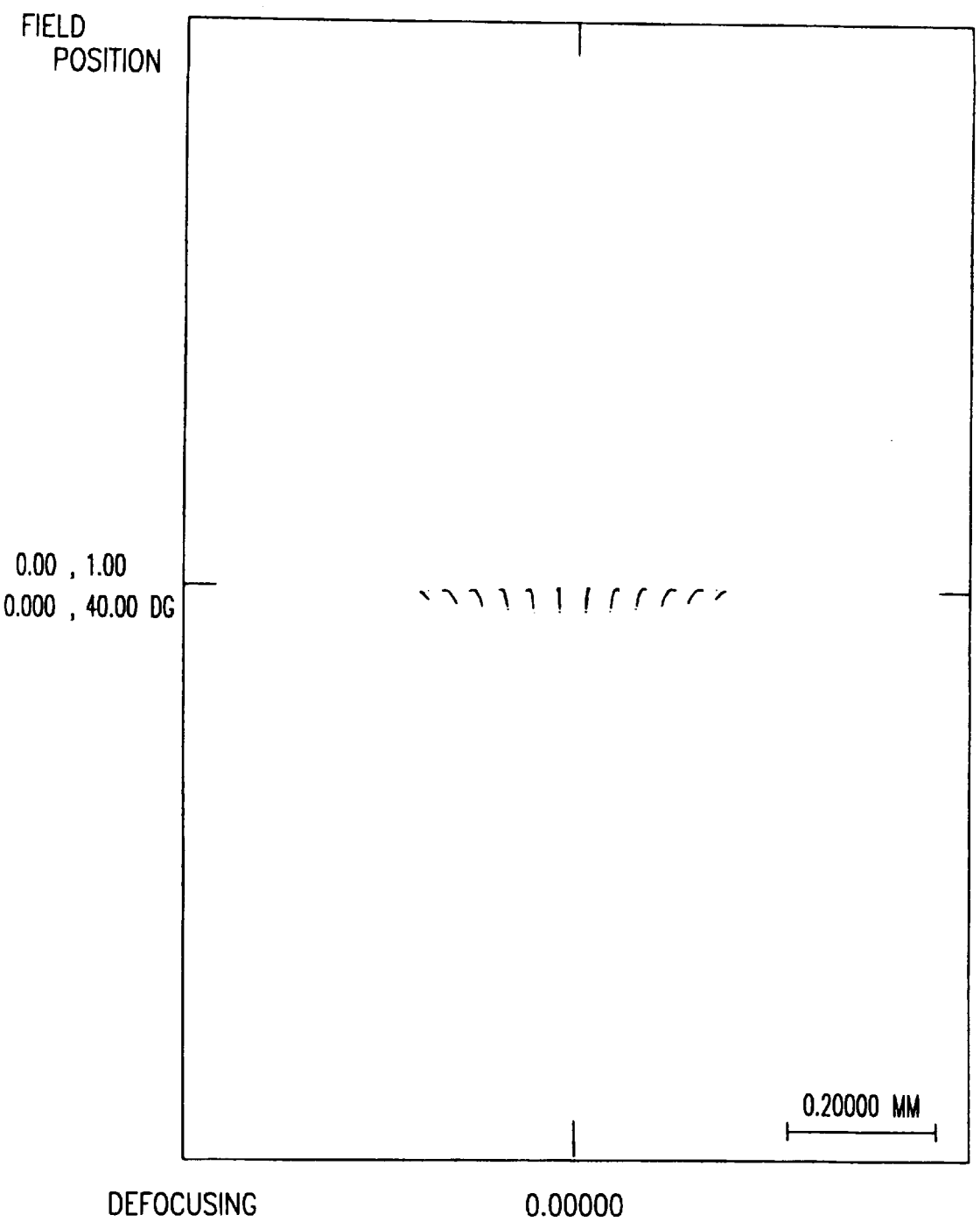
FIG. 51 is a graph comparing field position vs. the relaxed 360, 10 mm CA.
Figure 52:
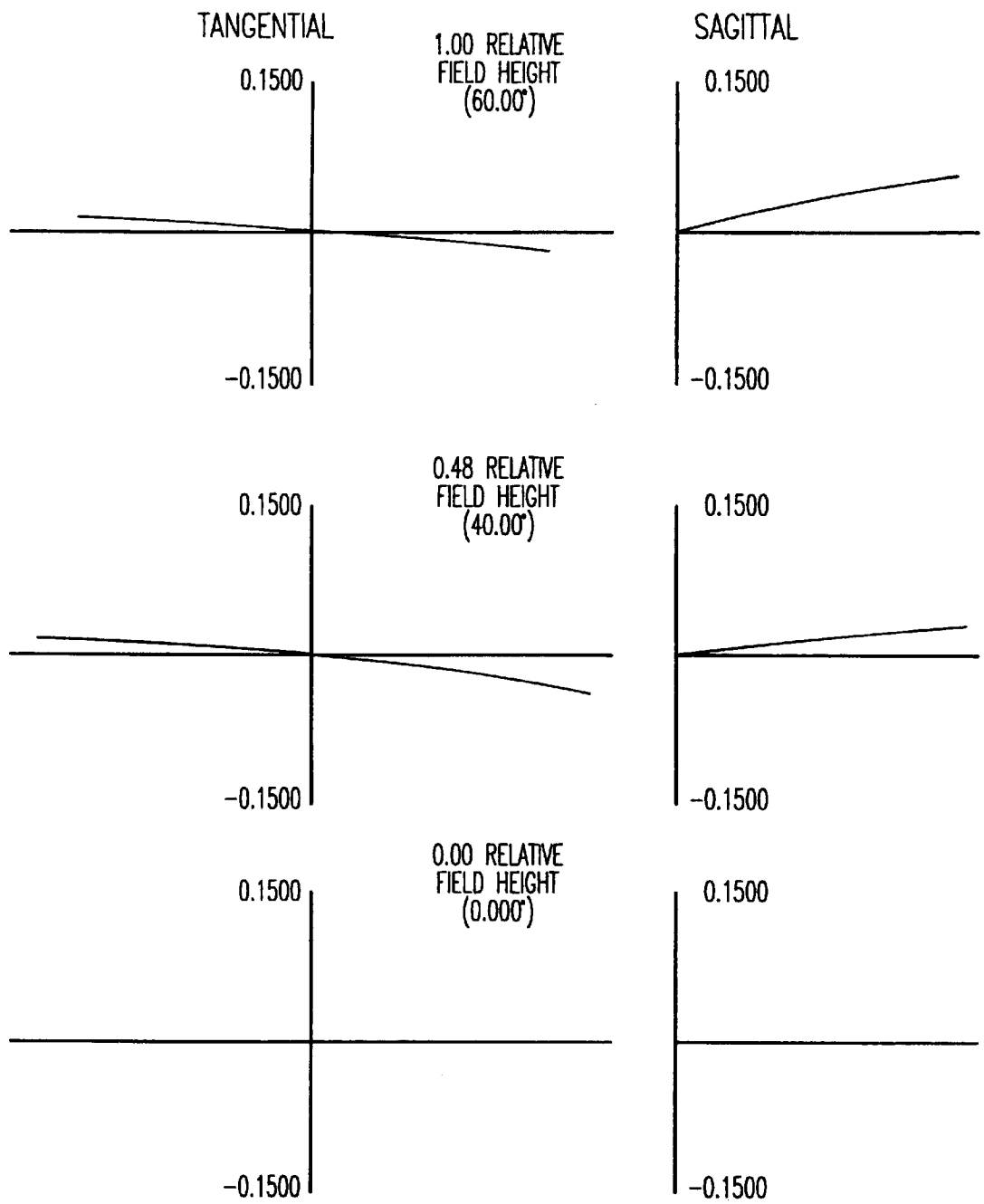
FIG. 52 shows ray aberrations in the relaxed standard eye.
Figure 53:
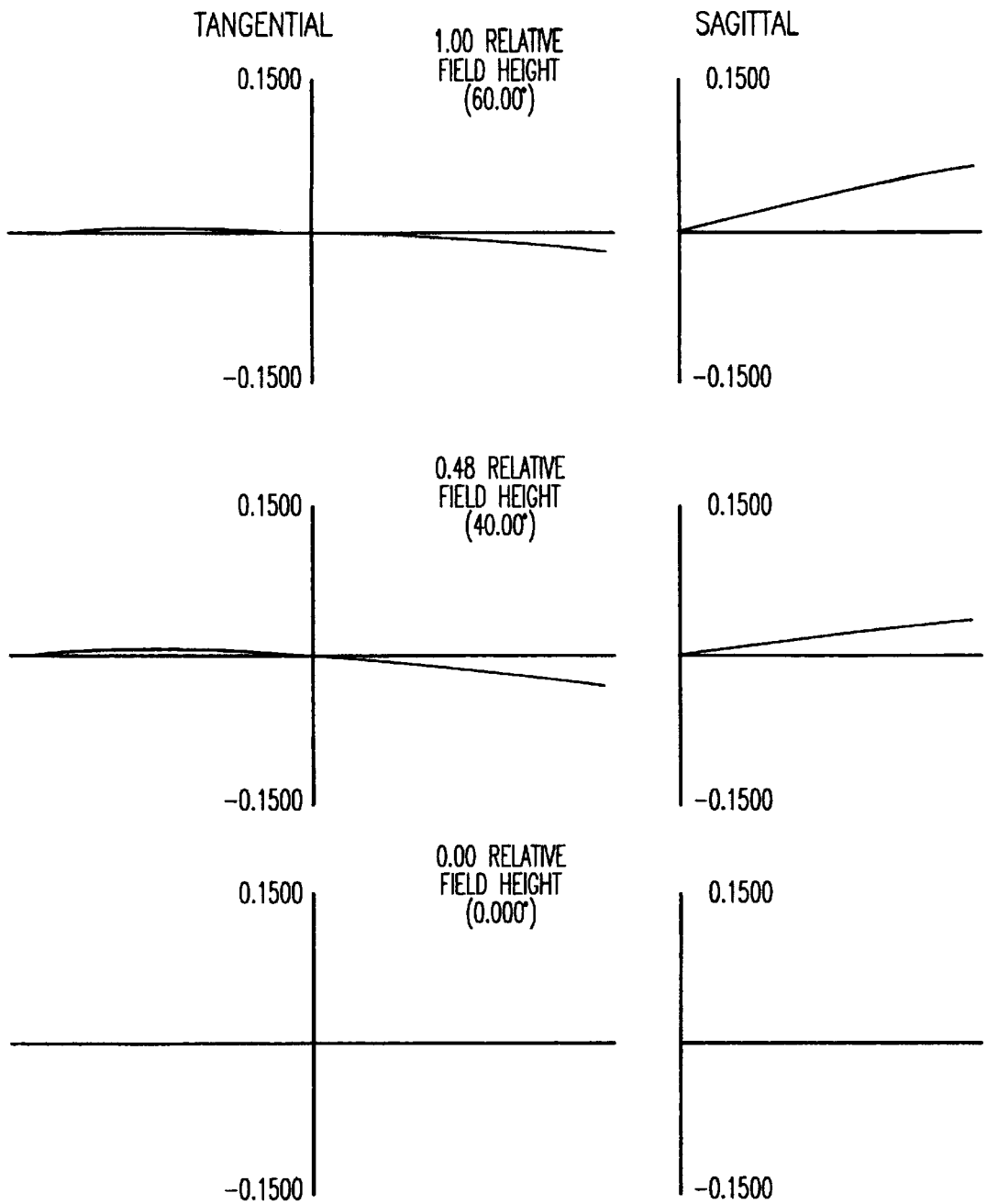
FIG. 53 shows ray aberrations in the relaxed standard eye & −1.75 D lens.
Figure 55:
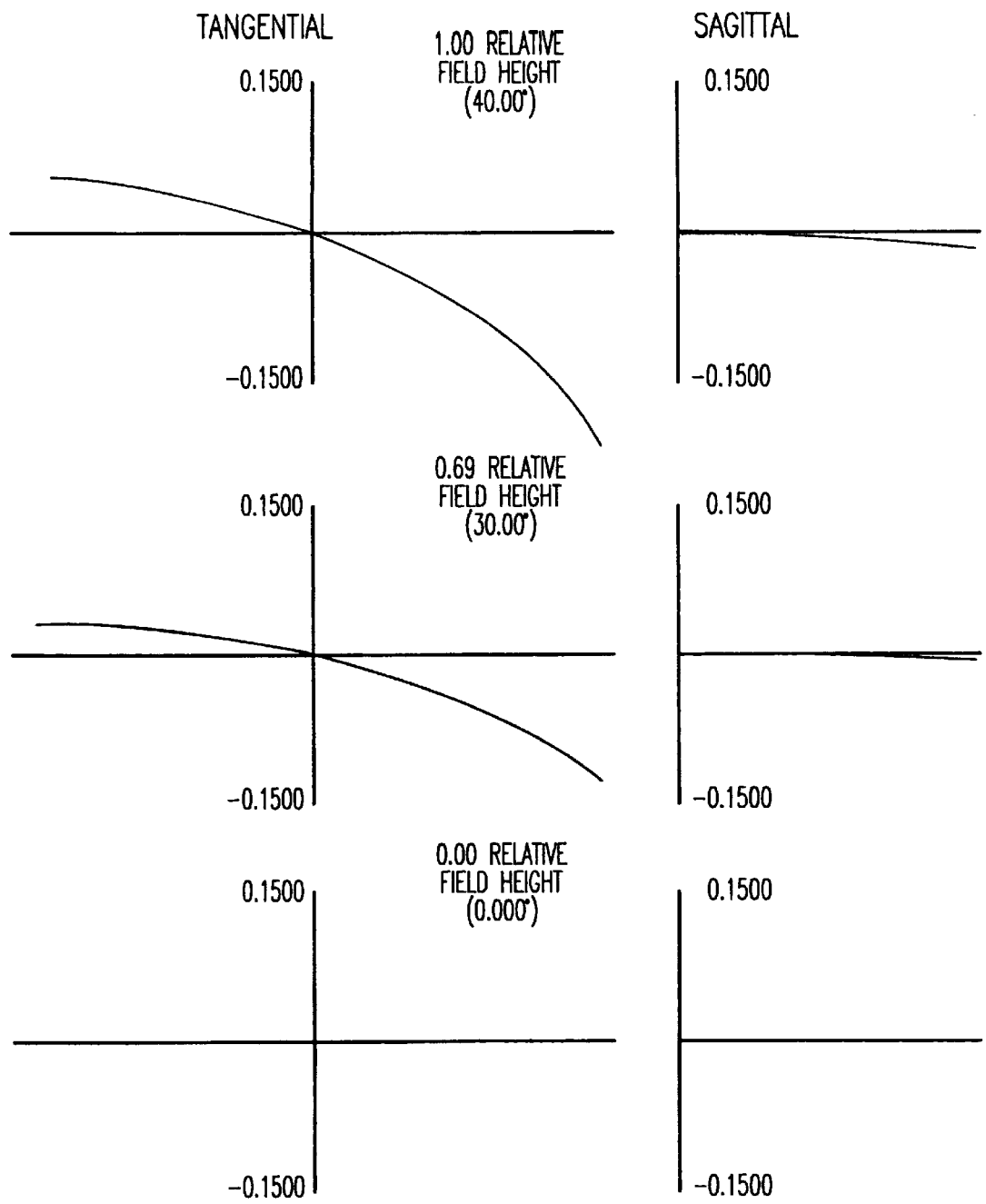
FIG. 55 shows ray aberrations in the accommodated standard eye.
Figure 56:
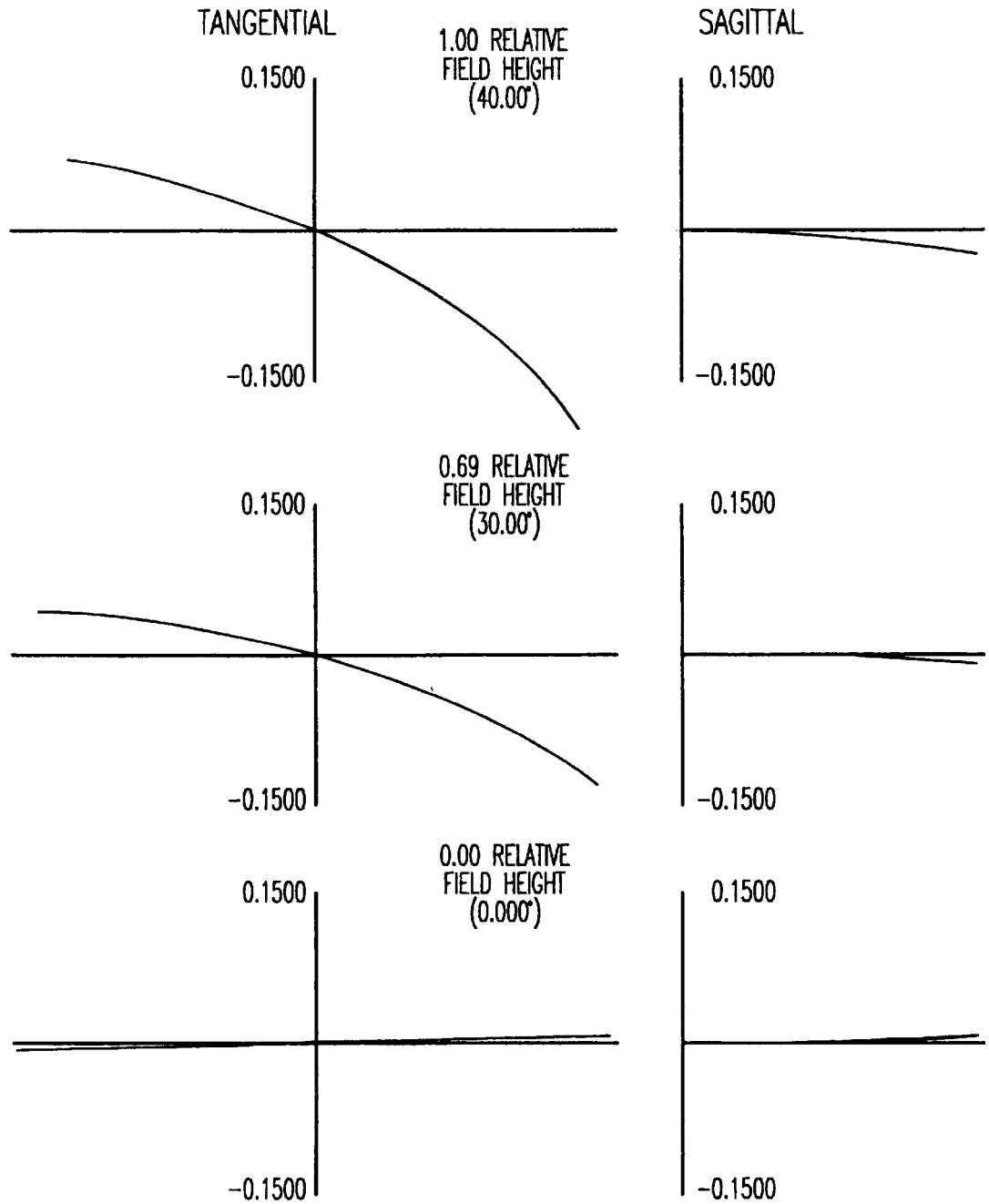
FIG. 56 shows ray aberrations in the accommodated eye & +1.75 D lens.
Figure 57:
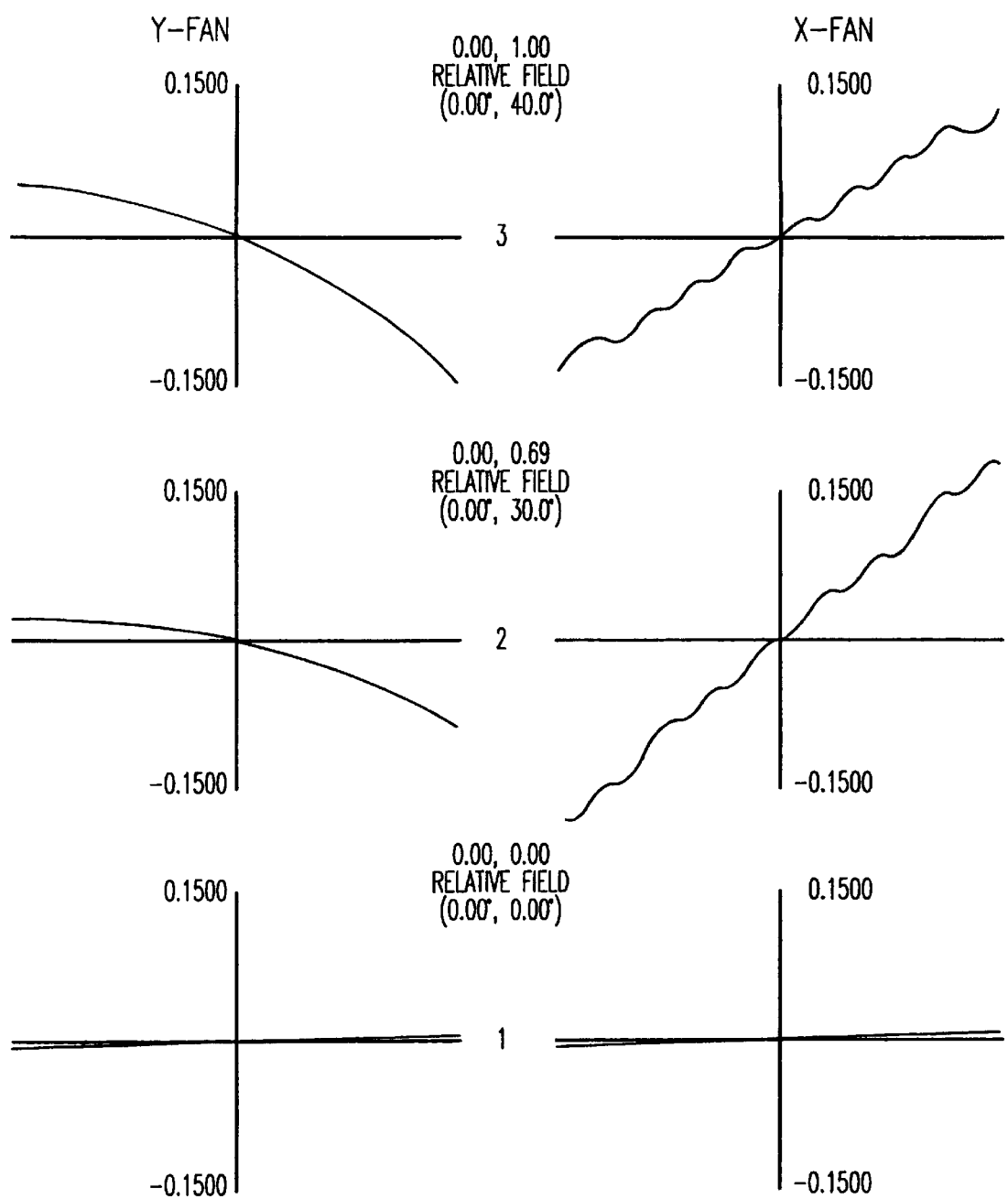
FIG. 57 shows ray aberrations in the accommodated 360, 10 mm CA.
Figure 58A:
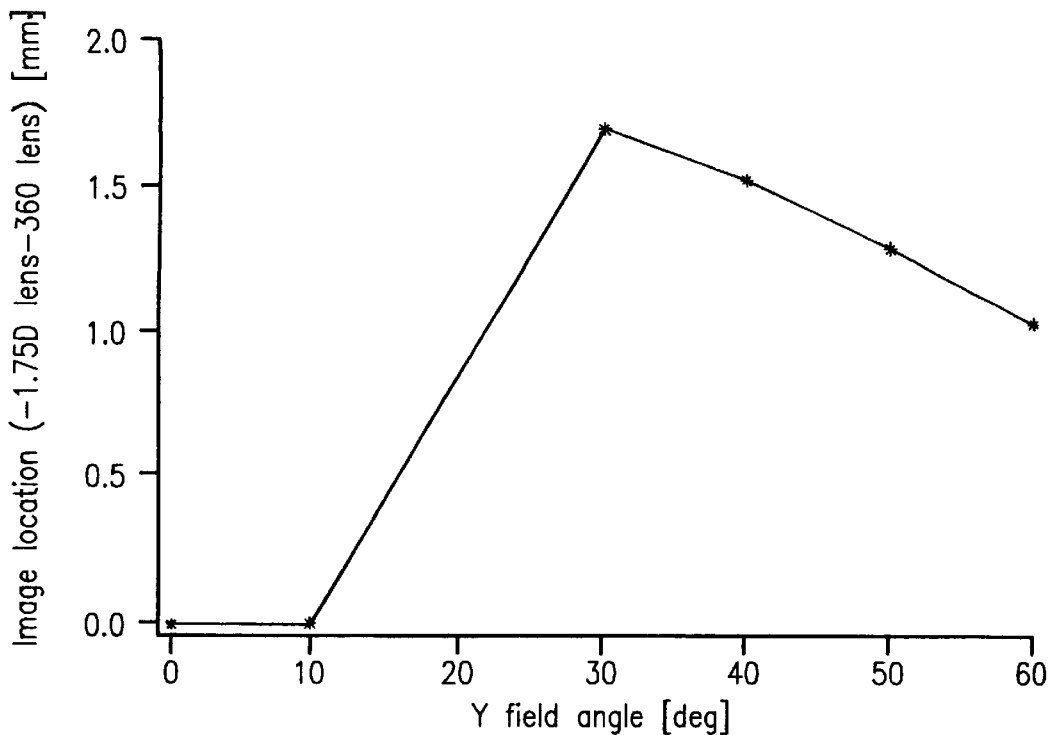
FIG. 58(a) and (b) show the change in image location.
Figure 58B:
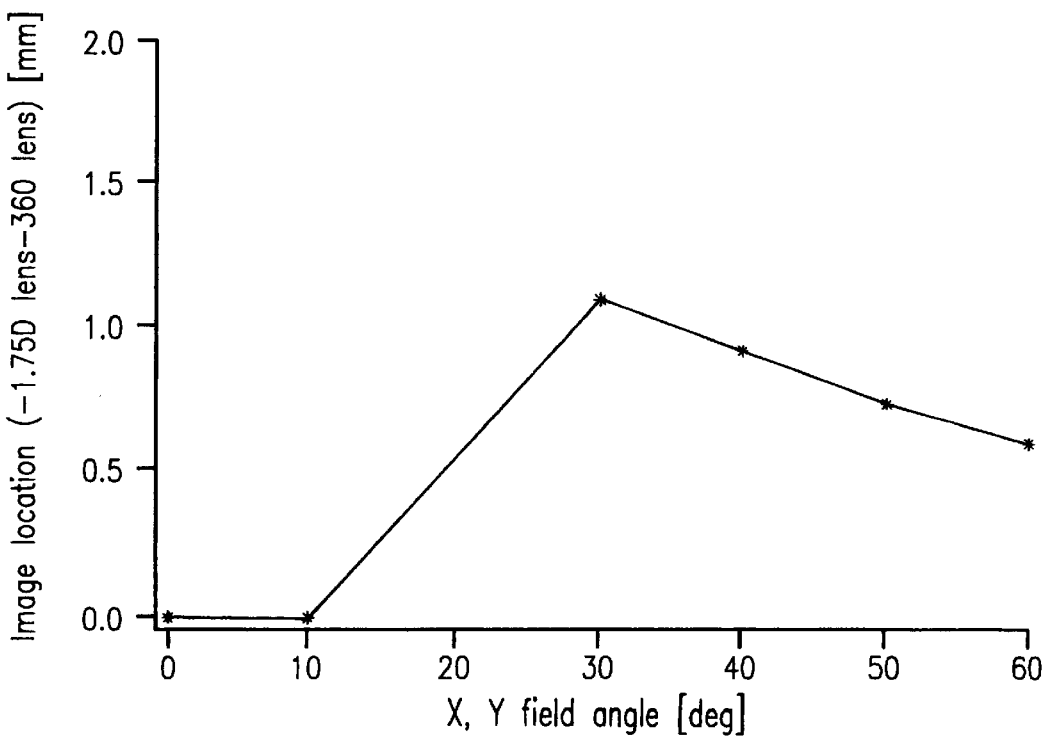
Figure 59A:
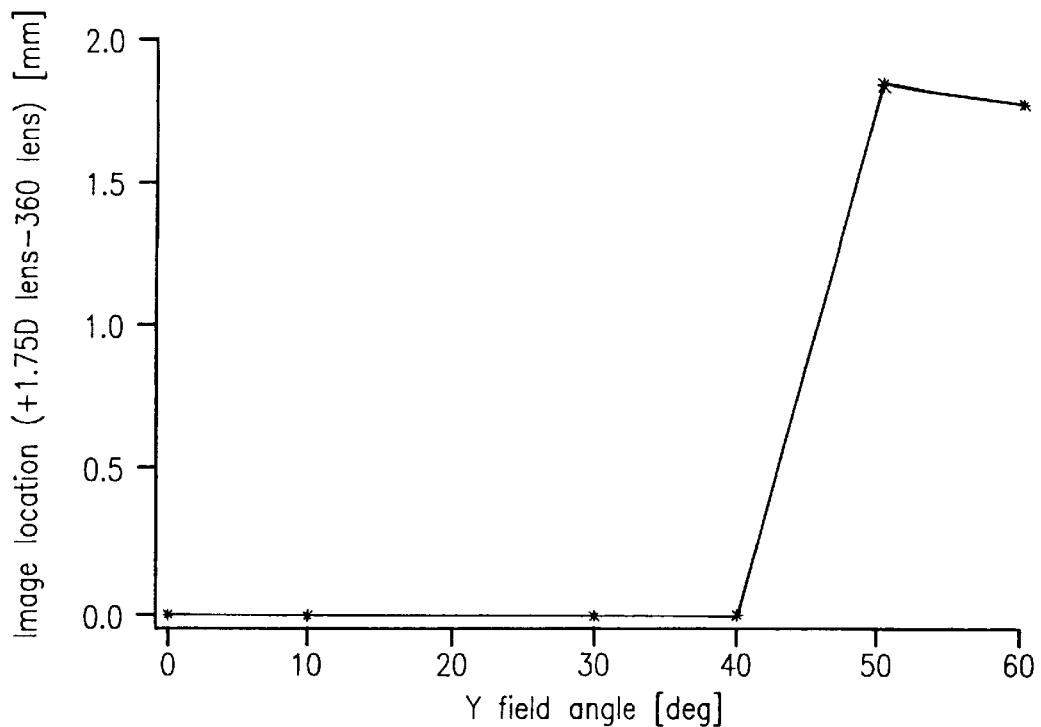
FIG. 59(a) and (b) show the change in image location.
Figure 59B:
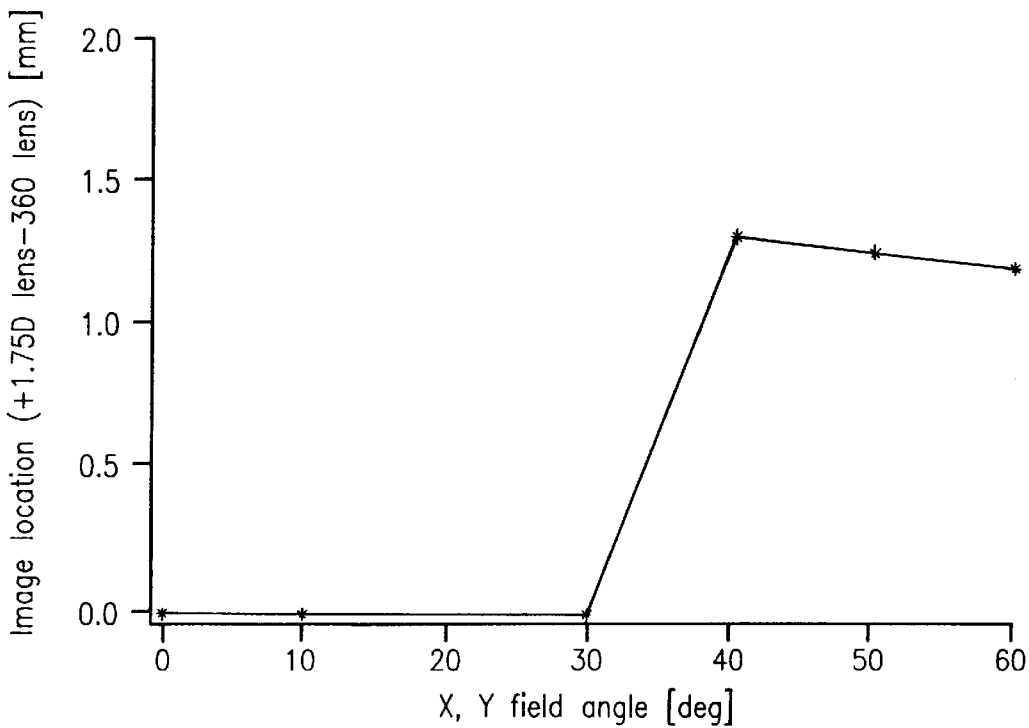
Figure 60A:
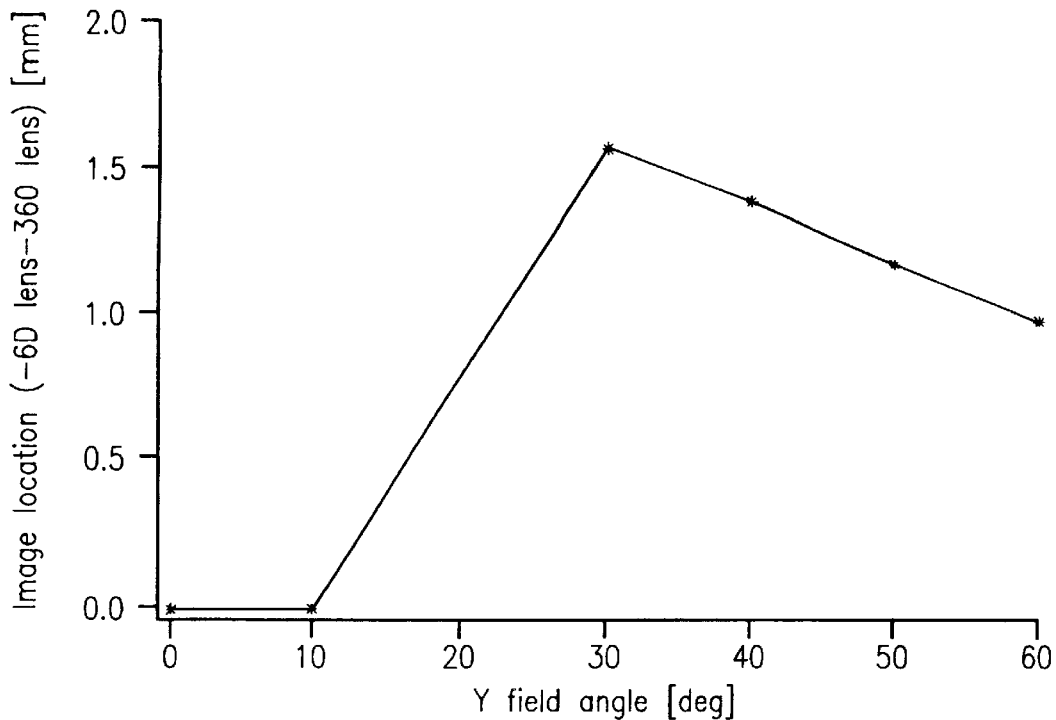
FIG. 60(a) and (b) show a change in image location.
Figure 60B:
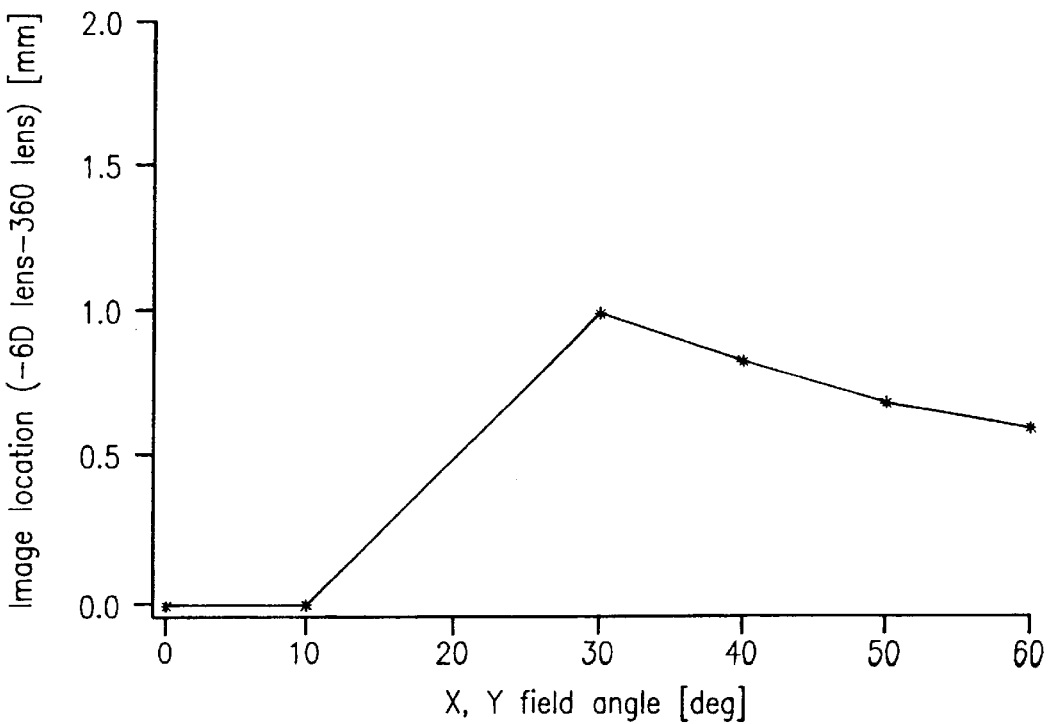
Figure 61A:
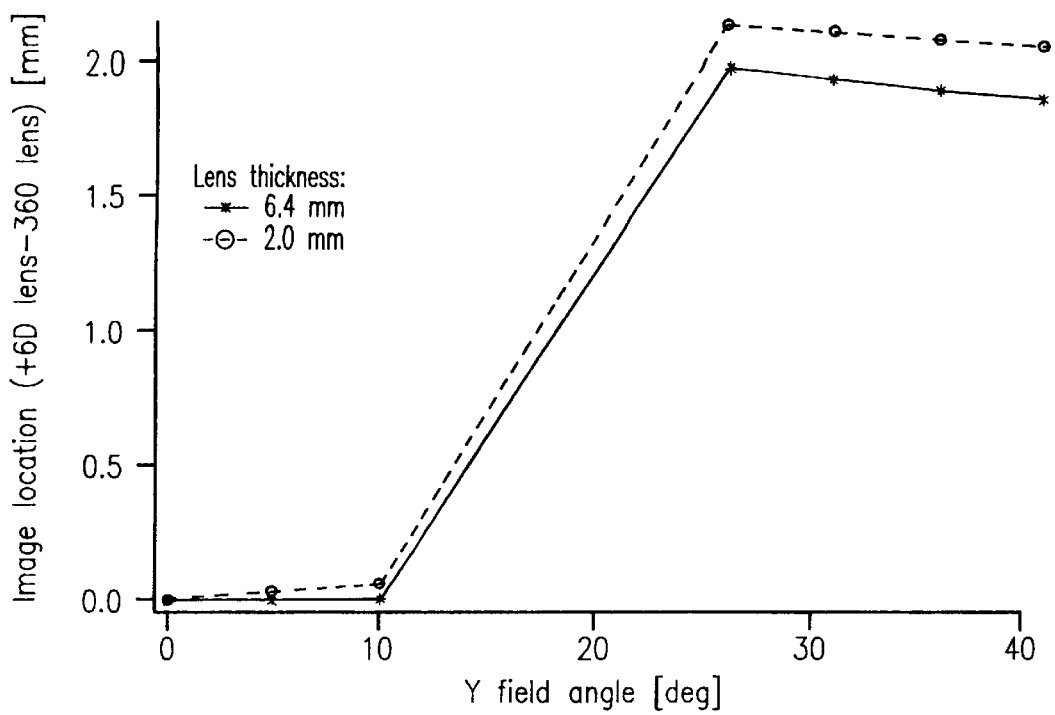
FIG. 61(a) and (b) show a change in image location.
Figure 61B:
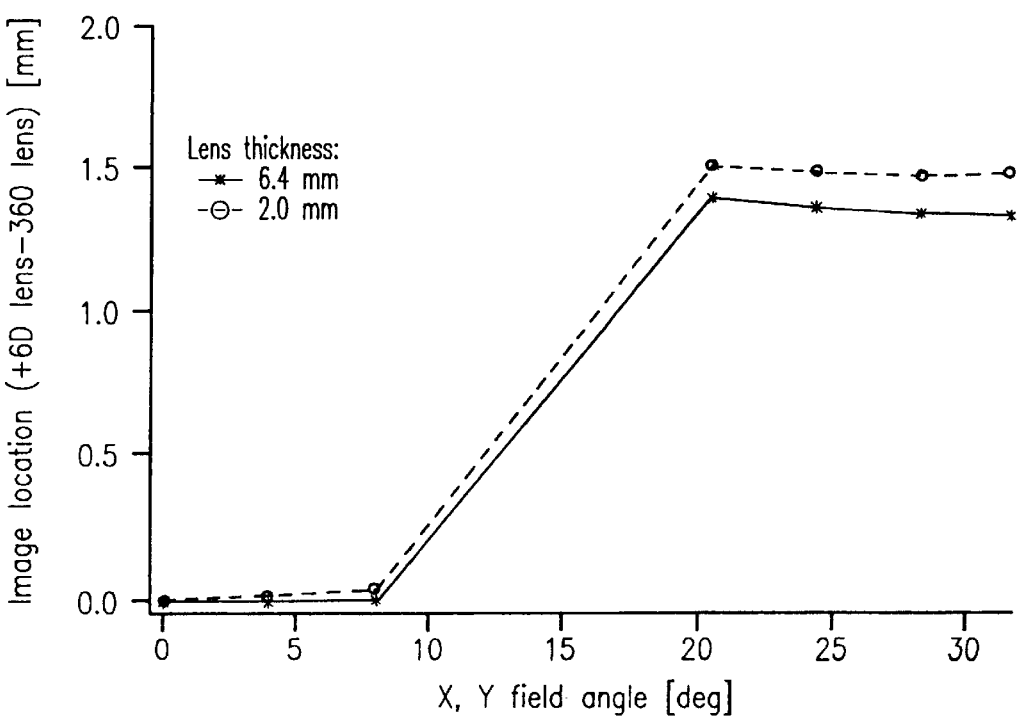
Figure 62:
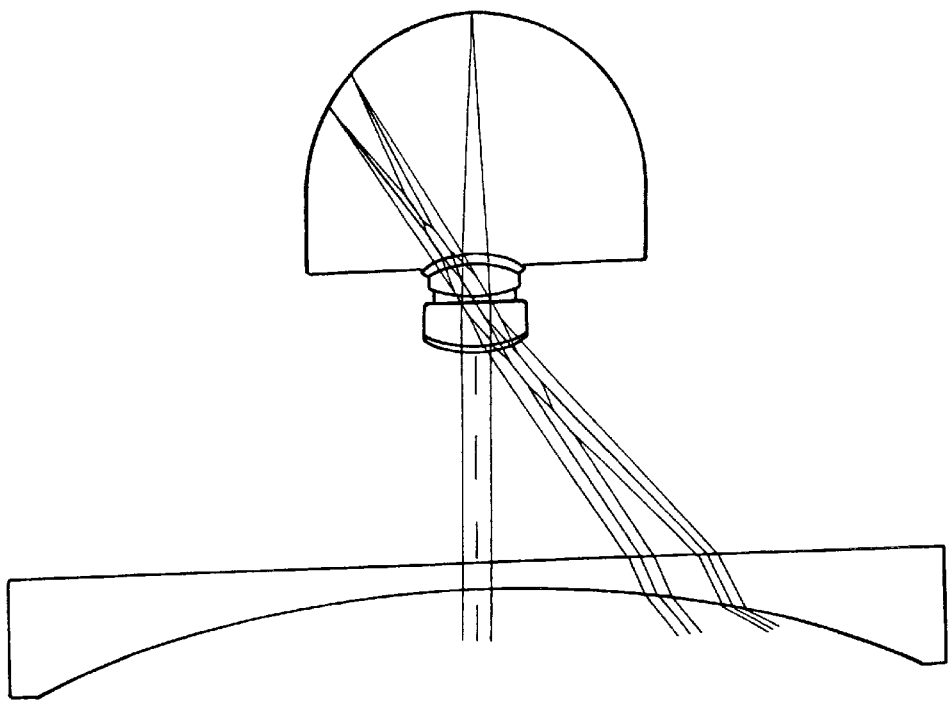
FIG. 62 shows a beam path for the relaxed eye & −6 D lens.
Figure 63:
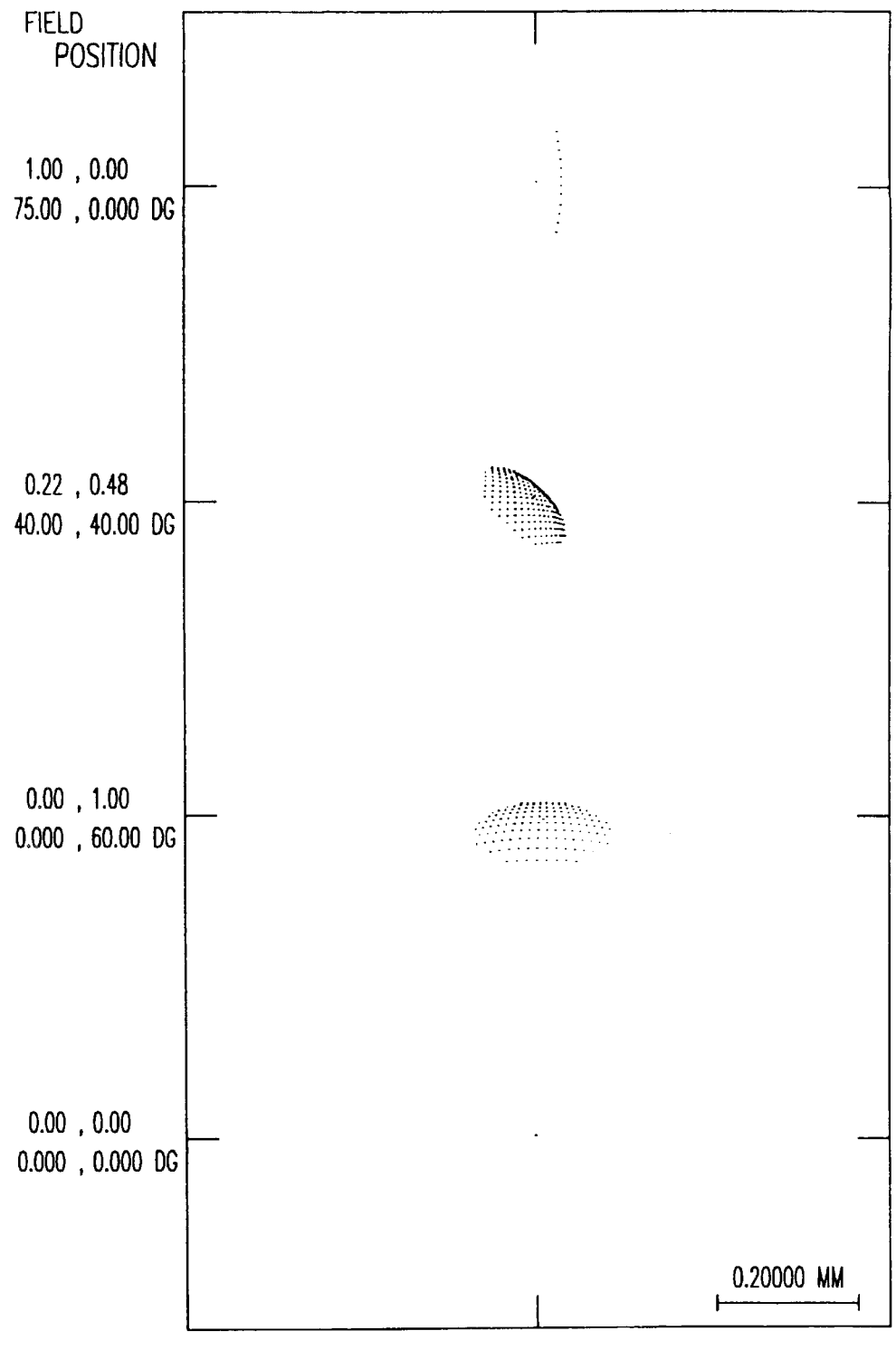
FIG. 63 is a graph comparing field position vs. the relaxed eye & −6 D lens.
Figure 64:
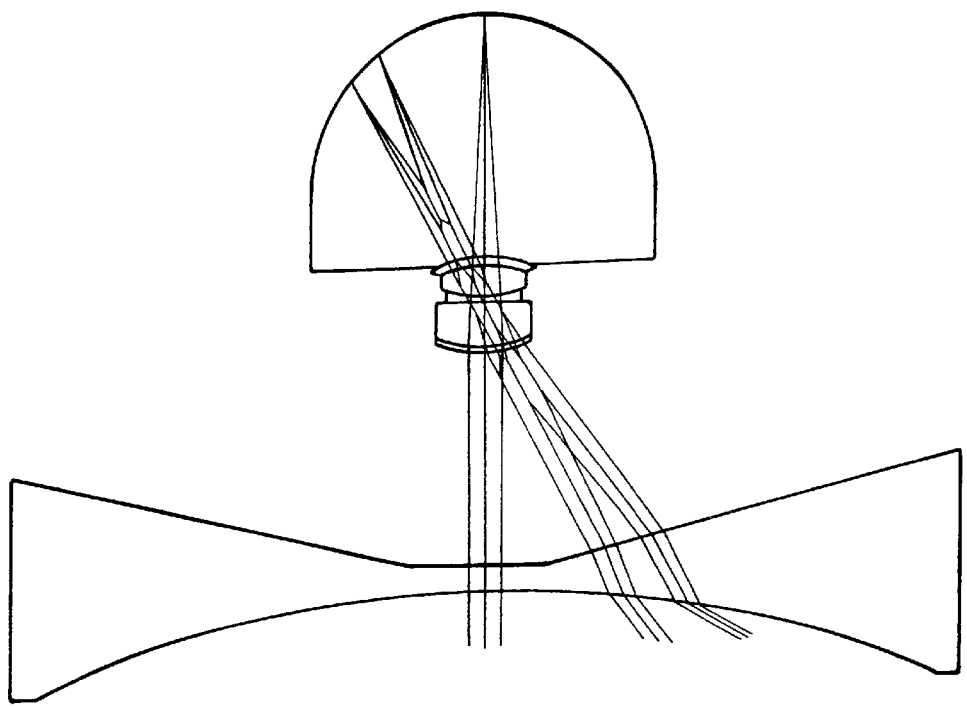
FIG. 64 shows a beam path for the relaxed 360, −6 D lens.
Figure 65:
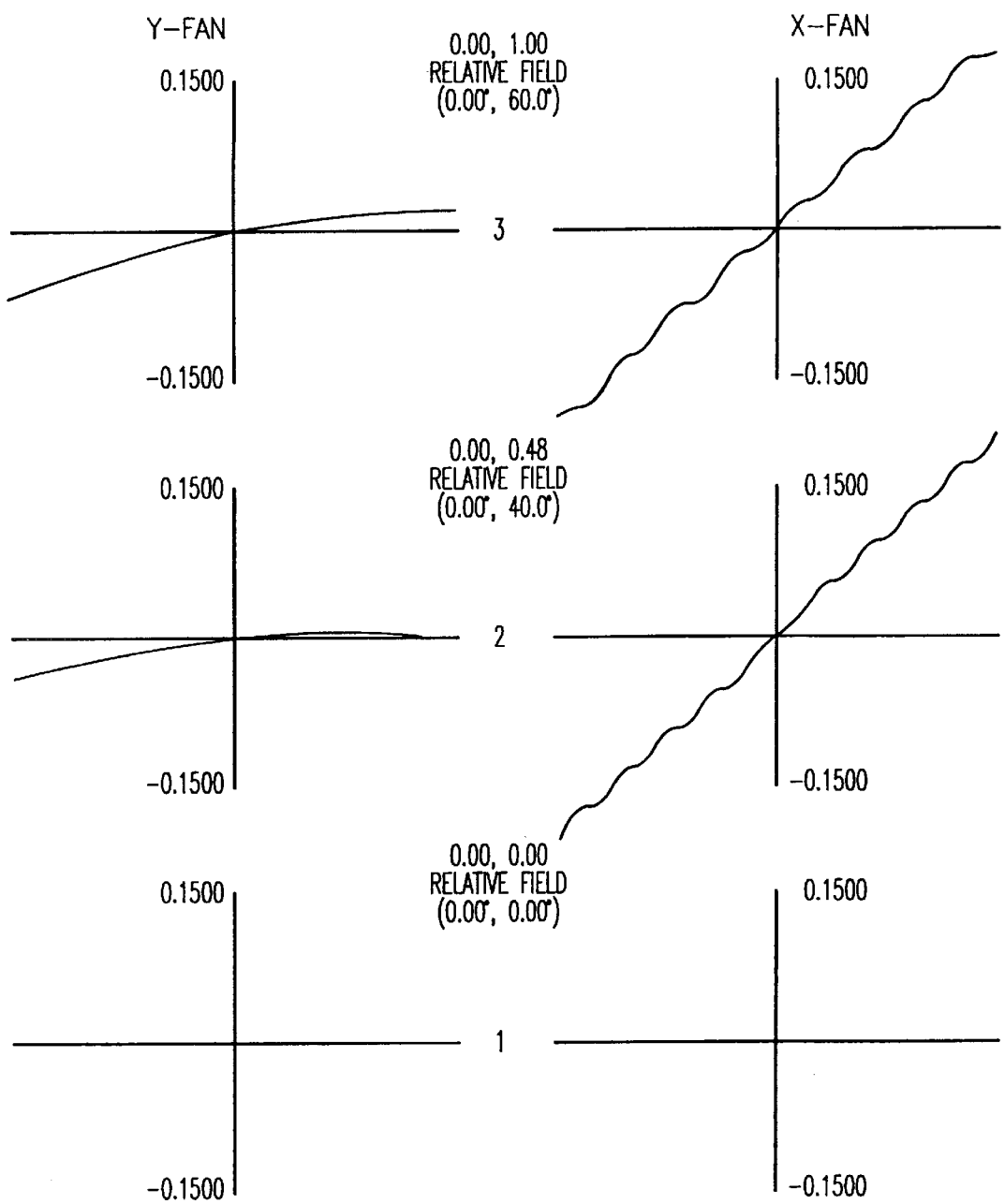
FIG. 65 shows ray aberrations for the relaxed 360, −6 D lens.
Figure 66:
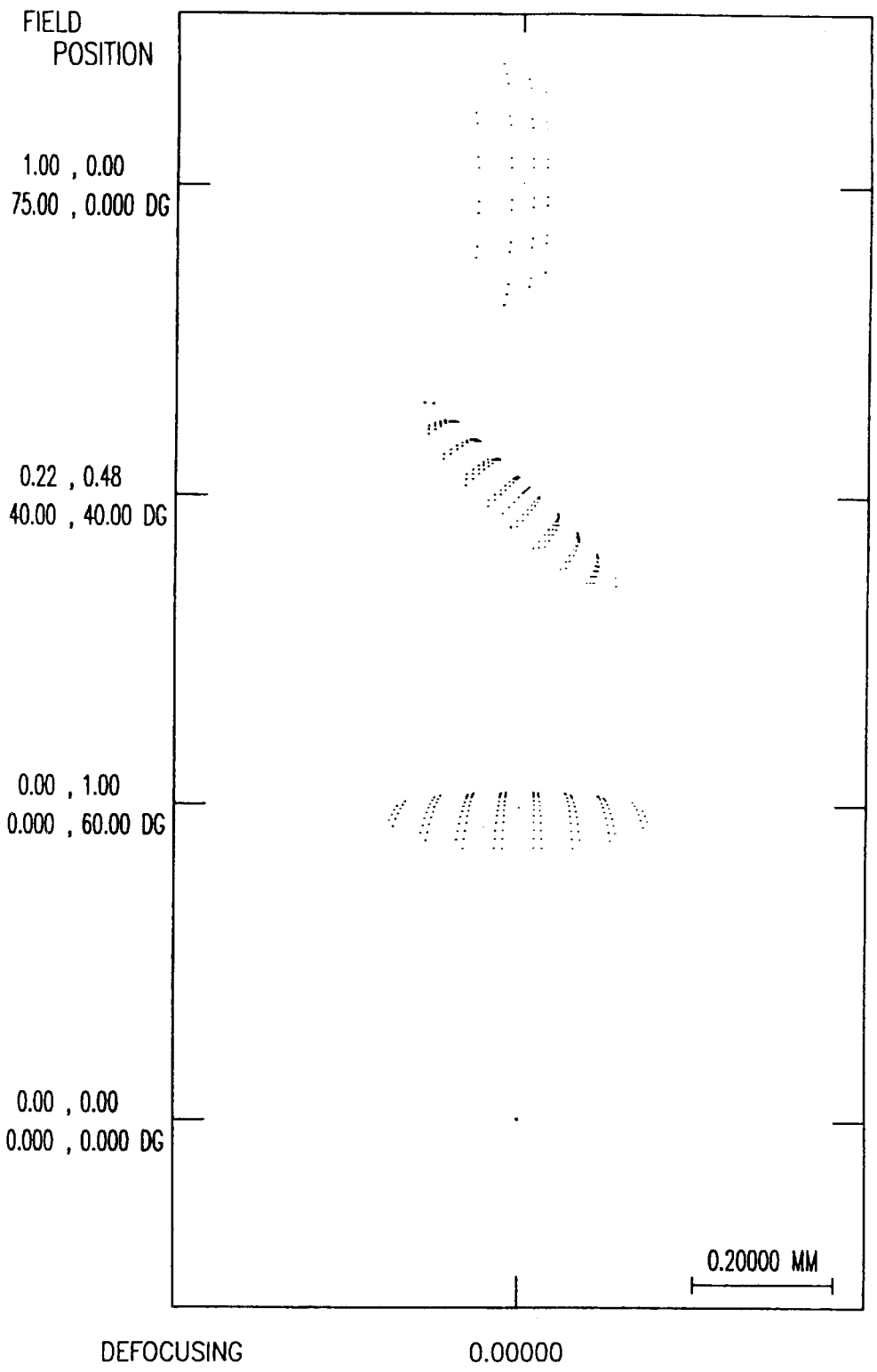
FIG. 66 is a graph comparing field position vs. the relaxed 360, −6 D lens.
Figure 67:
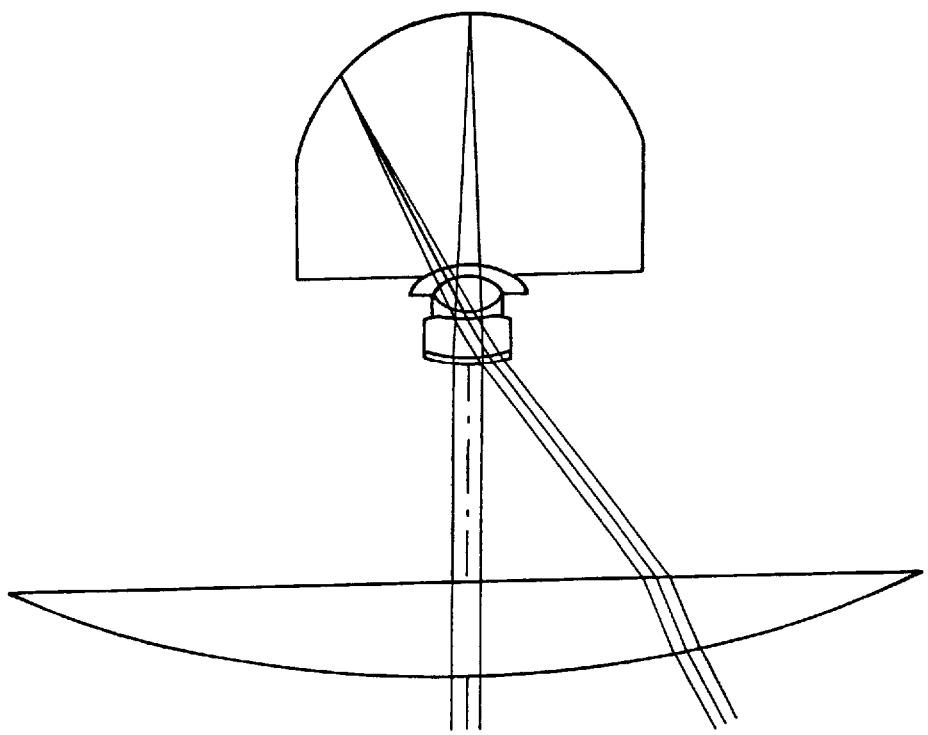
FIG. 67 shows a beam path for the accommodated eye & +6 D lens.
Figure 68:
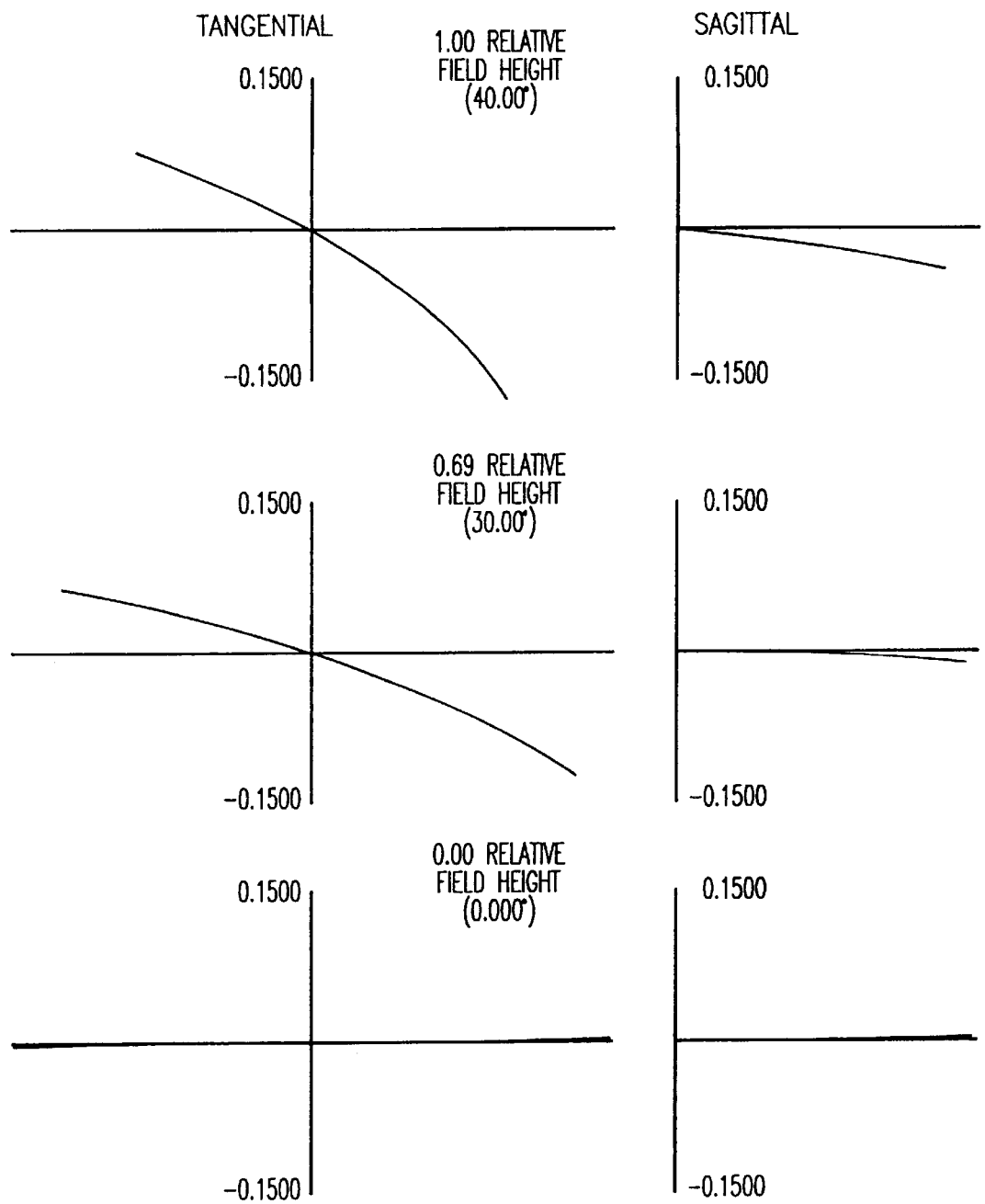
FIG. 68 shows ray aberrations.
Figure 69:
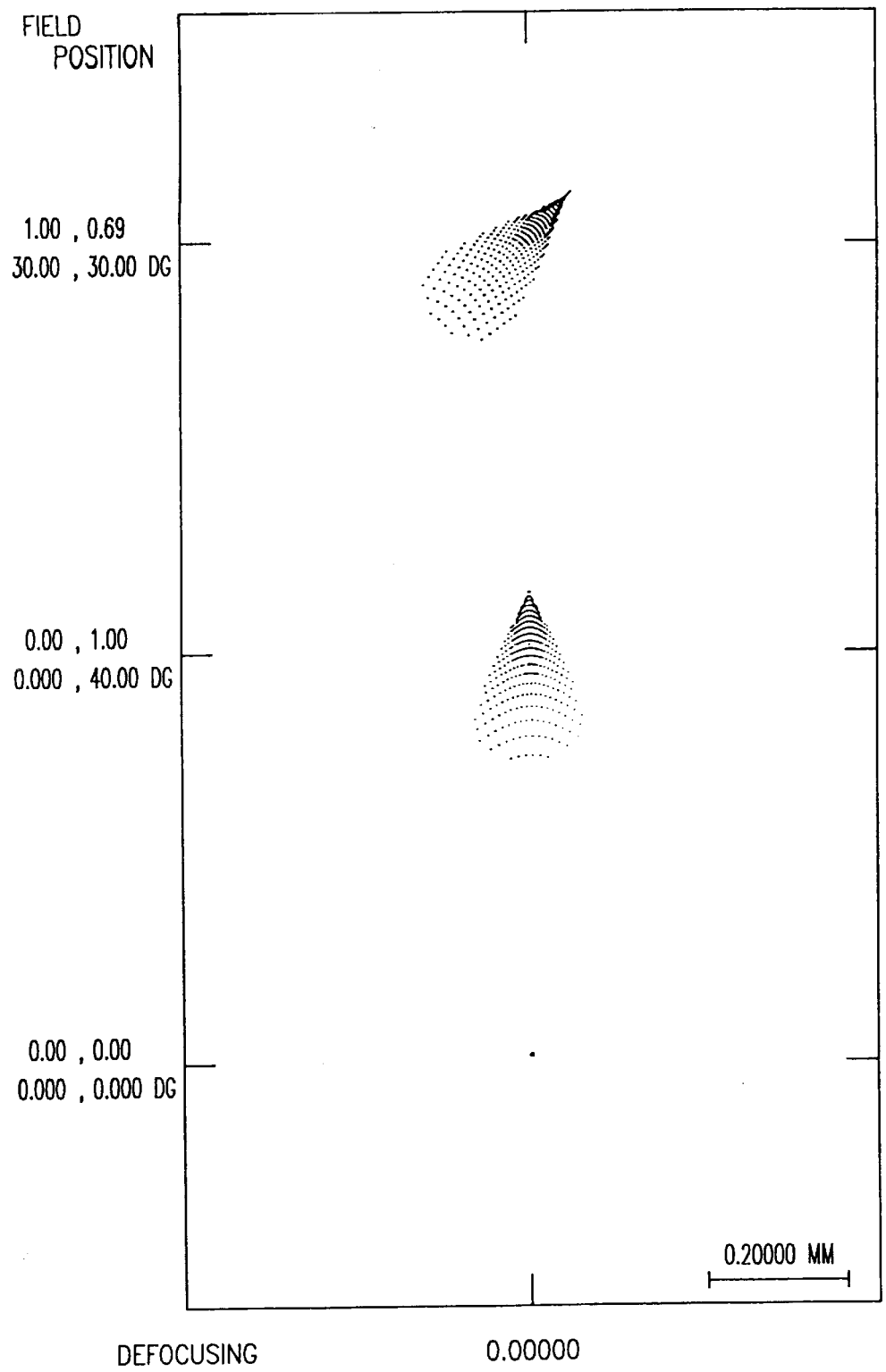
FIG. 69 is a graph comparing field position vs. the accommodated eye & +6 D lens.
Figure 70:
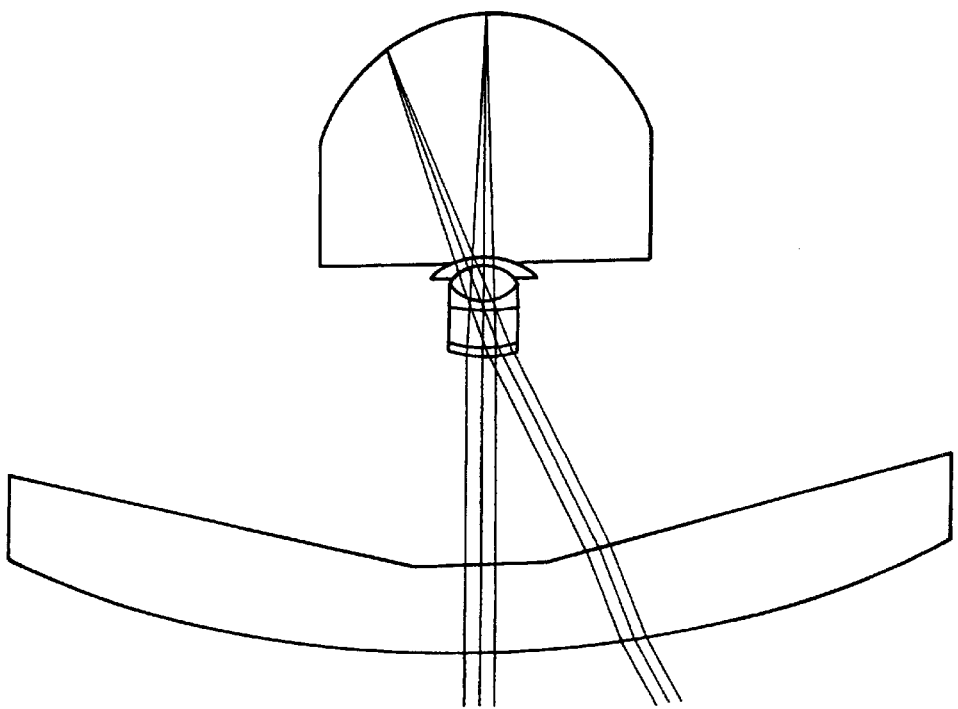
FIG. 70 shows a beam path for an accommodated 360, +6 D lens, 10 mm CA.
Figure 71:
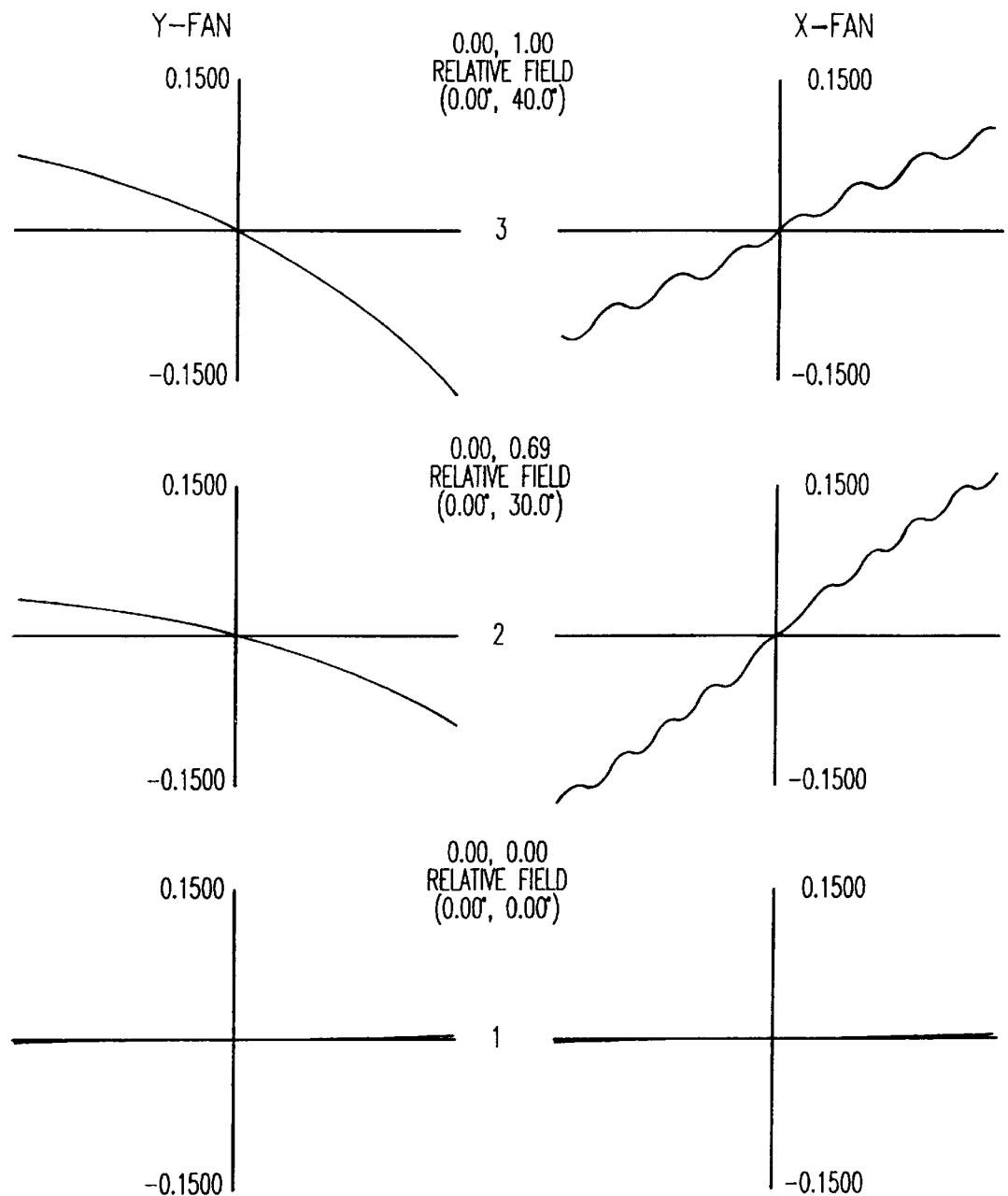
FIG. 71 illustrates ray aberrations.
Figure 72:
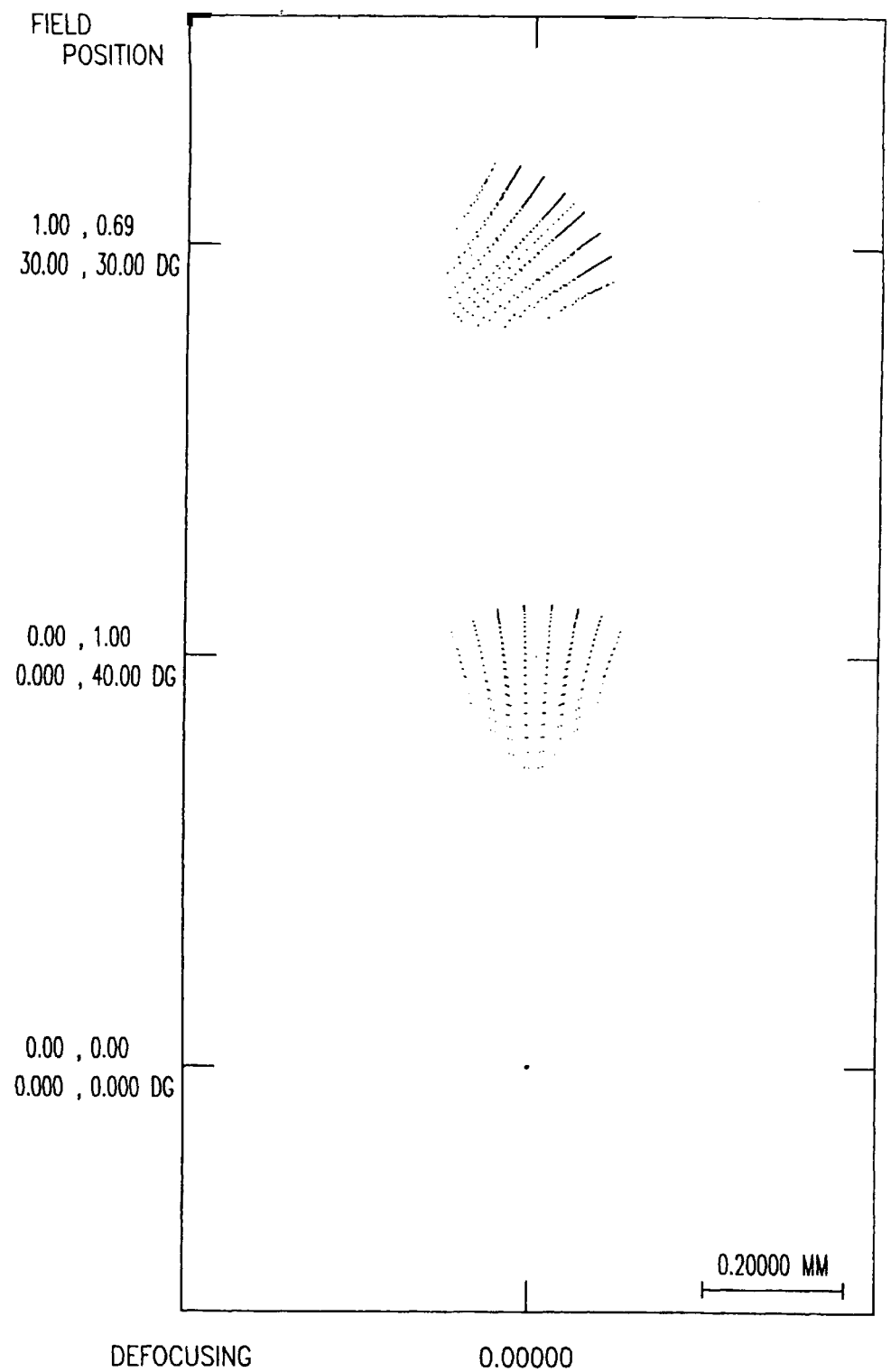
FIG. 72 is a graph comparing field position vs. the accommodated 360, +6 D lens, 10 mm CA.
Figure 73:
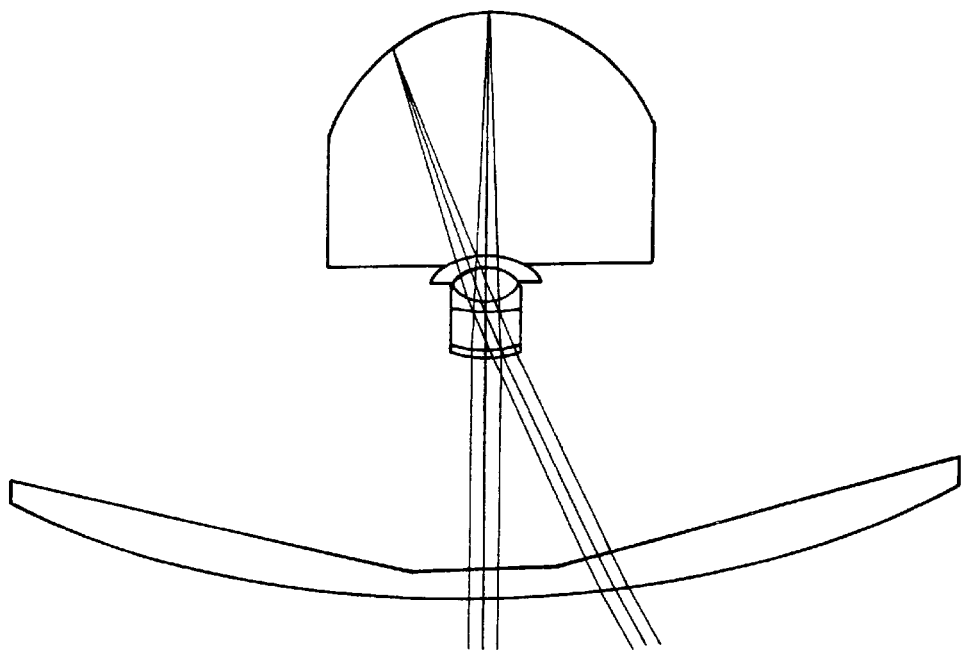
FIG. 73 illustrates a beam path for the accommodated 360 & thin +6 D lens.
Figure 74:
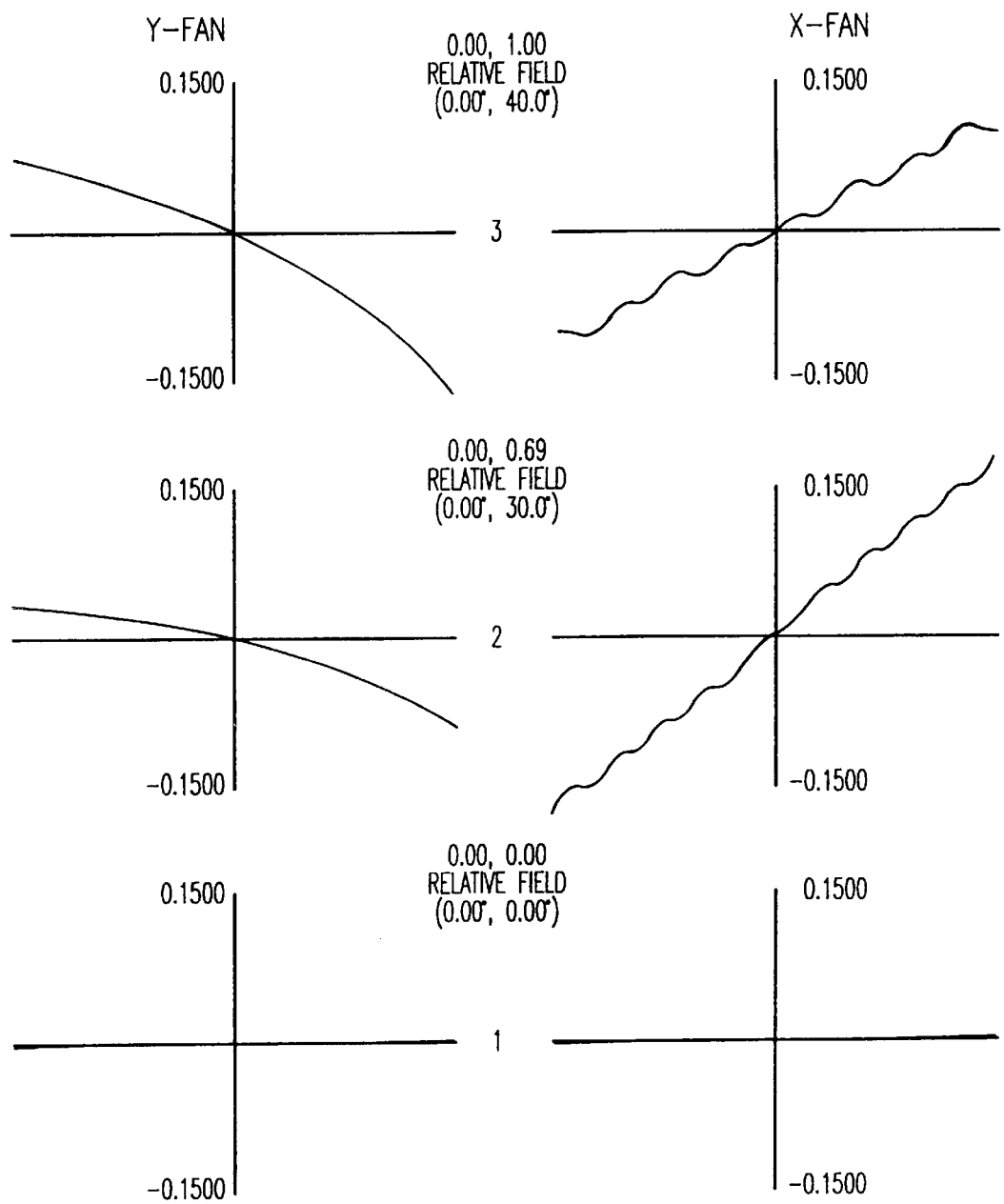
FIG. 74 illustrates ray aberrations.
Figure 75:
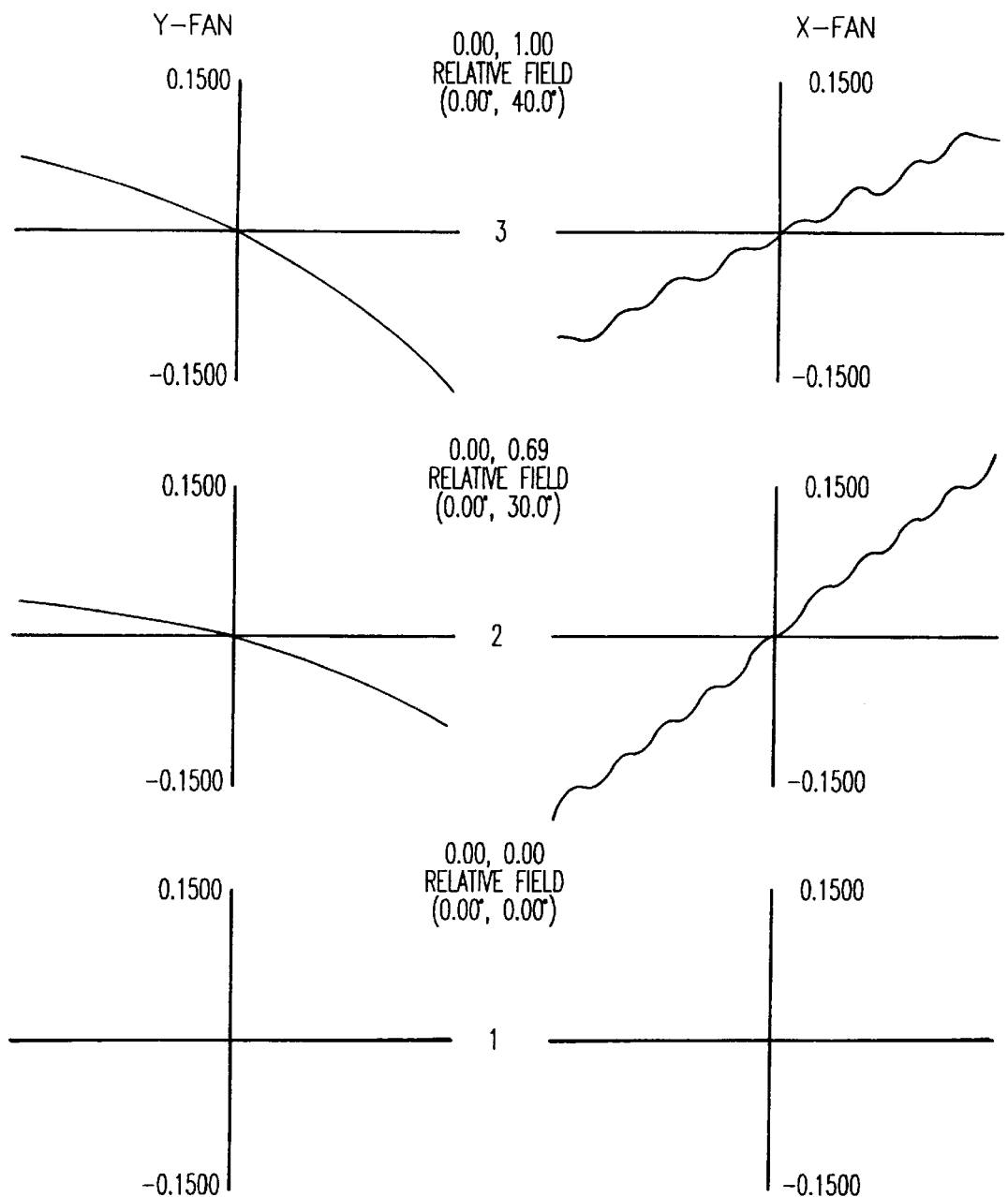
FIG. 75 illustrates ray aberrations.
Figure 76:
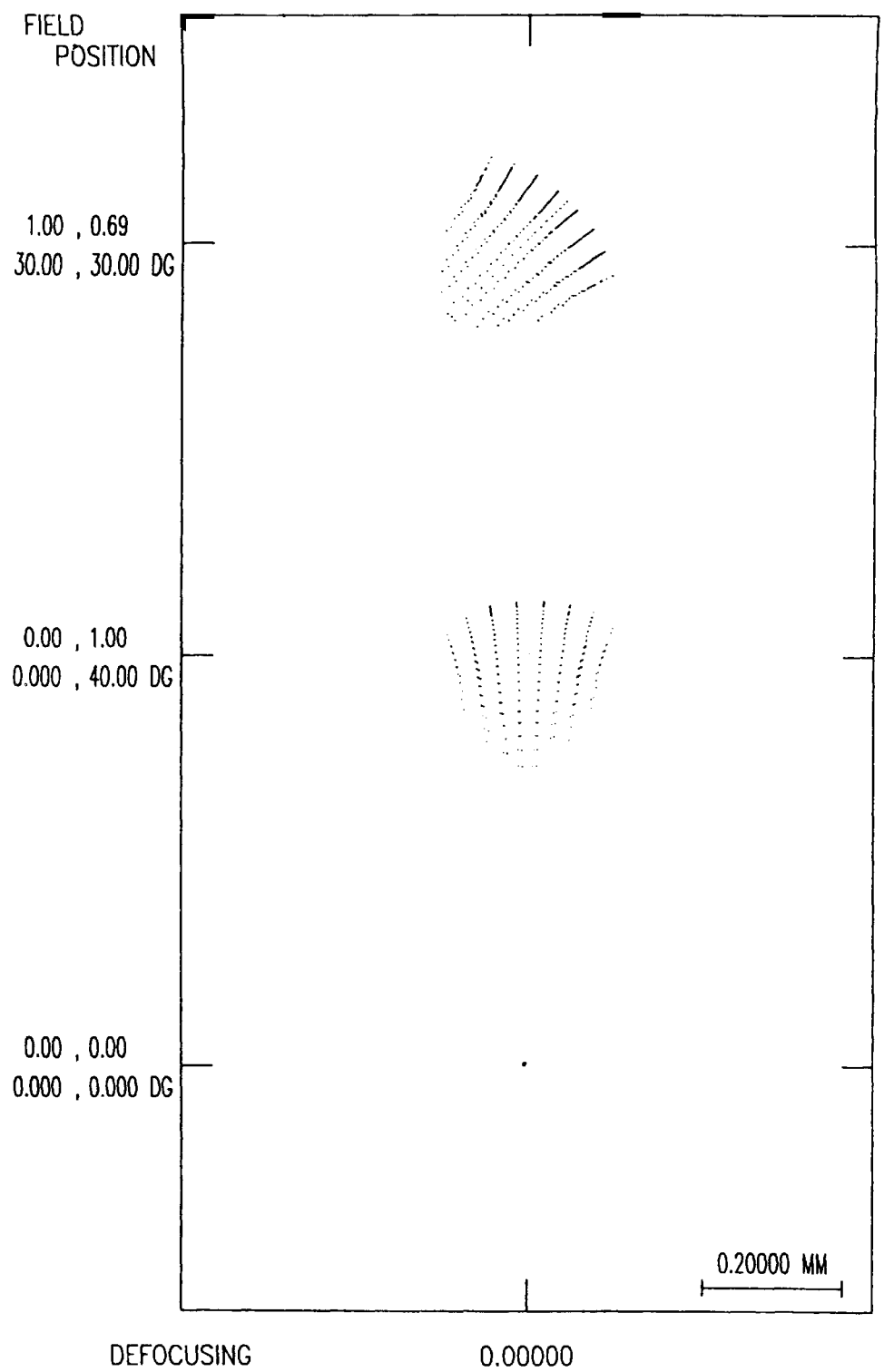
FIG. 76 illustrates a graph comparing field position vs. the accommodated 360 & thin +6 D lens.
Figure 77:
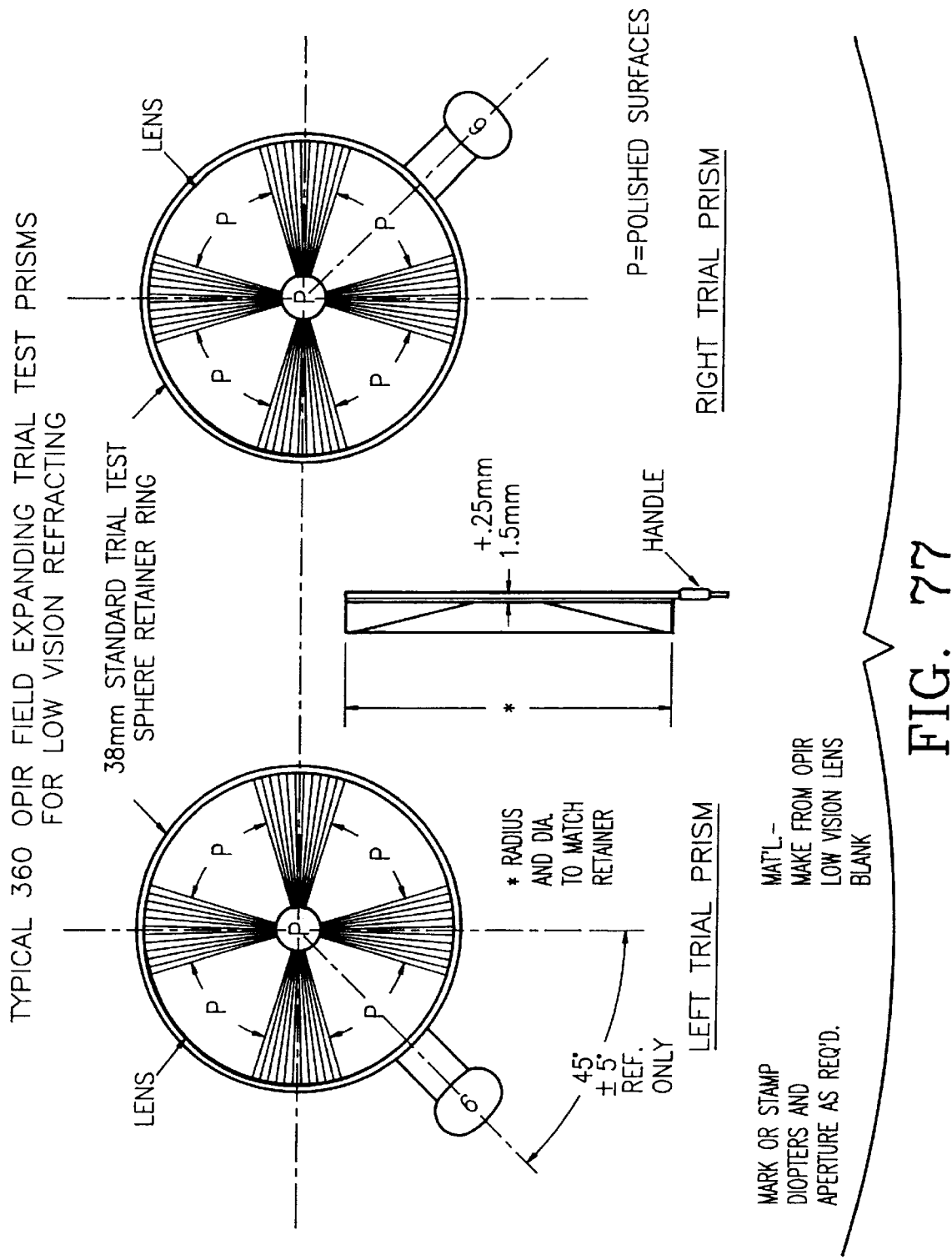
FIG. 77 illustrates a typical 360 OPIR field expanding trial test prisms for low vision refracting.
Figure 78:
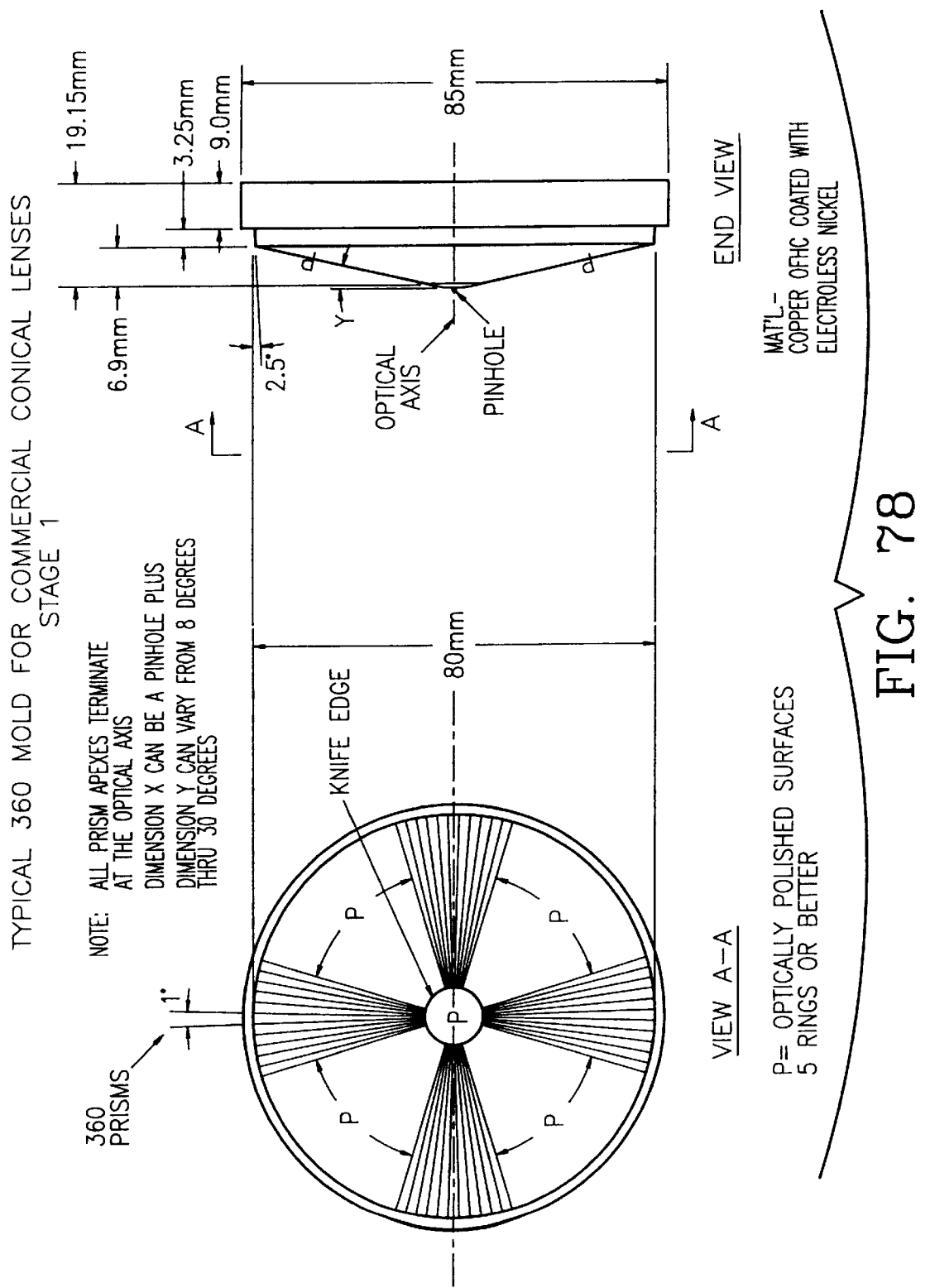
FIG. 78 illustrates a typical 360 mold for commercial conical lenses, Stage 1.
Figure 79:
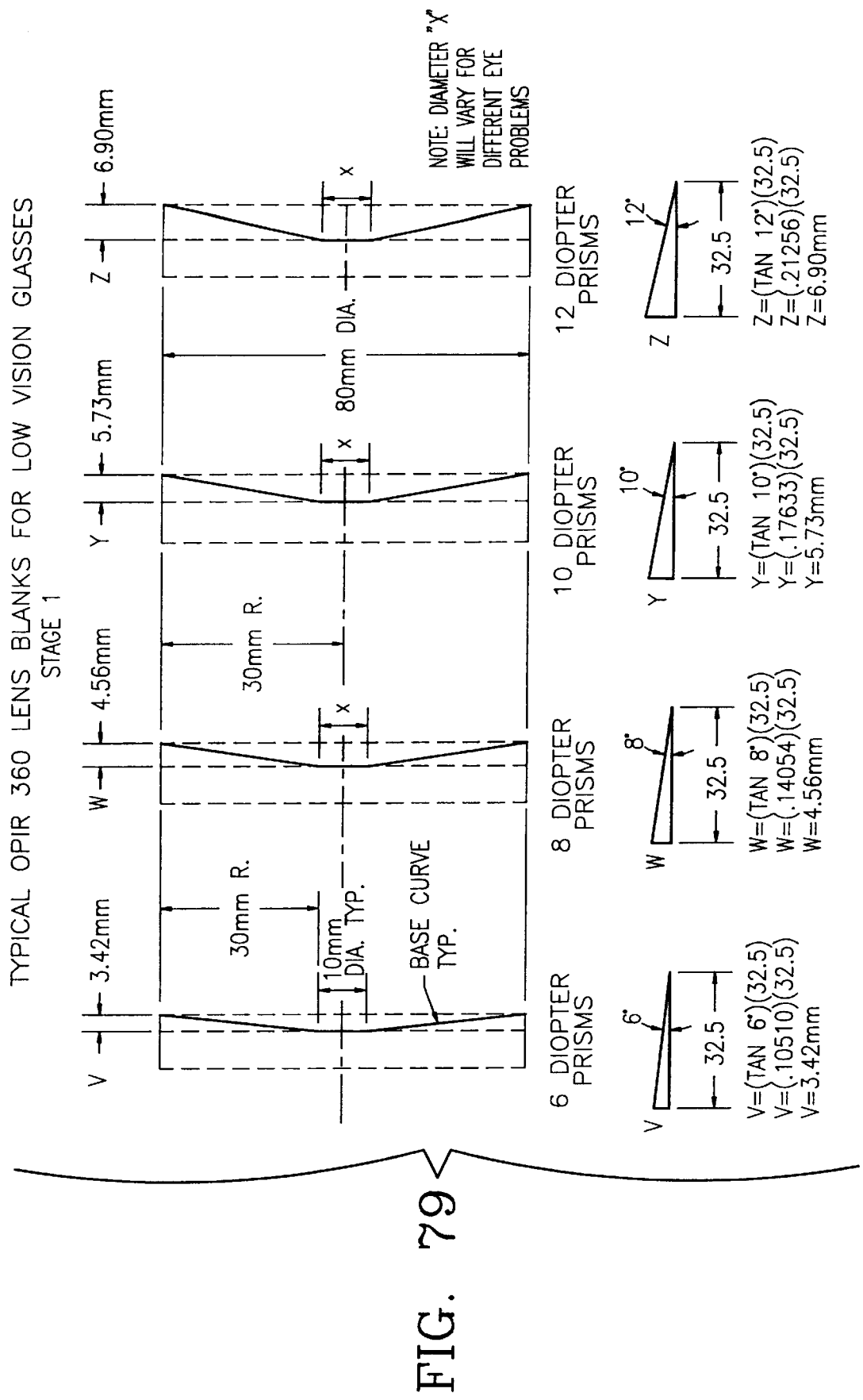
FIG. 79 illustrates a typical OPIR 360 lens Blanks for low vision glasses.
Figure 80:
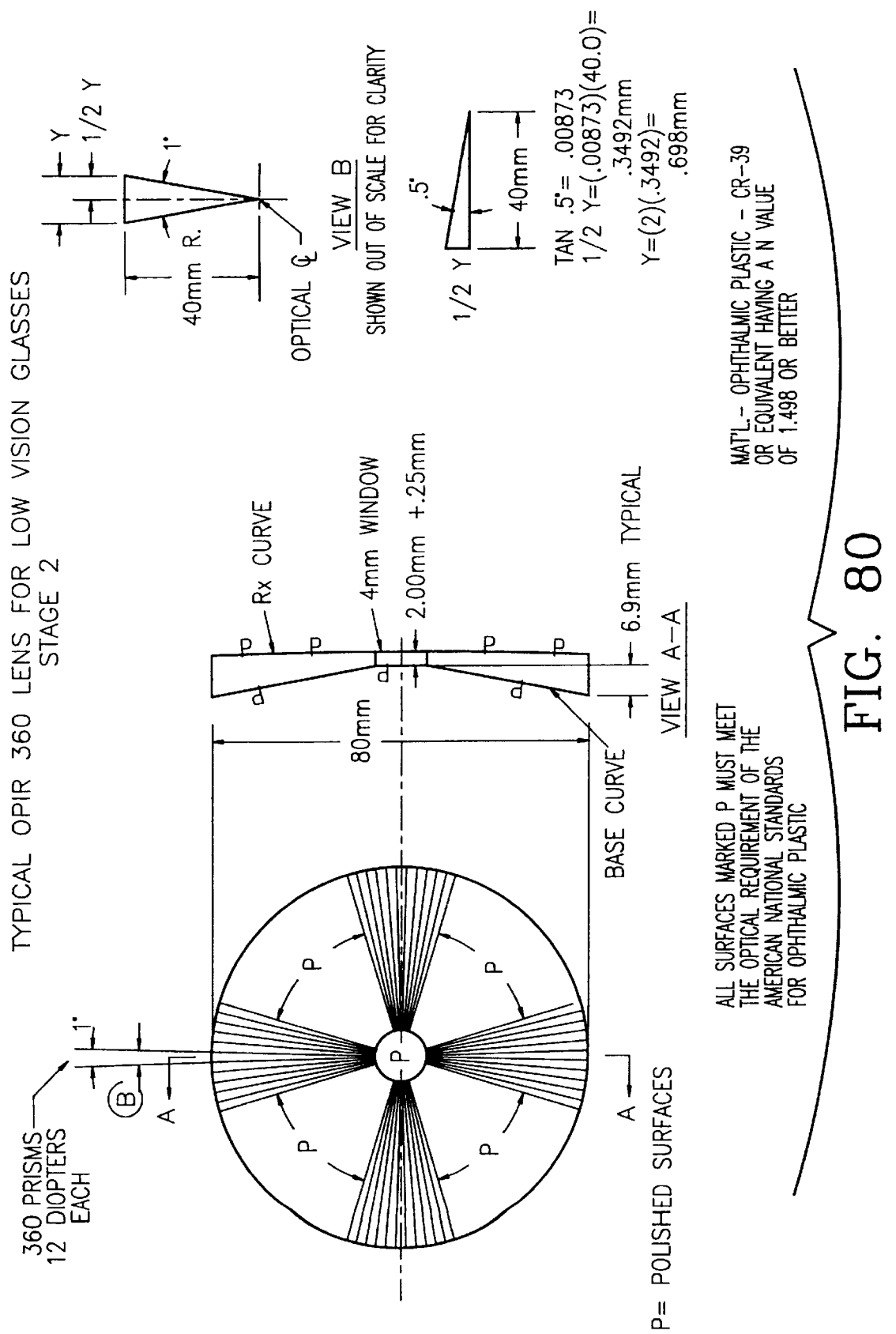
FIG. 80 illustrates a typical OPIR 360 lens for low vision glasses, Stage 2.
Figure 81:
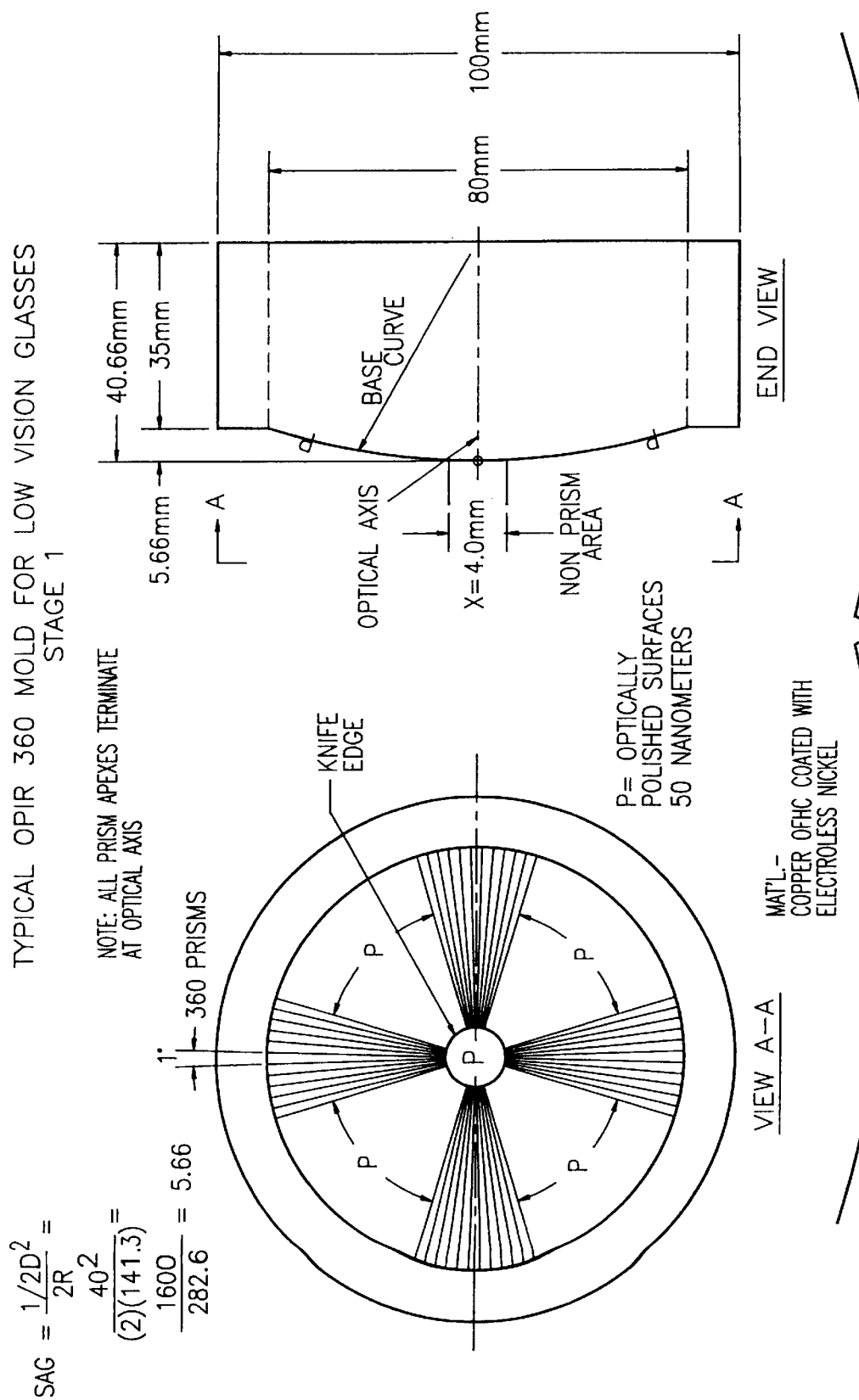
FIG. 81 illustrates a typical OPIR 360 mold for low vision glasses, Stage 1.
Figure 83:
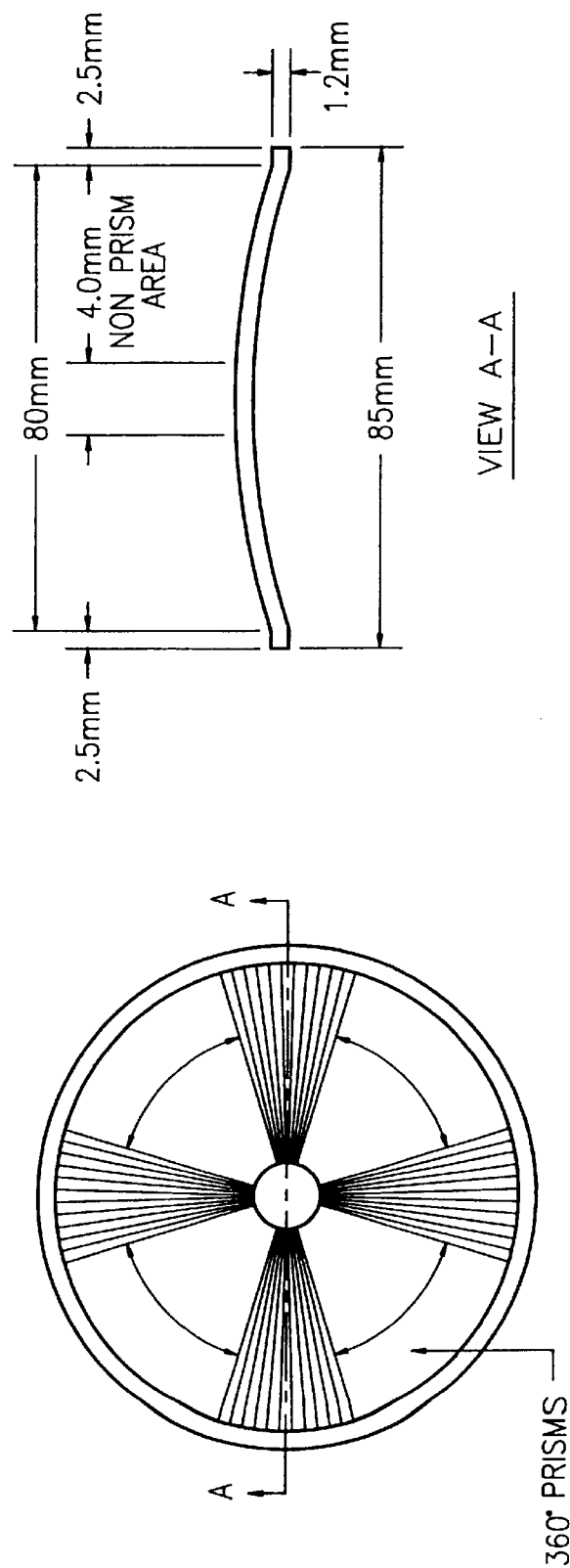
FIG. 83 illustrates a typical OPIR 360 mold for low vision glasses, Stage 3.
Figure 84:
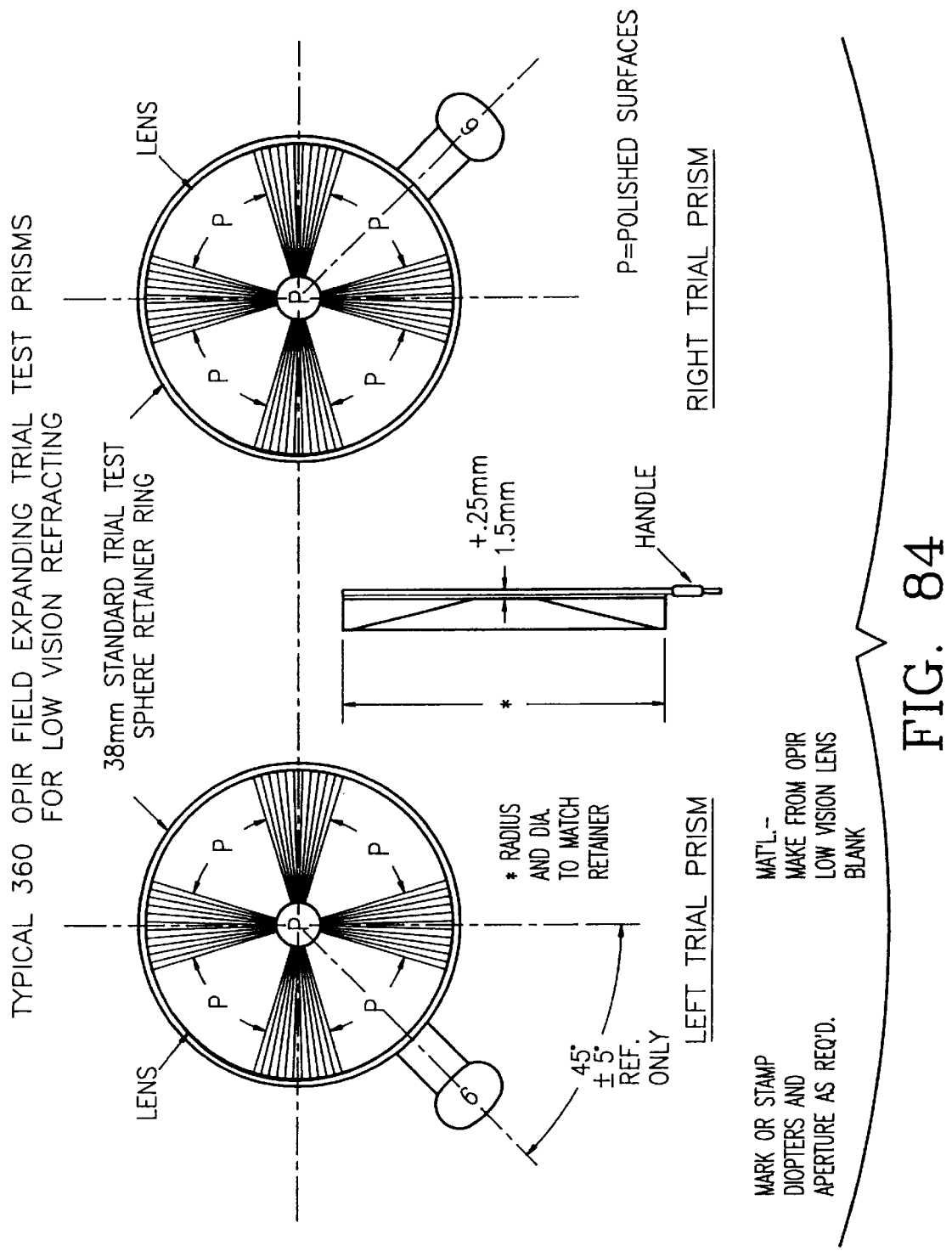
FIG. 84 illustrates a typical 360 OPIR field expanding trial test prisms for low vision refracting.
Figure 85:
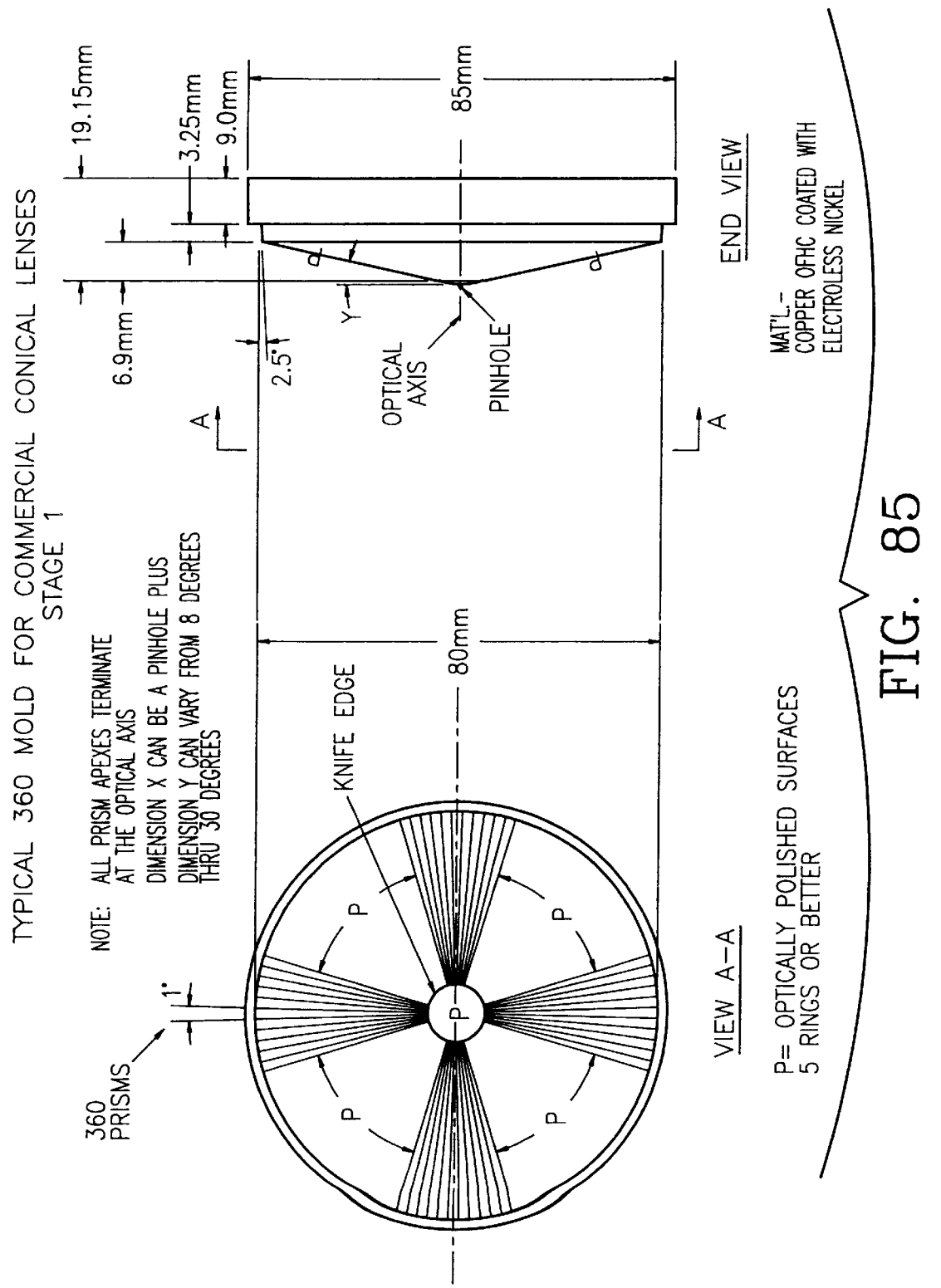
FIG. 85 illustrates a typical 360 mold for commercial conical lenses, Stage 1.
Figure 86:
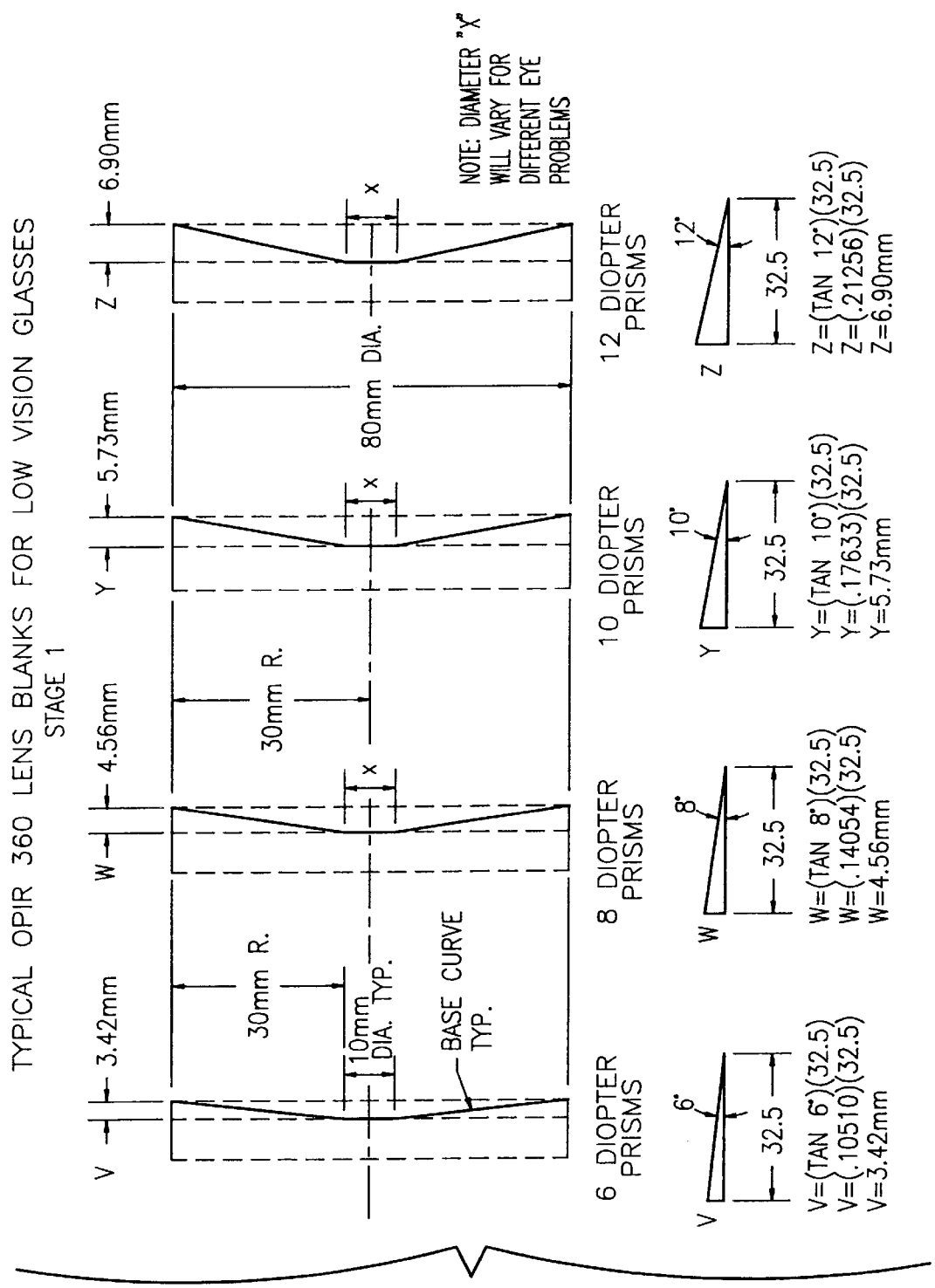
FIG. 86 illustrates a typical OPIR 360 Lens Blanks for low vision glasses.
Figure 87:
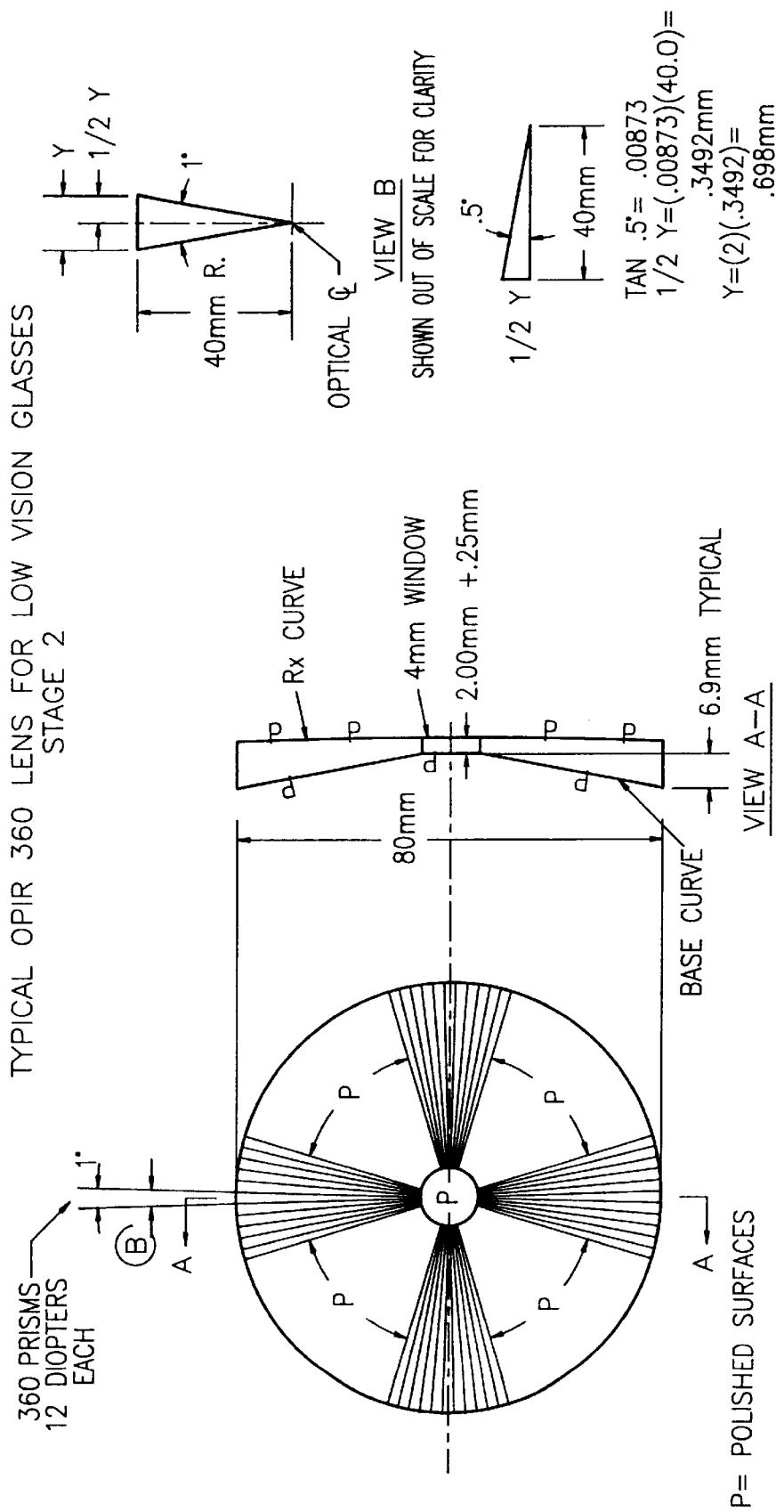
FIG. 87 illustrates typical OPIR 360 lens for low vision glasses, Stage 2.
Figure 88:
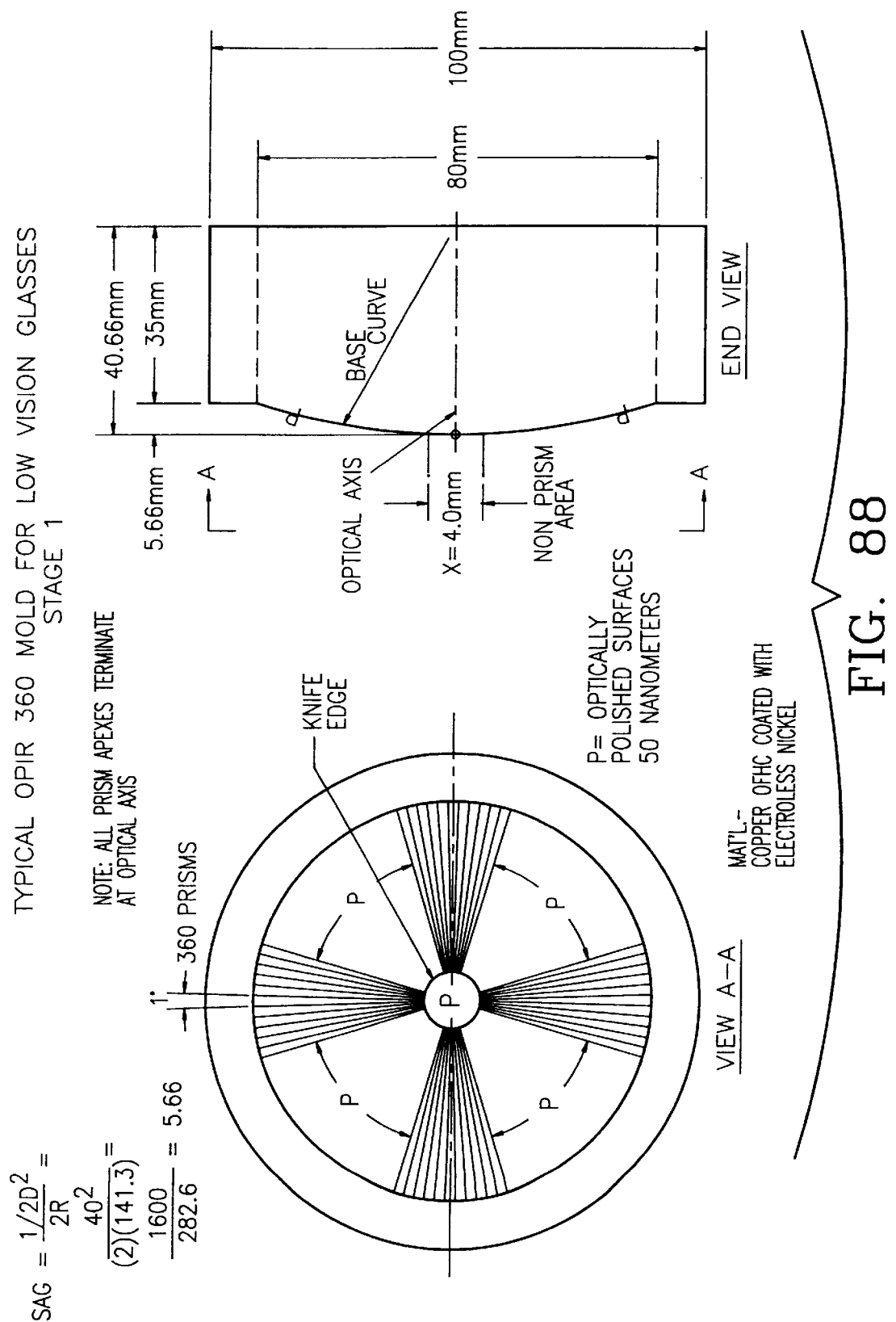
FIG. 88 illustrates typical OPIR 360 mold for low vision glasses, Stage 1.
Figure 90:
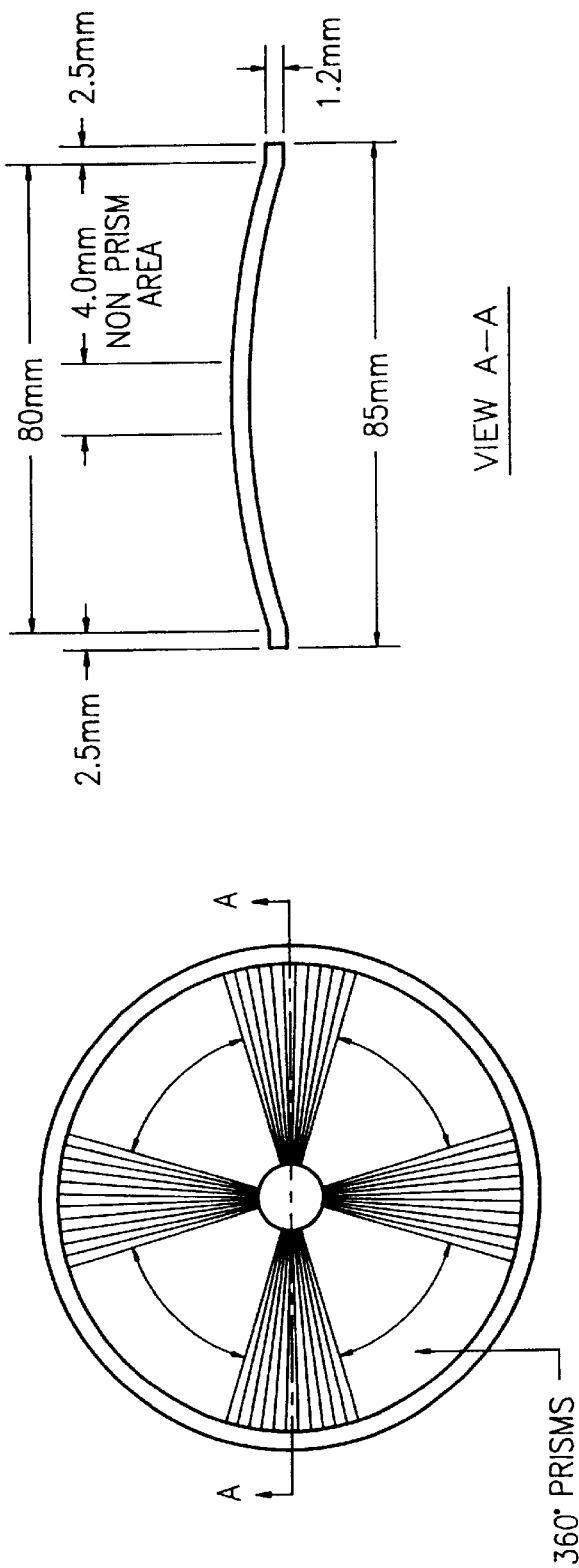
FIG. 90 illustrates typical OPIR 360 mold for low vision glasses, Stage 3.
Figure 91:
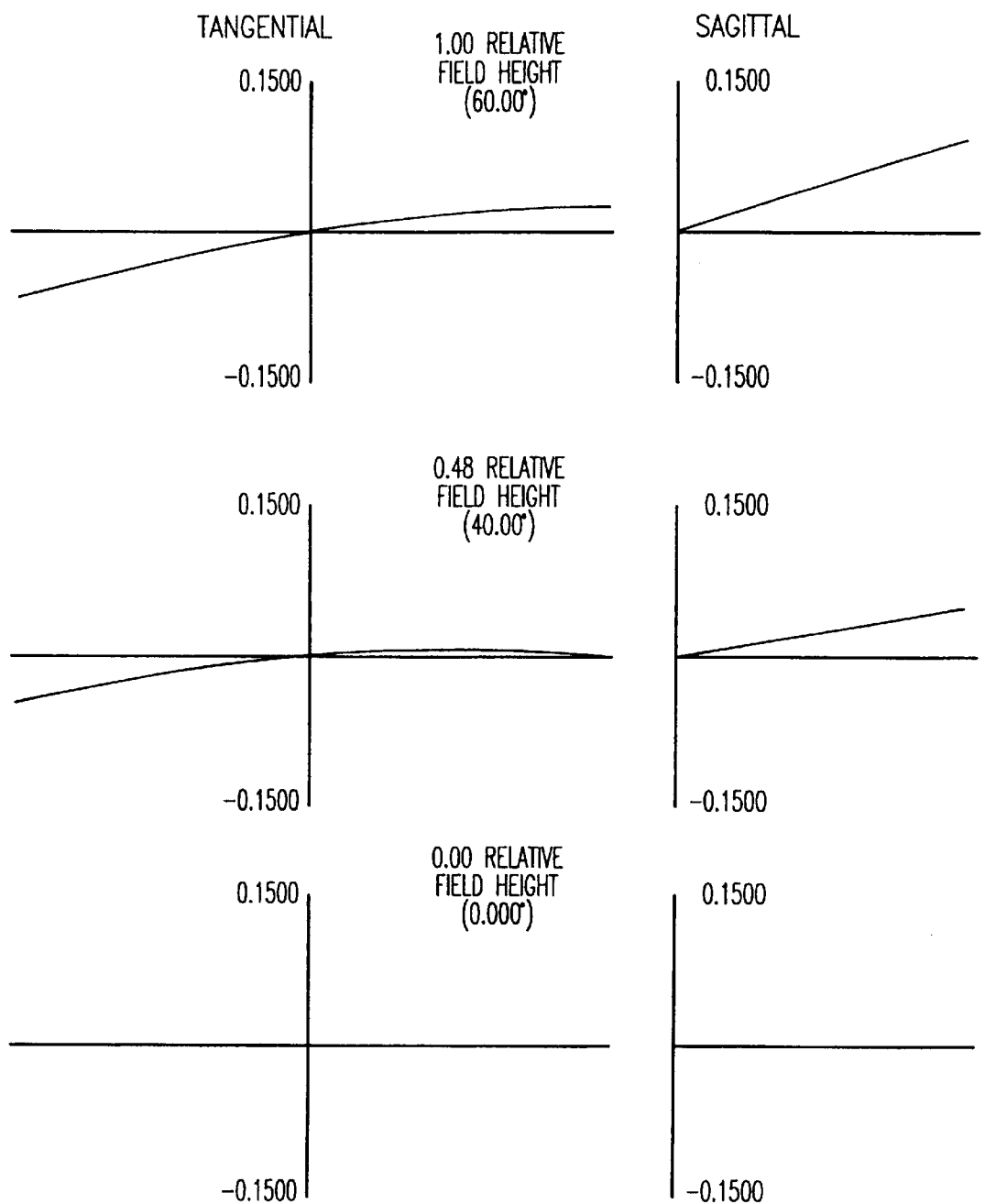
FIG. 91 shows ray aberration charts for a relaxed eye and −6 D lens.

The accommodated eye is detailed in Table 2. It lists the chief ray locations on the retina for the three scenarios of the accommodated eye: normal (nor correction required), with +1.75 D corrective lenses, and with +1.75 D corrective lenses incorporating the 360 concept with 10 mm center aperture. Three object fields are analyzed, and the spot size at each is given. FIGS. 48 through 50 are spot diagrams for these three lenses.

In each of these cases, it is evident that the 360 lens deviates the light toward the center of the retina. While the spot shape does not change, the 360 lens produces a larger spot size than does the plain corrective lens. The 360 lens also produces a structured spot.

Table 3 provides data for the 360° Project Ray Trace Model.

Three systems are considered for both the relaxed and accommodated states of the eye: normal, with ±1.75 D of correction, and with ±1.75 D of correction and 360 twelve diopter prisms arranged about a central clear aperture of 10 mm.

For each system, similar output is produced. Tables 4 to 7 provide the following information for each of the systems analyzed: a brief listing of each system is given, including the curvature, thickness and material for each surface. Next, the transverse third-order aberrations are listed for each surface, followed by the total for the entire system. In the output, the following abbreviations are used:

SA spherical aberration

TCO coma

TAS tangential astigmatism

SAS sagittal astigmatism

PTB Petzval

DST distortion

A fan of rays defined along the x- or y- axis of the aperture stop is traced from each object position, and the deviation o each ray from the real chief ray position for that the left side of the graphs, the tangential (y) fans are shown; the vertical axis represents the y- coordinates of the departure of the rays from the chief ray. The right side of the figures show the sagittal (x) fans, and the vertical axis give the x- coordinates of the ray departure. If rotational symmetry is present, only half of the sagittal fan is displayed. For the systems with the 360 wedges, a full sagittal fan is traced. In these cases, the tangential fan is smooth since the y fan is traced through a single wedge, and the sagittal fan is rippled since the x fan is traced through multiple wedges.

The effect of the 360 wedges on retinal image location is considered next. An object is defined by its position in space described by the vector sum of angular inclinations in the y-z plane (y-angle) and the x-z plane (x-angle), where z is the optical axis. Three linear objects are evaluated by tracing rays corresponding to a vertical line (x-angle=0°, y-angle varies), a horizontal line (x-angle varies, y-angle=0°), and a 45° line (x-angle=y-angle). In each case the orientation was preserved, but the image location altered. Due to the symmetry of the system, the results for the horizontal line were identical to the results for the vertical line except that the x and y coordinates were reversed. Therefore, only data from the vertical line is shown. Tables 8 and 9 list the image location as a function of varying field angle for the three objects for the relaxed eye. The flat portion of the curve corresponds to objects imaged through the central clear aperture of the lens. Tables 10 and 11 give the same information for the cases with the accommodated eye.

Tables 12 to 16 plot third order aberrations for a relaxed eye and −6 D lens, a relaxed 360, 10 mm CA, an accommodated standard eye, an accommodated eye and +1.75 D lens, and an accommodated 360, 10 mm CA.

Tables 17 to 19 and 26 to 31 show empirical data for an accommodated and +6 D lens.

Tables 20 to 25 show empirical data for a relaxed eye and −6 D lens.

Tables 32 to 37 show the formulae in tabular format for deriving the various optometric parameters.

TABLE 1

Data for 360° Project Ray Trace Model

| | |
|---|---|
| Wavelength (nm) | 589.3 (D light) |
| Field of View (degrees) | 130° high by 200° wide |
| Pupil Diameter (mm) | 5 |
| Lens diameier (mm) | 65 |
| Material for lens and wedges | CR-39, ($n_D$ = 1.4985) |
| Apex angle of optical wedges (deg) | 13.7267 |

TABLE 2

Powers of Eye Surfaces

Notes:
1. "A." denotes anterior surface of structure.
2. "P." denotes posterior surface of structure.
3. Retina is surface # 7 of the eye, and has curvature of 81.9872 (1/m)

RELAXED STANDARD EYE

| | Object | A. Cornea | P. cornea | A. lens cortex | A. lens core | P. lens core | P. lens cortex |
|---|---|---|---|---|---|---|---|
| Surface number | 0 | 1 | 2 | 3 | 4 | 5 | 6 |
| Curvature (1/m) | 0.0000 | 129.8701 | 147.0588 | 100.0000 | 26.4063 | 173.6111 | −168.6667 |
| Radius of curv (mm) | | 7.7000 | 6.8000 | 10.0000 | 7.9110 | −5.7600 | −6.0000 |
| Thickness (m) | 1 E+12 | 0.0005 | 0.0031 | 0.0005 | 0.0024 | 0.0006 | 17.2000 |
| Thickness (mm) | | 0.5000 | 3.1000 | 0.5460 | 2.4190 | 0.6350 | 1.72 E+04 |
| Index (after surf.) | 1.0000 | 1.3760 | 1.3360 | 1.3860 | 1.4060 | 1.3860 | 1.3360 |
| Power (diopters) | 0.0000 | 48.8312 | −5.8824 | 5.0000 | 2.5281 | 3.4722 | 8.3333 |
| Reduced Thickness (m) | 1 E+12 | 0.0004 | 0.0023 | 0.0004 | 0.0017 | 0.0005 | 12.8743 |
| Power of: (diopters) | | Cornea: | 43.0532 | | lens core: | 5.9852 | |
| | | | | | A. cortex + core: | 10.9361 | |
| | | | | | equivalent lens | 19.1141 | |
| | | | | | cornea + lens: | 58.6379 | |

RELAXED
EYE REQUIRING −1.75 D CORRECTION      Required power of eye = 58.85 D

Power of: (diopters)
cornea:            43.28
Ant surface:       49.06
curv ant surf (1/m) 130.48

| | Object | A. Cornea | P. cornea | A. lens cortex | A. lens core | P. lens core | P. lens cortex |
|---|---|---|---|---|---|---|---|
| Surface number | 0 | 1 | 2 | 3 | 4 | 5 | 6 |
| Curvature (1/m) | 0.0000 | 130.4834 | 147.0588 | 100.0000 | 26.40631 | −173.6111 | −166.6667 |
| Radius of curv (mm) | | 7.6638 | 6.8000 | 10.0000 | 7.9110 | −5.7600 | −6.0000 |
| Thickness (m) | 1 E+12 | 0.0005 | 0.0031 | 0.0005 | 0.0024 | 0.0006 | 17.2000 |
| Thickness (mm) | | 0.5000 | 3.1000 | 0.5460 | 2.4190 | 0.6350 | 1.72 E+04 |
| Index (after surf.) | 1.0000 | 1.3760 | 1.3360 | 1.3860 | 1.4060 | 1.3860 | 1.3360 |
| Power (diopters) | 0.0000 | 49.0618 | −5.8824 | 5.0000 | 2.5281 | 3.4722 | 8.3333 |
| Reduced Thickness (m) | 1 E+12 | 0.0004 | 0.0023 | 0.0004 | 0.0017 | 0.0005 | 12.8743 |
| Power of: (diopters) | | Cornea: | 43.2843 | lens | core: | 5.9852 | |
| | | | | A. | cortex +core: | 10.9361 | |
| | | | | equivalent | lens | 19.1141 | |
| | | | | cornea | +lens: | 58.8500 | |

Notes:
1. "A." denotes anterior surface of structure.
2. "P." denotes posterior surface of structure.
3. Retina is surface # 7 of the eye, and has curvature of 81.9672 (1/m)

ACCOMMODATED
EYE REQUIRING +1.75 D CORRECTION      Required power of eye: 70.68 D Power of: (diopters)
cornea:            43.18
Ant surface:       48.96
curv ant surf (1/m) 130.22

| | Object | A. Cornea | P. cornea | A. lens cortex | A. lens core | P. lens core | P. lens cortex |
|---|---|---|---|---|---|---|---|
| Surface number | 0 | 1 | 2 | 3 | 4 | 5 | 6 |
| Curvature (1/m) | 0.0000 | 130.2183 | 47.0588 | 187.6173 | 76.6478 | −376.6478 | −187.6173 |
| Radius of curv (mm) | | 7.6794 | 6.8000 | 5.3300 | 2.6550 | −2.6550 | −5.3300 |
| Thickness (m) | 1 E+12 | 0.0005 | 0.0027 | 0.0007 | 0.0027 | 0.0007 | 17.2000 |
| Thickness (mm) | | 0.5000 | 2.7000 | 0.6725 | 2.6550 | 0.6725 | 1.72 E+04 |
| Index (after surf.) | 1.0000 | 1.3760 | 1.3360 | 1.3860 | 1.4060 | 1.3860 | 1.3360 |
| Power (diopters) | 0.0000 | 48.9621 | −5.8824 | 9.3809 | 7.5330 | 7.5330 | 9.3809 |
| Reduced Thickness (m) | 1 E+12 | 0.0004 | 0.0020 | 0.0005 | 0.0019 | 0.0005 | 12.8743 |
| Power of: (diopters) | | Cornea: | 43.1844 | | lens core: | 14.9588 | |
| | | | | | A. cortex + core: | 24.0809 | |

TABLE 2-continued

Powers of Eye Surfaces

| 75 | | equivalent lens | 33.0452 |
| 76 | | cornea + lens: | 70.6800 |

TABLE 3

Data for 360° Project Ray Trace Model

| Wavelength (nm) | 589.3 (D light) |
| Field of View (degrees) | 130° high by 200° wide |
| Pupil Diameter (mm) | 5 |
| Lens diameter (mm) | 65 |
| Material for lens and wedges | CR-39, ($n_D$ = 1.4985) |
| Apex angle of optical wedges (deg) | 13.7267 |

TABLE 4

Relaxed Eye
Field points are (x angle, y angle) in degrees; chief ray is (x, y) location on retina in mm; rms spot size is in microns

| Field point | Standard eye | Eye & −1.75 D lens | Eye, lens, and wedges |
|---|---|---|---|
| (0, 0) | | | |
| chief ray | 0, 0 | 0, 0 | 0, 0 |
| rms spot size | 0.11 | 0.086 | 0.086 |
| (0, 60) | | | |
| chief ray | 0, 12.01 | 0, 11.57 | 0, 10.53 |
| rms spot size | 66.7 | 72.6 | 157.0 |
| (40, 40) | | | |
| chief ray | 7.88, 7.98 | 7.59, 7.68 | 6.67, 6.75 |
| rms spot size | 57.1 | 56.3 | 167.4 |
| (75, 0) | | | |
| chief ray | 12.13, 0 | 11.97, 0 | 11.25, 0 |
| rms spot size | 86.2 | 91.1 | 162.8 |

TABLE 5

Accomodated Eye
Field points are (x angle, y angle) in degrees; chief ray is (x, y) location on retina in mm; rms spot size is in microns

| Field point | Standard eye | Eye & +1.75 D lens | Eye, lens, and wedges |
|---|---|---|---|
| (0, 0) | | | |
| chief ray | 0, 0 | 0, 0 | 0, 0 |
| rms spot size | 3.6 | 7.8 | 7.8 |
| (0, 40) | | | |
| chief ray | 0, 9.69 | 0, 10.05 | 0, 8.4 |
| rms spot size | 135.3 | 136.6 | 164.6 |
| (30, 30) | | | |
| chief ray | 6.77, 6.77 | 7.01, 7.01 | 5.84, 5.84 |
| rms spot size | 131.9 | 132.9 | 169.1 |

TABLE 6

Relaxed Eye
Field points are (x angle, y angle) in degrees; chief ray is (x, y) location on retina in mm; rms spot size is in microns

| Field point | Standard eye | Eye & −6 D lens | Eye, lens, and wedges |
|---|---|---|---|
| (0, 0) | | | |
| chief ray | 0, 0 | 0, 0 | 0, 0 |
| rms spot size | 0.11 | 1.46 | 1.46 |
| (0, 60) | | | |
| chief ray | 0, 12.01 | 0, 10.45 | 0, 9.48 |
| rms spot size | 66.7 | 105.0 | 203.9 |
| (40, 40) | | | |
| chief ray | 7.88, 7.98 | 6.97, 6.97 | 6.13, 6.13 |
| rms spot size | 57.1 | 80.4 | 196.3 |
| (75, 0) | | | |
| chief ray | 12.13, 0 | 10.75, 0 | 9.95, 0 |
| rms spot size | 86.2 | 88.7 | 217.8 |

TABLE 7

Accomodated Eye
Field points are (x angle, y angle) in degrees; chief ray is (x, y) location on retina in mm; rms spot size is in microns

| Field point | Standard eye | +6 D lens | +6 D lens, and wedges | Thin +6 D lens, wedges |
|---|---|---|---|---|
| (0, 0) | | | | |
| chief ray | 0, 0 | 0, 0 | 0, 0 | 0, 0 |
| rms spot size | 3.6 | 4.6 | 4.6 | 4.6 |
| (0, 40) | | | | |
| chief ray | 0, 9.69 | 0, 11.19 | 0, 9.31 | 0, 9.11 |
| rms spot size | 135.3 | 134.0 | 163.4 | 165.2 |
| (30, 30) | | | | |
| chief ray | 6.77, 6.77 | 7.80, 7.80 | 6.48, 6.48 | 6.33, 6.33 |
| rms spot size | 131.9 | 138.6 | 163.5 | 166.3 |

TABLE 8

Relaxed eye, vertical object

| y angle (deg) | x image (mm) | Standard eye y image (mm) | −1.75 lens y image (mm) | 360 lens y image (mm) |
|---|---|---|---|---|
| 0 | 0 | 0 | 0 | 0 |
| 10 | 0 | 2.94305 | 2.8598 | 2.8598 |
| 30 | 0 | 8.07607 | 7.81576 | 6.0971 |
| 40 | 0 | 9.96325 | 9.61164 | 8.08038 |
| 50 | 0 | 11.2776 | 10.8519 | 9.55314 |
| 60 | 0 | 12.0051 | 11.57 | 10.5306 |

TABLE 9

Relaxed eye, 45° object

| x, y angle(deg) | Standard eye x, y image (mm) | −1.75 lens x, y image (mm) | 360 lens x, y image (mm) |
|---|---|---|---|
| 0 | 0 | 0 | 0 |
| 10 | 2.88281 | 2.79987 | 2.79987 |
| 30 | 6.95647 | 6.71263 | 5.61852 |
| 40 | 7.96572 | 7.66518 | 6.74468 |
| 50 | 8.46647 | 8.15673 | 7.40932 |
| 60 | 8.6241 | 8.37914 | 7.77621 |

TABLE 10

Accommodated eye, vertical object

| y angle (deg) | x image (mm) | Standard eye y image (mm) | +1.75 lens y image (mm) | 360 lens y image (mm) |
|---|---|---|---|---|
| 0 | 0 | 0 | 0 | 0 |
| 5 | 0 | 1.43376 | 1.47538 | 1.47538 |
| 10 | 0 | 2.84437 | 2.92789 | 2.92789 |
| 15 | 0 | 4.20938 | 4.33537 | 4.33537 |
| 25 | 0 | 6.72021 | 6.93381 | 5.08014 |
| 30 | 0 | 7.83038 | 8.0894 | 6.2975 |
| 35 | 0 | 8.82462 | 9.13008 | 7.40632 |
| 40 | 0 | 9.69269 | 10.0451 | 8.39723 |

TABLE 11

Accommodated eye, 45° object

| x, y angle(deg) | Standard eye x, y image (mm) | +1.75 lens x, y image (mm) | 360 lens x, y image (mm) |
|---|---|---|---|
| 0 | 0 | 0 | 0 |
| 5 | 1.42632 | 1.46788 | 1.46788 |
| 10 | 2.78712 | 2.87018 | 2.87018 |
| 20 | 5.11258 | 5.27789 | 3.98617 |
| 25 | 6.02483 | 6.23027 | 4.99546 |
| 30 | 6.76545 | 7.00956 | 5.83566 |
| 35 | 7.34696 | 7.62714 | 6.51887 |
| 40 | 7.78823 | 8.09972 | 7.06359 |

TABLE 12

Surfaces and Third Order Aberrations of Relaxed eye & −1.75 D lens

| Lens data | RDY | THI | RMD | GLA |
|---|---|---|---|---|
| > OBJ: | INFINITY | INFINITY | | AIR |
| 1: | −284.85700 | 2.000000 | | 'CR39' |
| 2: | INFINITY | 15.000000 | | AIR |
| 3: | 7.44060 | 0.500000 | | 'CORNEA' |
| 4: | 6.80000 | 3.100000 | | 'A0UEOUS' |
| STO: | 10.00000 | 0.546000 | | *CORTEX* |
| ASP: | | | | |
| K: | 0.000000 | | | |
| IC: | YES | CUF: 0.000000 | | |
| A: | −.326088E−02 | B: 0.000000E+00 | C: 0.000000E+00 | D: 0.000000E+00 |
| 6: | 7.91100 | 2.419000 | | 'CORE' |
| 7: | −5.76000 | 0.635000 | | 'CORTEX' |
| 8: | −6.00000 | 17.182294 | | 'VITREOUS' |
| IMG: | −12.20000 | 0.000000 | | AIR |

Third order aberrations
Position 1, Wavelength = 587.6 NM

| | SA | TCO | TAS | SAS | PTB | DST |
|---|---|---|---|---|---|---|
| 1 | 0.000000 | −0.000126 | 0.095102 | 0.051064 | 0.029044 | −26.853410 |
| 2 | 0.000000 | 0.000071 | 0.067903 | 0.022634 | 0.000000 | 21.666562 |
| 3 | −0.004725 | −0.099805 | −1.616013 | −1.147575 | −0.913356 | −8.079241 |
| 4 | 0.000342 | 0.006911 | 0.126112 | 0.095091 | 0.079580 | 0.640293 |
| STO | −0.000027 | −0.002004 | −0.116845 | −0.083718 | −0.067155 | −2.075826 |
| ASP | 0.007336 | 0.000000 | 0.000000 | 0.000000 | | 0.000000 |
| 6 | −0.000035 | −0.002013 | −0.070718 | −0.045083 | −0.032265 | −0.861077 |
| 7 | −0.000886 | 0.009946 | −0.081536 | −0.056721 | −0.044314 | 0.212267 |
| 8 | −0.002012 | 0.019706 | −0.176257 | −0.133369 | −0.111925 | 0.435401 |
| SUM | −0.000007 | −0.067315 | −1.772252 | −1.297678 | −1.060391 | −14.915030 |

TABLE 13

Surfaces and Third Order Aberrations of Relaxed 360, 10 mm CA

| Lens data | RDY | THI | RMD | GLA |
|---|---|---|---|---|
| > OBJ: | INFINITY | INFINITY | | AIR |
| 1: | −284.85700 | 2.000000 | | 'CR39' |
| 2: | INFINITY | 15.000000 | | AIR |
| UDS: | | | | |
| IC: | YES | | | |
| UCO | | | | |
| C1: | 1.3727E+01 | C2: 6.5000E+01 | | C3: 1.0000E+01 |
| C4: | 1.0000E+01 | | | |
| 3: | 7.44060 | 0.500000 | | 'CORNEA' |
| 4: | 6.80000 | 3.100000 | | 'AQUEOUS' |
| STO: | 10.00000 | 0.546000 | | 'CORTEX' |
| ASP: | | | | |
| K: | 0.000000 | | | |
| IC: | YES | CUF: 0.000000 | | |
| A: | −.326088E−02 | B: 0.000000E+00 | C: 0.000000E+00 | D: 0.000000E+00 |
| 6: | 7.91100 | 2.419000 | | 'CORE' |
| 7: | −5.76000 | 0.635000 | | 'CORTEX' |
| 8: | −6.00000 | 17.182294 | | 'VITREOUS' |
| IMG: | −12.20000 | 0.000000 | | AIR |

Position 1, Wavelength = 587.6 NM

| | SA | TCO | TAS | SAS | PTB | DST |
|---|---|---|---|---|---|---|
| 1 | 0.000000 | −0.000126 | 0.095102 | 0.051064 | 0.029044 | −26.853410 |
| 2 | 0.000000 | 0.000071 | 0.067903 | 0.022634 | 0.000000 | 21.666562 |
| 3 | −0.004725 | −0.099805 | −1.616013 | −1.147575 | −0.913356 | −8.079241 |
| 4 | 0.000342 | 0.006911 | 0.126112 | 0.095091 | 0.079580 | 0.640293 |
| STO | −0.000027 | −0.002004 | −0.116845 | −0.083718 | −0.067155 | −2.075826 |
| ASP | 0.007336 | 0.000000 | 0.000000 | 0.000000 | | 0.000000 |
| 6 | −0.000035 | −0.002013 | −0.070718 | −0.045083 | −0.032265 | −0.861077 |
| 7 | −0.000886 | 0.009946 | −0.081536 | −0.056721 | −0.044314 | 0.212267 |
| 8 | −0.002012 | 0.019706 | −0.176257 | −0.133369 | −0.111925 | 0.435401 |
| SUM | −0.000007 | −0.067315 | −1.772252 | −1.297678 | −1.060391 | −14.915030 |

TABLE 14

Surfaces and Third Order Aberrations of Accommodated standard eye

| Lens data | RDY | THI | RMD | GLA |
|---|---|---|---|---|
| > OBJ: | INFINITY | 400.000000 | | AIR |
| 1: | 9.32496 | 0.500000 | | 'CORNEA' |
| 2: | 6.80000 | 2.700000 | | 'AQUEOUS' |
| STO: | 5.33000 | 0.672500 | | 'CORTEX' |
| ASP: | | | | |
| K: | 0.000000 | | | |
| IC: | YES | CUF: 0.000000 | | |
| A: | −.701353E−02 | B: 0.000000E+00 | C: 0.000000E+00 | D: 0.000000E+00 |
| 4: | 2.65500 | 2.655000 | | 'CORE' |
| 5: | −2.65500 | 0.672500 | | 'CORTEX' |
| 6: | −5.33000 | 17.182294 | | 'VITREOUS' |
| IMG: | −12.20000 | 0.000000 | | AIR |

Third order aberrations
Position 1, Wavelength = 587.6 NM

| | SA | TCO | TAS | SAS | PTB | DST |
|---|---|---|---|---|---|---|
| 1 | −0.002177 | −0.036196 | −0.370792 | −0.237085 | −0.170232 | −1.313684 |
| 2 | 0.000423 | 0.004359 | 0.033571 | 0.023583 | 0.018589 | 0.081061 |
| STO | −0.000948 | −0.013177 | −0.090499 | −0.049786 | −0.029430 | −0.230733 |
| ASP | 0.016277 | 0.000000 | 0.000000 | 0.000000 | | 0.000000 |
| 4 | −0.003810 | −0.030709 | −0.104969 | −0.049960 | −0.022456 | −0.134241 |
| 5 | −0.005786 | −0.008612 | −0.026729 | −0.023880 | −0.022456 | −0.011848 |
| 6 | −0.002635 | 0.006771 | −0.035229 | −0.031363 | −0.029430 | 0.026860 |
| SUM | 0.001343 | −0.077564 | −0.594647 | −0.368493 | −0.255416 | −1.582584 |

TABLE 15

Surfaces and Third Order Aberrations of Accommodated eye & +1.75 D lens

| Lens data | RDY | THI | RMD | GLA |
|---|---|---|---|---|
| > OBJ: | INFINITY | 400.000000 | | AIR |
| 1: | 284.85700 | 2.000000 | | 'CR39' |
| 2: | INFINITY | 15.000000 | | AIR |
| 3: | 9.80981 | 0.500000 | | 'CORNEA' |
| 4: | 6.80000 | 2.700000 | | 'AQUEOUS' |
| STO: | 5.33000 | 0.672500 | | 'CORTEX' |
| ASP: | | | | |
| K: | 0.000000 | | | |
| IC: | YES | CUF: 0.000000 | | |
| A: | −.633056E−02 | B: 0.000000E+00 | C:0.000000E+00 | D:0.000000E+00 |
| 6: | 2.65500 | 2.655000 | | 'CORE' |
| 7: | −2.65500 | 0.672500 | | 'CORTEX' |
| 8: | −5.33000 | 17.182294 | | 'VITREOUS' |
| IMG: | −12.20000 | 0.000000 | | AIR |

Third order aberrations
Position 1, Wavelength = 587.6 NM

| | SA | TCO | TAS | SAS | PTB | DST |
|---|---|---|---|---|---|---|
| 1 | −0.000001 | −0.000226 | −0.037932 | −0.017339 | −0.007043 | −2.369632 |
| 2 | 0.000000 | 0.000006 | 0.007325 | 0.002442 | 0.000000 | 2.969732 |
| 3 | −0.001606 | −0.031099 | −0.368731 | −0.234904 | −0.167991 | −1.516273 |
| 4 | 0.000391 | 0.004279 | 0.034893 | 0.024496 | 0.019298 | 0.089278 |
| STO | −0.000879 | −0.012946 | −0.094149 | −0.051751 | −0.030553 | −0.254216 |
| ASP | 0.013541 | 0.000000 | 0.000000 | 0.000000 | | 0.000000 |
| 6 | −0.003522 | −0.030110 | −0.109111 | −0.051912 | −0.023313 | −0.147926 |
| 7 | −0.005337 | −0.008429 | −0.027750 | −0.024792 | −0.023313 | −0.013052 |
| 8 | −0.002428 | 0.006621 | −0.036572 | −0.032559 | −0.030553 | 0.029601 |
| SUM | 0.000161 | −0.071903 | −0.632028 | −0.386321 | −0.263467 | −1.212488 |

TABLE 16

Surfaces and Third Order Aberrations of ACCommodated 360, 10 mm CA

| Lens data | RDY | THI | RMD | GLA |
|---|---|---|---|---|
| > OBJ: | INFINITY | 400.000000 | | AIR |
| 1: | −284.85700 | 2.000000 | | 'CR39' |
| 2: | INFINITY | 15.000000 | | AIR |
| UDS: | | | | |
| IC: | YES | | | |
| UCO | | | | |
| C1: | 1.3727E+01 | C2: 6.5000E+01 | C3: 1.0000E+01 | |
| C4: | 1.0000E+01 | | | |
| 3: | 9.80981 | 0.500000 | | 'CORNEA' |
| 4: | 6.80000 | 2.700000 | | 'AQUEOUS' |
| STO: | 5.33000 | 0.672500 | | 'CORTEX' |
| ASP: | | | | |
| K: | 0.000000 | | | |
| IC: | YES | CUF: 0.000000 | | |
| A: | − .633056E−02 | B: 0.000000E+00 | C:0.000000E+00 | D:0.000000E+00 |
| 6: | 2.65500 | 2.655000 | | 'CORE' |
| 7: | −2.65500 | 0.672500 | | 'CORTEX' |
| 8: | −5.33000 | 17.182294 | | 'VITREOUS' |
| IMG: | −12.20000 | 0.000000 | | AIR |

Position 1, Wavelength = 587.6 NM

| | SA | TCO | TAS | SAS | PTB | DST |
|---|---|---|---|---|---|---|
| 1 | −0.000001 | −0.000223 | −0.036875 | −0.016856 | −0.006847 | −2.271325 |
| 2 | 0.000000 | 0.000006 | 0.007121 | 0.002374 | 0.000000 | 2.846528 |
| 3 | −0.001606 | −0.030663 | −0.358461 | −0.228362 | −0.163312 | −1.453368 |
| 4 | 0.000391 | 0.004219 | 0.033922 | 0.023814 | 0.018760 | 0.085574 |
| STO | −0.000879 | −0.012765 | −0.091527 | −0.050310 | −0.029702 | −0.243669 |
| ASP | 0.013541 | 0.000000 | 0.000000 | 0.000000 | | 0.000000 |
| 6 | −0.003522 | −0.029687 | −0.106072 | −0.050466 | −0.022663 | −0.141789 |
| 7 | −0.005337 | −0.008311 | −0.026977 | −0.024101 | −0.022663 | −0.012511 |
| 8 | −0.002428 | 0.006528 | −0.035554 | −0.031652 | −0.029702 | 0.028373 |
| SUM | 0.000161 | −0.070895 | −0.614424 | −0.375561 | −0.256129 | −1.162186 |

TABLE 17

Accommodated 360 & thin +6 D lens

INFINITE CONJUGATES

| | |
|---|---|
| EFL | 23.3501 |
| BFL | 16.2528 |
| FFL | 1.1567 |
| FNO | 8.7388 |

AT USED CONJUGATES

| | |
|---|---|
| RED | 0.0436 |
| FNO | 9.1781 |
| OBJ DIS | 400.0000 |
| TT | 441.3823 |
| IMG DIS | 17.1823 |
| OAL | 24.2000 |

PARAXIAL IMAGE

| | |
|---|---|
| HT | 15.2490 |
| THI | 17.2701 |
| ANG | 40.0000 |

ENTRANCE PUPIL

| | |
|---|---|
| DIA | 2.0000 |
| THI | 21.3190 |

EXIT PUPIL

| | |
|---|---|
| DIA | 1.7337 |
| THI | -3.9881 |

Third order aberrations

This is a non-rotationally symmetric system
first order properties and third order quantities derived from them are
probably inadequate in describing system characteristics and performance.
Accomodated 360 & thin +6 D lens
Position 1, Wavelength = 587.6 NM

| | SA | TCO | TAS | SAS | PTB | DST | AX | LAT | PTZ |
|---|---|---|---|---|---|---|---|---|---|
| 1 | -0.000006 | -0.000858 | -0.063778 | -0.038167 | -0.025361 | -1.707956 | 0.000000 | 0.000000 | -0.004004 |
| 2 | 0.000000 | 0.000149 | -0.042103 | -0.014034 | 0.000000 | 3.957428 | 0.000000 | 0.000000 | 0.000000 |
| 3 | -0.000718 | -0.019973 | -0.341647 | -0.218238 | -0.156533 | -2.022641 | 0.000000 | 0.000000 | -0.024713 |
| 4 | 0.000311 | 0.003904 | 0.036623 | 0.025719 | 0.020268 | 0.107760 | 0.000000 | 0.000000 | 0.003200 |
| STO | -0.000697 | -0.011805 | -0.098766 | -0.054314 | -0.032088 | -0.306780 | 0.000000 | 0.000000 | -0.00S066 |
| | 0.010084 | 0.000000 | 0.000000 | 0.000000 | | 0.000000 | ASPHERIC | CONTRIBUTIONS | |
| 6 | -0.002797 | -0.027486 | -0.114515 | -0.054495 | -0.024485 | -0.178497 | 0.000000 | 0.000000 | -0.003866 |
| 7 | -0.004244 | -0.007702 | -0.029144 | -0.026038 | -0.024485 | -0.015752 | 0.000000 | 0.000000 | -0.003866 |
| 8 | -0.001932 | 0.006053 | -0.038411 | -0.034196 | -0.032088 | 0.035717 | 0.000000 | 0.000000 | -0.005066 |
| SUM | 0.000000 | -0.057719 | -0.691742 | -0.413762 | -0.274773 | -0.130722 | 0.000000 | 0.000000 | -0.043381 |

TABLE 18

Accommodated 360 & thin +6 D lens

| | RDY | THI | RMD | GLA | CCY | THC | GLC |
|---|---|---|---|---|---|---|---|
| OBJ: | INFINITY | 400.000000 | | AIR | 100 | 100 | |
| 1: | 83.08330 | 2.000000 | | 'CR39' | 100 | 100 | |
| 2: | INFINITY | 15.000000 | | AIR | 100 | 100 | |
| UDS: | | | | | | | |
| IC: | YES | | | | | | |
| UCO/UCC | | | | | | | |
| C1: | 1.3727E+01 | C2:6.5000E+01 | C3: 1.0000E+01 | | | | |
| C1: | 100 | C2:100 | C3: 100 | | | | |
| C4: | 1.0000E+01 | | | | | | |
| C4: | 100 | | | | | | |
| 3: | 11.05704 | 0.500000 | | 'CORNEA' | 0 | 100 | |
| 4: | 6.80000 | 2.700000 | | 'AQUEOUS' | 100 | 100 | |
| STO: | 5.33000 | 0.672500 | | 'CORTEX' | 100 | 100 | |
| ASP: | | | | | | | |
| K: | 0.000000 | KC: 100 | | | | | |
| IC: | YES | CUF: 0.000000 | CCF: 100 | | | | |
| A: | -.592585E-02 | B: 0.000000E+00 | C: 0.000000E+00 | D: 0.000000E+00 | | | |
| AC: | 0 | BC: 100 | CC: 100 | DC: 100 | | | |
| 6: | 2.65500 | 2.655000 | | 'CORE' | 100 | 100 | |
| 7: | -2.65500 | 0.672500 | | 'CORTEX' | 100 | 100 | |

TABLE 18-continued

Accommodated 360 & thin +6 D lens

| | | | | | |
|---|---|---|---|---|---|
| 8: | −5.33000 | 17.182294 | 'VITREOUS' | 100 | 100 |
| > IMG: | −12.20000 | 0.000000 | AIR | 100 | 100 |

SPECIFICATION DATA

| | | | |
|---|---|---|---|
| EPD | 2.00000 | | |
| DIM | MM | | |
| WL | 587.60 | | |
| REF | 1 | | |
| WTW | 1 | | |
| XAN | 0.00000 | 0.00000 | 0.00000 |
| YAN | 0.00000 | 30.00000 | 40.00000 |
| VUX | 0.00000 | 0.00000 | 0.00000 |
| VLX | 0.01000 | 0.00000 | 0.00000 |
| VUY | 0.00000 | 0.00000 | 0.00000 |
| VLY | 0.00000 | 0.00000 | 0.00000 |

TABLE 19

Accommodated 360 & thin +6 D lens

APERTURE DATA/EDGE DEFINITIONS

| | |
|---|---|
| CA | |
| CIR S1 | 32.500000 |
| CIR S2 | 32.500000 |

PRIVATE CATALOG

| | |
|---|---|
| PWL | 587.60 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |
| 'CR39' | 1.498500 |

TABLE 19-continued

Accommodated 360 & thin +6 D lens

REFRACTIVE INDICES

| | |
|---|---|
| GLASS CODE | 587.60 |
| 'CR39' | 1.498500 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |

No solves defined in system

TABLE 20

Relaxed eye & −6 D lens

| | RDY | THI | RMD | GLA | CCY | THC | GLC |
|---|---|---|---|---|---|---|---|
| > OBJ: | INFINITY | INFINITY | | AIR | 100 | 100 | |
| 1: | −83.08330 | 2.000000 | | 'CR39' | 100 | 100 | |
| 2: | INFINITY | 15.000000 | | AIR | 100 | 100 | |
| 3: | 6.91815 | 0.500000 | | 'CORNEA' | 0 | 100 | |
| 4: | 6.80000 | 3.100000 | | 'AQUEOUS' | 100 | 100 | |
| STO: | 10.00000 | 0.546000 | | 'CORTEX' | 100 | 100 | |
| ASP: | | | | | | | |
| K: | 0.000000 | KC: 100 | | | | | |
| IC: | YES | CUF: 0.000000 | | CCF: | 100 | | |
| A: | −.406812E−02 | B: 0.000000E+00 | C: 0.000000E+00 | D: 0.000000E+00 | | | |
| AC: | 0 | BC: 100 | CC: 100 | DC: 100 | | | |
| 6: | 7.91100 | 2.419000 | | 'CORE' | 100 | 100 | |
| 7: | −5.76000 | 0.635000 | | 'CORTEX' | 100 | 100 | |
| 8: | −6.00000 | 17.182294 | | 'VITREOUS' | 100 | 100 | |
| IMG: | −12.20000 | 0.000000 | | AIR | 100 | 100 | |

SPECIFICATION DATA

| | |
|---|---|
| EPD | 2.00000 |
| DIM | MM |
| WL | 587.60 |
| REF | 1 |
| WTW | 1 |

TABLE 20-continued

Relaxed eye & −6 D lens

| | | | |
|---|---|---|---|
| XAN | 0.00000 | 0.00000 | 0.00000 |
| YAN | 0.00000 | 40.00000 | 60.00000 |
| VUX | 0.00000 | 0.04053 | 0.10784 |
| VLX | 0.00000 | 0.04053 | 0.10784 |
| VUY | 0.00000 | 0.16470 | 0.50029 |
| VLY | 0.00000 | 0.15629 | 0.50112 |

APERTURE DATA/EDGE DEFINITIONS

CA
| | |
|---|---|
| CIR S1 | 32.500000 |
| CIR S2 | 32.500000 |

TABLE 21

Relaxed eye & −6 D lens

PRIVATE CATALOG

| | |
|---|---|
| PWL | 587.60 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |
| 'CR39' | 1.498500 |

REFRACTIVE INDICES

| | |
|---|---|
| GLASS CODE | 587.60 |
| 'CR39' | 1.498500 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |

No solves defined in system

INFINITE CONJUGATES

| | |
|---|---|
| EFL | 20.7332 |
| BFL | 17.1644 |
| FFL | 1.8600 |
| FNO | 7.7594 |
| IMG DIS | 17.1823 |
| OAL | 24.2000 |

TABLE 21-continued

Relaxed eye & −6 D lens

PARAXIAL IMAGE

| | |
|---|---|
| HT | 26.8795 |
| ANG | 60.0000 |

ENTRANCE PUPIL

| | |
|---|---|
| DIA | 2.0000 |
| THI | 17.4045 |

EXIT PUPIL

| | |
|---|---|
| DIA | 1.9967 |
| THI | −3.5346 |

TABLE 22

Relaxed eye & −6 D lens  
Third order aberrations  
Relaxed eye & −6 D lens  
Position 1, Wavelength = 587.6 NM

| | SA | TCO | TAS | SAS | PTB | DST | AX | LAT | PTZ |
|---|---|---|---|---|---|---|---|---|---|
| 1 | 0.000003 | −0.001568 | 0.366173 | 0.184195 | 0.093206 | −32.059219 | 0.000000 | 0.000000 | 0.004004 |
| 2 | 0.000001 | 0.000727 | 0.187897 | 0.062632 | 0.000000 | 16.192346 | 0.000000 | 0.000000 | 0.000000 |
| 3 | −0.007940 | −0.123827 | −1.563166 | −1.134026 | −0.919455 | −5.895193 | 0.000000 | 0.000000 | −0.039498 |
| 4 | 0.000415 | 0.007361 | 0.118007 | 0.088993 | 0.074487 | 0.526143 | 0.000000 | 0.000000 | 0.003200 |
| STO | −0.000033 | −0.002126 | −0.109177 | −0.078297 | −0.062857 | −1.705588 | 0.000000 | 0.000000 | −0.002700 |
| | 0.011117 | 0.000000 | 0.000000 | 0.000000 | | 0.000000 | ASPHERIC CONTRIBUTIONS | | |
| 6 | −0.000043 | −0.002140 | −0.066110 | −0.042170 | −0.030200 | −0.707478 | 0.000000 | 0.000000 | −0.001297 |
| 7 | −0.001077 | 0.010608 | −0.076322 | −0.053092 | −0.041477 | 0.174392 | 0.000000 | 0.000000 | −0.001782 |
| 8 | −0.002445 | 0.021015 | −0.164981 | −0.124834 | −0.104761 | 0.357711 | 0.000000 | 0.000000 | −0.004500 |
| SUM | 0.000000 | −0.089950 | −1.307677 | −1.096597 | −0.991057 | −23.116886 | 0.000000 | 0.000000 | −0.042574 |

TABLE 23

Relaxed 360, −6 D lens

Relaxed 360, −6 D lens

|   | RDY | THI | RMD | GLA | CCY | THC | GLC |
|---|---|---|---|---|---|---|---|
| > OBJ: | INFINITY | INFINITY |  | AIR | 100 | 100 |  |
| 1: | −83.08330 | 2.000000 |  | 'CR39' | 100 | 100 |  |
| 2: | INFINITY | 15.000000 |  | AIR | 100 | 100 |  |
| UDS: |  |  |  |  |  |  |  |
| IC: | YES |  |  |  |  |  |  |
| UCO/UCC |  |  |  |  |  |  |  |
| C1: | 1.3727E+01 | C2: 6.5000E+01 |  | C3: 1.0000E+01 |  |  |  |
| C1: | 100 | C2: 100 |  | C3: 100 |  |  |  |
| C4: | 1.0000E+01 |  |  |  |  |  |  |
| C4: | 100 |  |  |  |  |  |  |
| 3: | 6.91815 | 0.500000 |  | 'CORNEA' | 0 | 100 |  |
| 4: | 6.80000 | 3.100000 |  | 'AQUEOUS' | 100 | 100 |  |
| STO: | 10.00000 | 0.546000 |  | 'CORTEX' | 100 | 100 |  |
| ASP: |  |  |  |  |  |  |  |
| K: | 0.000000 | KC: 100 |  |  |  |  |  |
| IC: | YES | CUF: 0.000000 |  | CCF: 100 |  |  |  |
| A: | −.406812E−02 | B: 0.000000E+00 |  | C: 0.000000E+00 | D: 0.000000E+00 |  |  |
| AC: | 0 | BC: 100 |  | CC: 100 | DC: 100 |  |  |
| 6: | 7.91100 | 2.419000 |  | 'CORE' | 100 | 100 |  |
| 7: | −5.76000 | 0.635000 |  | 'CORTEX' | 100 | 100 |  |
| 8: | −6.00000 | 17.182294 |  | 'VITREOUS' | 100 | 100 |  |
| IMG: | −12.20000 | 0.000000 |  | AIR | 100 | 100 |  |

SPECIFICATION DATA

| EPD | 2.00000 |
|---|---|
| DIM | MM |
| WL | 587.60 |
| REF | 1 |
| WTW | 1 |
| XAN | 0.00000 | 0.00000 | 0.00000 |
| YAN | 0.00000 | 40.00000 | 60.00000 |
| VUX | 0.00000 | 0.22148 | 0.20733 |
| VLX | 0.00000 | 0.22148 | 0.20733 |
| VUY | 0.00000 | 0.12861 | 0.38966 |
| VLY | 0.00000 | 0.12120 | 0.39135 |

TABLE 24

Relaxed 360, −6 D lens

APERTURE DATA/EDGE DEFINITIONS

| CA |  |
|---|---|
| CIR S1 | 32.500000 |
| CIR S2 | 32.500000 |

PRIVATE CATALOG

| PWL | 587.60 |
|---|---|
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |
| 'CR39' | 1.498500 |

REFRACTIVE INDICES

| GLASS CODE | 587.60 |
|---|---|
| 'CR39' | 1.498500 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |

INFINITE CONJUGATES

| EFL | 20.7332 |
|---|---|
| BFL | 17.1644 |

TABLE 24-continued

Relaxed 360, −6 D lens

| FFL | 1.8600 |
|---|---|
| FNO | 7.7594 |
| IMG DIS | 17.1823 |
| OAL | 24.2000 |

PARAXIAL IMAGE

| HT | 26.8795 |
|---|---|
| ANG | 60.0000 |

ENTRANCE PUPIL

| DIA | 2.0000 |
|---|---|
| THI | 17.4045 |

EXIT PUPIL

| DIA | 1.9967 |
|---|---|
| THI | −3.5346 |

TABLE 25

Relaxed 360, −6 D lens
Position 1, Wavelength = 587.6 NM

| | SA | TCO | TAS | SAS | PTB | DST | AX | LAT | PTZ |
|---|---|---|---|---|---|---|---|---|---|
| 1 | 0.000003 | −0.001568 | 0.366173 | 0.184195 | 0.093206 | −32.059219 | 0.000000 | 0.000000 | 0.004004 |
| 2 | 0.000001 | 0.000727 | 0.187897 | 0.062632 | 0.000000 | 16.192346 | 0.000000 | 0.000000 | 0.000000 |
| 3 | −0.007940 | −0.123827 | −1.563166 | −1.134026 | −0.919455 | −5.895193 | 0.000000 | 0.000000 | −0.039498 |
| 4 | 0.000415 | 0.007361 | 0.118007 | 0.088993 | 0.074487 | 0.526143 | 0.000000 | 0.000000 | 0.003200 |
| STO | −0.000033 | −0.002126 | −0.109177 | −0.078297 | −0.062857 | −1.705588 | 0.000000 | 0.000000 | −0.002700 |
| | 0.011117 | 0.000000 | 0.000000 | 0.000000 | | 0.000000 | ASPHERIC CONTRIBUTIONS | | |
| 6 | −0.000043 | −0.002140 | −0.066110 | −0.042170 | −0.030200 | −0.707478 | 0.000000 | 0.000000 | −0.001297 |
| 7 | −0.001077 | 0.010608 | −0.076322 | −0.053092 | −0.041477 | 0.174392 | 0.000000 | 0.000000 | −0.001782 |
| 8 | −0.002445 | 0.021015 | −0.164981 | −0.124834 | −0.104761 | 0.357711 | 0.000000 | 0.000000 | −0.004500 |
| SUM | 0.000000 | −0.089950 | −1.307677 | −1.096597 | −0.991057 | −23.116886 | 0.000000 | 0.000000 | −0.042574 |

TABLE 26

Accommodated 360, +6 D lens, 10 mm CA

| | |
|---|---|
| INFINITE CONJUGATES | |
| EFL | 23.7860 |
| BFL | 16.2232 |
| FFL | 4.1771 |
| FNO | 8.9020 |
| AT USED CONJUGATES | |
| RED | 0.0440 |
| FNO | 9.3635 |
| OBJ DIS | 400.0000 |
| TT | 445.7823 |
| IMG DIS | 17.1823 |
| OAL | 28.6000 |
| PARAXIAL IMAGE | |
| HT | 15.5590 |
| THI | 17.2710 |
| ANG | 40.0000 |
| ENTRANCE PUPIL | |
| DIA | 2.0000 |
| THI | 25.1299 |
| EXIT PUPIL | |
| DIA | 1.6994 |
| THI | −3.9881 |
| Third order aberrations | |

This is a non-rotationally symmetric system first order properties and third order quantities derived from them are probably inadequate in describing system characteristics and performance.

Accommodated 360, +6 D lens, 10 mm CA
Position 1, Wavelength = 587.6 NM

| | SA | TCO | TAS | SAS | PTB | DST | AX | LAT | PTZ |
|---|---|---|---|---|---|---|---|---|---|
| 1 | −0.000006 | −0.000800 | −0.059778 | −0.037179 | −0.025880 | −1.575421 | 0.000000 | 0.000000 | −0.004004 |
| 2 | 0.000000 | 0.000150 | −0.043472 | −0.014491 | 0.000000 | 4.207150 | 0.000000 | 0.000000 | 0.000000 |
| 3 | −0.019506 | −0.348136 | −0.222399 | −0.159531 | −2.150435 | 0.000000 | 0.000000 | −0.024682 | |
| 4 | 0.000293 | 0.003827 | 0.037372 | 0.026245 | 0.020682 | 0.114455 | 0.000000 | 0.000000 | 0.003200 |
| STO | −0.000656 | −0.011574 | −0.100788 | −0.055426 | −0.032745 | −0.325842 | 0.000000 | 0.000000 | −0.005066 |
| | 0.009494 | 0.000000 | 0.000000 | 0.000000 | | 0.000000 | ASPHERIC CONTRIBUTIONS | | |
| 6 | −0.002635 | −0.026948 | −0.116858 | −0.055610 | −0.024985 | −0.189589 | 0.000000 | 0.000000 | −0.003866 |
| 7 | −0.003997 | −0.007551 | −0.029740 | −0.026570 | −0.024985 | −0.016731 | 0.000000 | 0.000000 | −0.003866 |
| 8 | −0.001820 | 0.005935 | −0.039196 | −0.034895 | −0.032745 | 0.037936 | 0.000000 | 0.000000 | −0.005066 |
| SUM | 0.000000 | −0.056468 | −0.700597 | −0.420325 | −0.280188 | 0.101523 | 0.000000 | 0.000000 | −0.043349 |

TABLE 27

Accommodated 360, +6 D lens, 10 mm CA

APERTURE DATA/EDGE DEFINITIONS

CA
| | |
|---|---|
| CIR S1 | 32.500000 |
| CIR S2 | 32.500000 |

PRIVATE CATALOG

| | |
|---|---|
| PWL | 587.60 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |
| 'CR39' | 1.498500 |

REFRACTIVE INDICES

| | |
|---|---|
| GLASS CODE | 587.60 |
| 'CR39' | 1.498500 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |

TABLE 28

Accommodated eye α +6 D lens

REFRACTIVE INDICES

| | |
|---|---|
| GLASS CODE | 587.60 |
| 'CR39' | 1.498500 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |

No solves defined in system

INFINITE CONJUGATES

| | |
|---|---|
| EFL | 23.7860 |
| BFL | 16.2232 |
| FFL | 4.1771 |
| FNO | 8.9020 |

AT USED CONJUGATES

| | |
|---|---|
| RED | 0.0440 |
| FNO | 9.3635 |
| OBJ DIS | 400.0000 |
| TT | 445.7823 |
| IMG DIS | 17.1823 |
| OAL | 28.6000 |

PARAXIAL IMAGE

| | |
|---|---|
| HT | 16.0022 |
| THI | 17.2710 |
| ANG | 40.0000 |

ENTRANCE PUPIL

| | |
|---|---|
| DIA | 2.0000 |
| THI | 25.1299 |

EXIT PUPIL

| | |
|---|---|
| DIA | 1.6994 |
| THI | −3.9881 |

TABLE 29

Accommodated eye & +6 D lens

| | RDY | THI | RMD | GLA | CCY | THC | GLC |
|---|---|---|---|---|---|---|---|
| > OBJ: | INFINITY | 400.000000 | | AIR | 100 | 100 | |
| 1: | 83.08330 | 6.400000 | | 'CR39' | 100 | 100 | |
| 2: | INFINITY | 15.000000 | | AIR | 100 | 100 | |
| 3: | 11.07116 | 0.500000 | | 'CORNEA' | 0 | 100 | |
| 4: | 6.80000 | 2.700000 | | 'AQUEOUS' | 100 | 100 | |
| STO: | 5.33000 | 0.672500 | | 'CORTEX' | 100 | 100 | |
| ASP: | | | | | | | |
| K: | 0.000000 | KC: 100 | | | | | |
| IC: | YES | CUF: 0.000000 | CCF: 100 | | | | |
| A: | −.592348E−02 | B: 0.000000E+00 | C: 0.000000E+00 | D: 0.000000E+00 | | | |
| AC: | 0 | BC: 100 | CC: 100 | DC: 100 | | | |
| 6: | 2.65500 | 2.655000 | | 'CORE' | 100 | 100 | |
| 7: | −2.65500 | 0.672500 | | 'CORTEX' | 100 | 100 | |
| 8: | −5.33000 | 17.182294 | | 'VITREOUS' | 100 | 100 | |
| IMG: | −12.20000 | 0.000000 | | AIR | 100 | 100 | |

SPECIFICATION DATA

| | | | |
|---|---|---|---|
| EPD | 2.00000 | | |
| DIM | MM | | |
| WL | 587.60 | | |
| REF | 1 | | |
| WTW | 1 | | |
| XAN | 0.00000 | 0.00000 | 0.00000 |
| YAN | 0.00000 | 30.00000 | 40.00000 |
| VUY | 0.00000 | 0.00000 | 0.00000 |
| VLY | 0.00000 | 0.00000 | 0.00000 |

TABLE 29-continued

Accommodated eye & +6 D lens

APERTURE DATA/EDGE DEFINITIONS

CA
| | |
|---|---|
| CIR S1 | 32.500000 |
| CIR S2 | 32.500000 |

PRIVATE CATALOG

| | |
|---|---|
| PWL | 587.60 |
| 'CORNEA' | 1.376000 |
| 'AQUEOUS' | 1.336000 |
| 'CORTEX' | 1.386000 |
| 'CORE' | 1.406000 |
| 'VITREOUS' | 1.336000 |
| 'CR39' | 1.498500 |

TABLE 30

Accommodated eye & α6 D lens
Third order aberrations
Accommodated eye & +6 D lens
Position 1, Wavelength = 587.6 NM

| | SA | TCO | TAS | SAS | PTB | DST | AX | LAT | PTZ |
|---|---|---|---|---|---|---|---|---|---|
| 1 | −0.000006 | −0.000823 | −0.063232 | −0.039328 | −0.027375 | −1.713917 | 0.000000 | 0.000000 | −0.004004 |
| 2 | 0.000000 | 0.000154 | −0.045984 | −0.015328 | 0.000000 | 4.577003 | 0.000000 | 0.000000 | 0.000000 |
| 3 | −0.000672 | −0.020061 | −0.368252 | −0.235249 | −0.168748 | −2.339481 | 0.000000 | 0.000000 | −0.024682 |
| 4 | 0.000293 | 0.003936 | 0.039532 | 0.027762 | 0.021877 | 0.124517 | 0.000000 | 0.000000 | 0.003200 |
| STO | −0.000656 | −0.011904 | −0.106612 | −0.058628 | −0.034637 | −0.354487 | 0.000000 | 0.000000 | −0.005066 |
| | 0.009494 | 0.000000 | 0.000000 | 0.000000 | | 0.000000 | ASPHERIC | CONTRIBUTIONS | |
| 6 | −0.002635 | −0.027716 | −0.123611 | −0.058823 | −0.026429 | −0.206256 | 0.000000 | 0.000000 | −0.003866 |
| 7 | −0.003997 | −0.007766 | −0.031459 | −0.028105 | −0.026429 | −0.018202 | 0.000000 | 0.000000 | −0.003866 |
| 8 | −0.001820 | 0.006104 | −0.041461 | −0.036911 | −0.034637 | 0.041271 | 0.000000 | 0.000000 | −0.005066 |
| SUM | 0.000000 | −0.058076 | −0.741078 | −0.444611 | −0.296378 | 0.110448 | 0.000000 | 0.000000 | −0.043349 |

TABLE 31

Accomodated 360, +6 D lens, 10 mm CA

| | RDY | THI | RMD | GLA | CCY | THC | GLC |
|---|---|---|---|---|---|---|---|
| OBJ: | INFINITY | 400.000000 | | AIR | 100 | 100 | |
| 1: | 83.08330 | 6.400000 | | 'CR39' | 100 | 100 | |
| 2: | INFINITY | 15.000000 | | AIR | 100 | 100 | |
| UDS: | | | | | | | |
| IC: | YES | | | | | | |
| UCO/UCC | | | | | | | |
| C1: | 1.3727E+01 | C2: 6.5000E+01 | C3: 1.0000E+01 | | | | |
| C1: | 100 | C2: 100 | C3: 100 | | | | |
| C4: | 1.0000E+01 | | | | | | |
| C4: | 100 | | | | | | |
| 3 | 11.07116 | 0.500000 | | 'CORNEA' | 0 | 100 | |
| 4: | 6.80000 | 2.700000 | | 'AQUEOUS' | 100 | 100 | |
| STO: | 5.33000 | 0.672500 | | 'CORTEX' | 100 | 100 | |
| ASP: | | | | | | | |
| K: | 0.000000 | KC: 100 | | | | | |
| IC: | YES | CUF: 0.000000 | CCF: 100 | | | | |
| A: | −.592348E−02 | B: 0.000000E+00 | C: 0.000000E+00 | D: 0.000000E+00 | | | |
| AC: | 0 | BC: 100 | CC: 100 | DC: 100 | | | |
| 6: | 2.65500 | 2.655000 | | 'CORE' | 100 | 100 | |
| 7: | −2.65500 | 0.672500 | | 'CORTEX' | 100 | 100 | |
| 8: | −5.33000 | 17.182294 | | 'VITREOUS' | 100 | 100 | |
| > IMG: | −12.20000 | 0.000000 | | AIR | 100 | 100 | |

SPECIFICATION DATA

| | | | |
|---|---|---|---|
| EPD | 2.00000 | | |
| DIM | MM | | |
| WL | 587.60 | | |
| REF | 1 | | |
| WTW | 1 | | |
| XAN | 0.00000 | 0.00000 | 0.00000 |
| YAN | 0.00000 | 30.00000 | 40.00000 |

TABLE 31-continued

Accomodated 360, +6 D lens, 10 mm CA

| VUX | 0.00000 | 0.00000 | 0.00000 |
| VLX | 0.00000 | 0.00000 | 0.00000 |
| VUY | 0.00000 | 0.00000 | 0.00000 |
| VLY | 0.00000 | 0.00000 | 0.00000 |

TABLE 32

Tables Powers of Eye Surfaces for ± 6 D lenses

| | A | B | C |
|---|---|---|---|
| 42 | ACCOMMODATED | | |
| 43 | STANDARD EYE | | Object |
| 44 | Surface number | | 0 |
| 45 | Curvature (1/m) | | 0 |
| 46 | Radius of curv (mm) | | |
| 47 | Thickness (m) | | 1000000000000 |
| 48 | Thickness (mm) | | |
| 49 | Index (after surf.) | 1 | |
| 50 | | | |
| 51 | Power (diopters) | 0 | |
| 52 | Reduced Thickness (m) | =C47/C49 | |
| 53 | Power of: (diopters) | | |
| 54 | | | |
| 55 | | | |
| 56 | | | |
| 57 | ACCOMMODATED | | |
| 58 | EYE REQUIRING +6.0 D CORRECTION | | |
| 59 | Power of: (diopters) | | |
| 60 | cornea: | =(71.584−$H$55)/(1 − $H$55*0.0051956/$E$13) | |
| 61 | Ant surface: | =(B60 − $E$51)/(1 − $E$51*$D$52) | |
| 62 | curv ant surf (1/m) | =$B61/($D$49 − $C$49) | |
| 63 | | Object | |
| 64 | Surface number | | 0 |
| 65 | Curvature (1/m) | | 0 |
| 66 | Radius of curv (mm) | | |
| 67 | Thickness (m) | | 1000000000000 |
| 68 | Thickness (mm) | | |
| 69 | Index (after surf.) | | 1 |
| 70 | | | |
| 71 | Power (diopters) | | 0 |
| 72 | Reduced Thickness (m) | | =C67/C69 |
| 73 | Power of: (diopters) | | |
| 74 | | | |
| 75 | | | |
| 75 | | | |

TABLE 33

Tables. Powers of Eye Surfaces for ±6 D lenses

| | D | E | F | G |
|---|---|---|---|---|
| 6 | | | | |
| 7 | A. Cornea | P. cornea | A. lens cortex | A. lens core |
| 8 | 1 | 2 | 3 | 4 |
| 9 | =1/0.0077 | =1/0.0068 | =1/0.01 | =1/0.007911 |
| 10 | =1000/D9 | =1000/E9 | =1000/F9 | =1000/G9 |
| 11 | 0.0005* | 0.0031 | 0.000546 | 0.002419 |
| 12 | =1000*D11 | =1000*E11 | =1000*F11 | =1000*G11 |
| 13 | 1.376 | 1.336 | 1.386 | 1.406 |
| 14 | | | | |
| 15 | =−(C13 − D13)*D9 | =−(D13 − E13)*E9 | =−(E13 − F13)*F9 | =−(F13 − G13)*G9 |
| 16 | =D11/D13 | =E11/E13 | =F11/F13 | =G11/G13 |
| 17 | Cornea: | =D15 + E15 − (D15*E15*D16) | | lens core: |
| 18 | | | | A. cortex + core: |
| 19 | | | | equivalent lens |
| 20 | | | | cornea + lens: |
| 21 | | | | |
| 22 | | | | |
| 23 | | Required power of eye = 58.872 D | | |
| 24 | | | | |

TABLE 33-continued

Tables. Powers of Eye Surfaces for ±6 D lenses

| | D | E | F | G |
|---|---|---|---|---|
| 25 | | | | |
| 26 | | | | |
| 27 | | | | |
| 28 | A. Cornea | P. cornea | A. lens cortex | A. lens core |
| 29 | 1 | 2 | 3 | 4 |
| 30 | =$B$26/($D$13 − $C$13) | =1/0.0068 | =1/0.01 | =1/0.007911 |
| 31 | =1000/D30 | =1000/E30 | =1000/F30 | =1000/G30 |
| 32 | 0.0005 | 0.0031 | 0.000546 | 0.002419 |
| 33 | −1000*D32 | =1000*E32 | =1000*F32 | =1000*G32 |
| 34 | 1.376 | 1.336 | 1.386 | 1.406 |
| 35 | | | | |
| 36 | =−(C34 − D34)*D30 | =−(D34 − E34)*E30 | =−(E34 − F34)*F30 | =−(F34 − G34)*G30 |
| 37 | =D32/D34 | =E32/E34 | =F32/F34 | =G32/G34 |
| 38 | Cornea: | =D36 + E36 − (D36*E36*D37) | | lens core: |
| 39 | | | | A. cortex + core: |
| 40 | | | | equivalent lens |
| 41 | | | | cornea + lens: |

TABLE 34

Tables. Powers of Eye Surfaces for ± 6 D lenses

| | D | E | F | G |
|---|---|---|---|---|
| 42 | | | | |
| 43 | A. Cornea | P. cornea | A. lens cortex | A. lens core |
| 44 | 1 | 2 | 3 | 4 |
| 45 | =1/0.0077 | =1/0.0068 | =1/0.00533 | =1/0.002655 |
| 46 | =1000/D45 | −1000/E45 | =1000/F45 | −1000/G45 |
| 47 | 0.0005 | 0.0027 | 0.0006725 | 0.002655 |
| 48 | =1000*D47 | =1000*E47 | =1000*F47 | −1000*G47 |
| 49 | 1.376 | 1.336 | 1.386 | 1.406 |
| So | | | | |
| 51 | =−(C49 − D49)*D45 | =−(D49 − E49)*E45 | =−(E49 − F49)*F45 | =−(F49 − G49)*G45 |
| 52 | =D47/D49 | =E47/E49 | =F47/F49 | =G47/G49 |
| 53 | Cornea: | =D51 + E51 − (D51*E51*D52) | lens core: | |
| 54 | | | | A. cortex + core: |
| 55 | | | | equivalent lens |
| 56 | | | | cornea + lens: |
| 57 | | | | |
| 58 | | Required power of eye: 71.584 D | | |
| 59 | | | | |
| 60 | | | | |
| 61 | | | | |
| 62 | | | | |
| 63 | A. Cornea | P. cornea | A. lens cortex | A. lens core |
| 64 | 1 | 2 | 3 | 4 |
| 65 | =$B$62 | =1/0.0068 | =1/0.00533 | =1/0.002855 |
| 66 | =1000/065 | =1000/E65 | =1000/F65 | −1000/G65 |
| 67 | 0.0005 | 0.0027 | 0.0006725 | 0.002655 |
| 68 | =1000*D67 | =1000*E67 | =1000*F67 | −1000*G67 |
| 69 | 1.376 | 1.336 | 1.386 | 1.406 |
| 70 | | | | |
| 71 | =−(C69 − D69)*D65 | =−(D69 − E69)*E65 | =−(E69 − F69)*F65 | =−(F69 − G69)*G85 |
| 72 | =D67/D69 | =E67/E69 | =F67/F69 | =G87/G69 |
| 73 | Cornea: | =D71 + E71 − (D71*E71*D72) | lens core: | |
| 74 | | | | A. cortex + core: |
| 75 | | | | equivalent lens |
| 76 | | | | cornea + lens: |

TABLE 35

Tables. Powers of Eye Surfaces for ± 6 D lenses

| | H | I |
|---|---|---|
| 6 | | |
| 7 | P. lens core | P. lens cortex |
| 8 | | |
| 9 | =1/0.00576 | =1/−0.006 |
| 10 | =1000/H9 | =1000/I9 |
| 11 | 0.000635 | 0.0172 |
| 12 | =1000*H11 | =1000*I11 |
| 13 | 1.386 | 1.336 |
| 14 | | |
| 15 | =−(G13 − H13)*H9 | =−(H13 − I13)*I9 |
| 16 | =H11/H13 | =I11/I13 |
| 17 | =G15 + H15 − (G15*H15*G16) | |
| 18 | =F15 + H17 − F15*H17*(F11 + G11/1.4)/F13 | |
| 19 | =H18 + I15 − H18 * I15*(H11 + G11/1.4)/H13 | |
| 20 | =E17 + H19 − E17*H19*(0.00573)/E13 | |
| 21 | | |
| 22 | | |
| 23 | | |
| 24 | | |
| 25 | | |
| 26 | | |
| 27 | | |

TABLE 35-continued

Tables. Powers of Eye Surfaces for ± 6 D lenses

| | H | I |
|---|---|---|
| 28 | P. lens core | P. lens cortex |
| 29 | 5 | 6 |
| 30 | =−1/0.00578 | =1/−0.006 |
| 31 | =1000/H30 | =1000/I30 |
| 32 | 0.000635 | 0.0172 |
| 33 | =1000*H32 | =1000*I32 |
| 34 | 1.386 | 1.336 |
| 35 | | |
| 36 | =−(G34 − H34)*H30 | =−(H34 − I34)*I30 |
| 37 | =H32/H34 | =I32/I34 |
| 38 | =G38 + H36 − (G36*H36*G37) | |
| 39 | =F36 + H38 − F36*H38*(F32 + G32/1.4)/F34 | |
| 40 | =H39 + I36 − H39*I36*(H32 + G32/1.4)/H34 | |
| 41 | =E38 + H40 − E38*H40*(0.00573)/E34 | |

TABLE 36

Tables. Powers of Eye Surfaces for ±6 D lenses

| | D | E | F | G |
|---|---|---|---|---|
| 6 | | | | |
| 7 | A. Cornea | P. cornea | A. lens cortex | A. lens core |
| 8 | 1 | 2 | 3 | 4 |
| 9 | =1/0.0077 | =1/0.0068 | =1/0.01 | =1/0.007911 |
| 10 | =1000/D9 | =1000/E9 | =1000/F9 | =1000/G9 |
| 11 | 0.0005 | 0.0031 | 0.000546 | 0.002419 |
| 12 | =1000*D11 | =1000*E11 | =1000*F11 | =1000*G11 |
| 13 | 1.376 | 1.336 | 1.386 | 1.406 |
| 14 | | | | |
| 15 | =−(C13 − D13)*D9 | =−(D13 − E13)*E9 | =−(E13 − F13)*F9 | =−(F13 − G13)*G9 |
| 16 | =D11/D13 | =E11/E13 | =F11/F13 | =G11/G13 |
| 17 | Cornea: | =D15 + E15 − (D15*E15*D16) | | lens core: |
| 18 | | | | A. cortex + core: |
| 19 | | | | equivalent lens |
| 20 | | | | cornea + lens: |
| 21 | | | | |
| 22 | | | | |
| 23 | | Required power of eye = 58.872 D | | |
| 24 | | | | |
| 25 | | | | |
| 26 | | | | |
| 27 | | | | |
| 28 | A. Cornea | P. cornea | A. lens cortex | A. lens core |
| 29 | 1 | 2 | 3 | 4 |
| 30 | =$B$26/($D$13 − $C$13) | =1/0.0068 | =1/0.01 | =1/0.007911 |
| 31 | =1000/D30 | =1000/E30 | =1000/F30 | =1000/G30 |
| 32 | 0.0005 | 0.0031 | 0.000546 | 0.002419 |
| 33 | −1000*D32 | =1000*E32 | =1000*F32 | =1000*G32 |
| 34 | 1.376 | 1.336 | 1.386 | 1.406 |
| 35 | | | | |
| 36 | =−(C34 − D34)*D30 | =−(D34 − E34)*E30 | =−(E34 − F34)*F30 | =−(F34 − G34)*G30 |
| 37 | =D32/D34 | =E32/E34 | =F32/F34 | =G32/G34 |
| 38 | Cornea: | =D36 + E36 · (D36*E36*D37) | | lens core: |

TABLE 36-continued

Tables. Powers of Eye Surfaces for ±6 D lenses

| D | E | F | G |
|---|---|---|---|
| 39 | | | A. cortex + core: |
| 40 | | | equivalent lens |
| 41 | | | cornea + lens: |

TABLES

Powers of Eye Surfaces for ±6 D lenses

| | H | I |
|---|---|---|
| 42 | | |
| 43 | P. lens core | P. lens cortex |
| 44 | 5 | 6 |
| 45 | =−1/0.002655 | =1/−0.00533 |
| 46 | −1000/H45 | −1000/I45 |
| 47 | 0.0006725 | 0.0172 |
| 48 | =1000*H47 | =1000*I47 |
| 49 | 1.386 | 1.336 |
| 50 | | |
| 51 | =−(G49 − H49)*H45 | =−(H49 − I49)*I45 |
| 52 | =H47/H49 | =I47/I49 |
| 53 | =G51 + H51 − (G51*H51*G52) | |
| 54 | =F51 + H53 − F51*H53*(F47 + G47/1.41)/F49 | |
| 55 | =H54 + I51 − H54*I51*(H47 + G47/1.41)/H49 | |
| 56 | =E53 + H55 − E53*H55*(0.0051956)/E49 | |
| 57 | | |
| 58 | | |
| 59 | | |
| 60 | | |
| 61 | | |
| 62 | | |
| 63 | P. lens core | P. lens cortex |
| 64 | 5 | 6 |
| 65 | =−1/0.002655 | =1/−0.00533 |
| 66 | =1000/H65 | =1000/I65 |
| 67 | 0.0006725 | 0.0172 |
| 68 | =1000*H67 | =1000*I67 |
| 69 | 1.386 | 1.336 |
| 70 | | |
| 71 | =−(G69 − H69)*H65 | =−(H69 − I69)*I65 |
| 72 | =H67/H69 | =I67/I69 |
| 73 | =G71 + H71 − (G71*H71*G72) | |
| 74 | =F71 + H73 − F71*H73*(F67 + G67/1.41)/F69 | |
| 75 | =H74 + I71 − H74*I71*(H67 + G67/1.41)/H69 | |
| 76 | =E73 + H75 − E73*H75*(0.0051956)/E69 | |

In a further embodiment, it is contemplated the prismatic lens having the integral contiguous prisms circumscribing a central area may be disposed within a larger lens. That is, the prismatic lens member may form an island that itself is surrounded a larger lens member. Applications of such structure include bi focal corrective lenses, wherein the bi focal function is accomplished through the prismatic lens within the larger corrective lens.

While preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

The following pages include ray traces and lens characteristics.

I claim:

1. A prismatic lens (10), comprising:
   (a) a lens member (30) having a non prism area (90) and a plurality of prisms (60) circumscribing the non prism area (90), each of the plurality of prisms (60) having a base (62) and an apex (68) portion, the apex portion (68) disposed intermediate of the base (62) and the non prism area (90), and each prism (60) contiguous to a pair of prisms (60); and
   (b) the lens member (30) and the plurality of prisms (60) selected to substantially preclude image relocation of an image passing through the lens member (30).

2. The prismatic lens (10) of claim 1, wherein the non prism area (90) includes a clear aperture.

3. The prismatic lens (10) of claim 1, wherein the lens member (30) includes a substantially conical surface.

4. The prismatic lens member (30) of claim 1, wherein the lens member (30) includes a substantially spherical surface.

5. The prismatic lens member (30) of claim 1, wherein the lens member (30) includes an aspheric surface.

6. The prismatic lens member (30) of claim 1, wherein the non prism area (90) has a diameter of approximately 0.0001 millimeters to approximately 25 millimeters.

7. The prismatic lens member (30) of claim 1, wherein the prisms (60) define a portion of a substantially spherical surface.

8. The prismatic lens member (30) of claim 1, wherein the prisms (60) define a portion of a substantially conical surface.

9. The prismatic lens member (30) of claim 1, wherein the prisms (60) define a portion of a substantially aspheric surface.

10. The prismatic lens member (30) of claim 1, wherein the non prism area (90) is sized to a functional retina.

11. The prismatic lens member (30) of claim 1, wherein the lens member (30) is a contact lens.

12. The prismatic lens member (30) of claim 1, wherein the prismatic lens member (30) includes an object side (12) and an image side (14), the prisms (60) formed on one of the object (12) and the image (14) side and a vision correcting curvature formed on a remaining of the object (12) and the image (14) side.

13. The prismatic lens (30) of claim 1, wherein the prisms (60) and a curvature of the lens member (30) are selected to preclude minification and magnification of an image passing through the lens (10).

14. The prismatic lens (30) of claim 1, wherein an optical axis of the lens member (30) pass through the non prism area (90).

15. The prismatic lens member (30) of claim 1, wherein the prisms (60) have an equal diopter.

16. A method of forming an image enhancing lens (10), comprising:
   (a) forming a plurality of prism forming surfaces (158) in an apex portion in (68), base out (62) orientation about a non prism area (90); and (b) disposing an optical material in contact with the prism forming surfaces (158) to form a plurality of prismatic elements disposed about a non prism area (90) in an apex portion (68) in, base (62) out orientation.

17. The method of claim 16, wherein forming the plurality of prism forming surfaces (158) includes disposing the surfaces on a substantially spherical surface.

18. The method of claim 16, wherein forming the plurality of prism forming surfaces (158) includes disposing the surfaces on a substantially conical surface.

19. The method of claim 16, wherein forming the plurality of prism forming surfaces (158) includes disposing the surfaces on a substantially aspheric surface.

20. A prismatic lens, comprising:
    (a) a lens member having a non prism area and a plurality of prisms having an apex portion, a base portion, and two opposing sides extending from the apex portion to the base portion, the apex portion disposed intermediate of the base and the non-prism area, and each of the two opposing sides of one of the plurality of prisms being in contact with different ones of the plurality of prisms.
    (b) wherein the lens member includes one of the group of a substantially conical surface, a substantially spherical surface, or an aspheric surface;
    (c) wherein the apex portions of the plurality of prisms are positioned along a single inner circle, the inner circle having a center coincident with the center of the non prism area; and
    (d) wherein the base portions of the plurality of the prisms are positioned along an outer circle having a center coincident with the center of the non prism area.

21. A prismatic lens, comprising:
    (a) a lens member having a non prism area and a plurality of prisms circumscribing the non prism area having a center, each of the plurality of prisms including an apex portion and a base portion, the apex portion disposed intermediate of the base and the non-prism area, the prism arranged to radiate out from the center of the non prism area as a spoke of a wheel so that the apex portion is nearer to the center of the non prism area than the base portion is to the center of the non prism area.

* * * * *